(12) United States Patent
Song et al.

(10) Patent No.: US 12,497,456 B2
(45) Date of Patent: *Dec. 16, 2025

(54) BISPECIFIC RECOMBINANT PROTEIN AND USE THEREOF

(71) Applicant: SHANGHAI JMT-BIO TECHNOLOGY CO., LTD., Shanghai (CN)

(72) Inventors: Liping Song, Shanghai (CN); Xiaotian Cui, Shanghai (CN); Jian Wang, Shanghai (CN); Haixiang Wu, Shanghai (CN); Jiana Jia, Shanghai (CN); Yi Fan, Shanghai (CN); Ganliang Zhang, Shanghai (CN); Tao Li, Shanghai (CN); Hong Xu, Shanghai (CN); Yisha She, Shanghai (CN); Kai Long, Shanghai (CN)

(73) Assignee: SHANGHAI JMT-BIO TECHNOLOGY CO., LTD., Shanghai (CN)

(*) Notice: Subject to any disclaimer, the term of this patent is extended or adjusted under 35 U.S.C. 154(b) by 471 days.

This patent is subject to a terminal disclaimer.

(21) Appl. No.: 18/050,244

(22) Filed: Oct. 27, 2022

(65) Prior Publication Data

US 2023/0082273 A1  Mar. 16, 2023

Related U.S. Application Data

(63) Continuation of application No. 16/610,902, filed as application No. PCT/CN2018/086050 on May 8, 2018, now Pat. No. 11,518,810.

(30) Foreign Application Priority Data

May 8, 2017  (CN) .......................... 201710317926.7
Dec. 5, 2017  (CN) .......................... 201711269620.5

(51) Int. Cl.
| | |
|---|---|
| C07K 16/28 | (2006.01) |
| A01K 67/0278 | (2024.01) |
| A61K 38/00 | (2006.01) |
| A61P 35/00 | (2006.01) |
| C07K 14/435 | (2006.01) |
| C07K 16/46 | (2006.01) |
| C12N 15/85 | (2006.01) |

(52) U.S. Cl.
CPC ...... *C07K 16/2827* (2013.01); *A01K 67/0278* (2013.01); *A61P 35/00* (2018.01); *C07K 14/435* (2013.01); *C07K 16/2863* (2013.01); *C07K 16/2887* (2013.01); *C07K 16/46* (2013.01); *C12N 15/85* (2013.01); *A01K 2207/15* (2013.01); *A01K 2227/105* (2013.01); *A01K 2267/0331* (2013.01); *A61K 38/00* (2013.01)

(58) Field of Classification Search
None
See application file for complete search history.

(56) References Cited

U.S. PATENT DOCUMENTS

2018/0141986 A1  5/2018  Tian et al.

FOREIGN PATENT DOCUMENTS

| CN | 104356236 A | 2/2015 |
|---|---|---|
| CN | 105121467 A | 12/2015 |
| CN | 103772504 B | 9/2016 |
| CN | 106146670 A | 11/2016 |
| CN | 106519036 A | 3/2017 |
| CN | 107459579 A | 12/2017 |
| CN | 108864290 B | 12/2021 |
| WO | 2007005874 A2 | 1/2007 |
| WO | 2014087248 A2 | 6/2014 |
| WO | 2016024021 A1 | 2/2016 |
| WO | 2016126781 A1 | 8/2016 |
| WO | 2016169261 A1 | 10/2016 |
| WO | 2017027422 A1 | 2/2017 |
| WO | 2018075857 A1 | 4/2018 |

OTHER PUBLICATIONS

Mar. 22, 2023, Office Action issued in Canadian Patent Application No. 3,062,479.
Dec. 8, 2023, 1st Office Action for counterpart Korean application KR1020200003845.
Aug. 24, 2023, 1st Office Action in counterpart Chinese application CN202111362860.

(Continued)

*Primary Examiner* — Ruixiang Li
(74) *Attorney, Agent, or Firm* — Seed Intellectual Property Law Group LLP

(57) ABSTRACT

Provided is a bispecific recombinant protein, comprising a high affinity tumor-targeting arm and a low affinity fusion protein blocking the interaction of CD47 with SIRPα. The antibody corresponding to the high affinity tumor-targeting arm does not bind to CD47, and its binding affinity to the target antigen on the tumor cell is at least 6 times as great as the binding affinity of monomer fusion protein homodimer, corresponding to the low affinity fusion protein blocking the interaction of CD47 with SIRPα, to a CD47 on the tumor cell, wherein the low affinity fusion protein blocking the interaction of CD47 with SIRPα comprises a SIRPα extracellular truncation. Also provided are nucleic acid molecules encoding recombinant proteins and the use of the recombinant proteins and nucleic acid molecules in the manufacture of a medicament for treating tumors.

21 Claims, 19 Drawing Sheets

Specification includes a Sequence Listing.

(56) References Cited

OTHER PUBLICATIONS

Office Action, dated Apr. 19, 2024, for Australian Patent Application No. 2018264321. (6 pages).
Office Action, dated May 27, 2024, for Canadian Patent Application No. 3062479. (3 pages).
Office Action, dated May 10, 2024, for Chinese Patent Application No. 202111362860. (12 pages).
Office Action, dated Oct. 22, 2024, for Australian Patent Application No. 2018264321. (3 pages).
Cao Rui et al., "Advances in antibody drugs for cancer targeted therapy", Chinese Journal of Biochemical Pharmaceutics, 2016, vol. 36, No. 6, p. 15-18 (with English abstract).
Barnhart BC et al., "The role of Fc-FcγR interactions in the antitumor activity of therapeutic antibodies", Immunology and Cell Biology, 2017, vol. 95, p. 340-346.
Willingham SB et al., "CD47-signal regulatory protein alpha (SIRPα) interaction is a therapeutic target for human solid tumors", Proceedings of the National Academy of Sciences of the United States of America, 2012, vol. 109, No. 17, p. 6662-6667.
Oldenborg PA et al., "Role of CD47 as a marker of self on red blood cells", Science, 2000, vol. 288, No. 5473, p. 2051-2054.
Vonderheide RH, "CD47 blockade as another immune checkpoint therapy for cancer", Nature Medicine, 2015, vol. 21, No. 10, p. 1122-1123.
Mccracken MN et al., "Molecular Pathways: Activating T Cells after Cancer Cell Phagocytosis from Blockade of CD47 "Don't Eat Me" Signals", Clinical Cancer Research, 2015, vol. 21, No. 16, p. 3597-3601.
Weiskopf K et al., "Engineered SIRPα variants as immunotherapeutic adjuvants to anti-cancer antibodies", Science, 2013, vol. 341, No. 6141, p. 88-91.
Chao MP et al., "Anti-CD47 antibody synergizes with rituximab to promote phagocytosis and eradicate non-Hodgkin lymphoma", Cell, 2010, vol. 142, No. 5, p. 699-713.
Zhao XW et al., "CD47-signal regulatory protein-α (SIRPα) interactions form a barrier for antibody-mediated tumor cell destruction", Proceedings of the National Academy of Sciences of the United States of America, 2011, vol. 108, No. 45, p. 18342-18347.
Lee WY et al., "The Role of cis Dimerization of Signal Regulatory Protein α (SIRPα) in Binding to CD47", J Biol Chem, 2010, vol. 285, No. 49, p. 37953-37963.
Lee WY et al., "Novel Structural Determinants on SIRP α that Mediate Binding to CD47", Journal of Immunology, 2007, vol. 179, No. 11, p. 7741-7750.
Petrova PS et al., "TTI-621 (SIRPαFc): A CD47-Blocking Innate Immune Checkpoint Inhibitor with Broad Antitumor Activity and Minimal Erythrocyte Binding", Clin Cancer Res, 2017, vol. 23, No. 4, p. 1068-1079.
International Search Report and Written Opinion of PCT/CN2018/086050 mailed Aug. 1, 2018.
Dec. 30, 2020 Chinese Office Action issued in Chinese Patent Application No. 201810430371.
Apr. 23, 2021 Chinese Office Action issued in Chinese Patent Application No. 201810430371.
Mar. 15, 2021 partial supplementary European search report in European Application No. 18798470.3.
"Targeting the 5T4 oncofetal glycoprotein with an antibody drug conjugate (A1mcmmaf) improves survival in patient-derived xenograft models of acute lymphoblastic leukemia", Owen J.Mcginn et al, Mar. 24, 2017.
"Evolving Strategies for Target Selection for Antibody-Drug Conjugates". Pharmaceutical Research, Springer New Yorl LLC, US, Jan. 15, 2015.
"Structural Insights into the Inhibition of Wnt Signaling by Cancer Antigen 5T4/Wnt-Activated Inhibitory Factor 1", Zhao Yuguang et al, Apr. 8, 2014.
Jun. 1, 2021 Chinese Office Action issued in Chinese Patent Application No. 201810430371.
"Novel structural determinants on SIRP a that mediate binding to CD47" P7741-7750.
"2JJS_A, Hatherley et al NCBI Origin".
"2WNG_A, Hatherley et al NCBI Origin".
"AHH26692.1 Strausberg et al NCBI Origin".
Jul. 6, 2021 Extended supplementary European search report in European Application No. 18798470.3.
Jul. 22, 2021 First Office Action in Russian Application No. 2019138624.
CD20-targeting in B-cell malignancies: novel prospects for antibodies and combination therapies.
Nov. 30, 2021 the Second Office Action issued in Russian application No. 2019138624.
COLMAN P. M., Effects of amino acid sequence changes on antibody-antigen interactions, Research in Immunology, 1994, V. 145, N. 1, pp. 33-36, p. 33.
Safdari Y. et al., Antibody humanization methods—a review and update, Biotechnology and Genetic Engineering Reviews, 2013, V. 29, N. 2, pp. 175-186, pp. 178, 180.
Torres M. et al., The immunoglobulin constant region contributes to affinity and specificity, Trends in immunology, 2008, V. 29, N. 2, pp. 91-97, pp. 93-94.
Hatherley D. et al., Paired receptor specificity explained by structures of signal regulatory proteins alone and complexed with CD47, Molecular cell, 2008, V. 31, N. 2, pp. 266-277, Table 2.
Tzankov A. et al., Prognostic significance of CD20 expression in classical Hodgkin lymphoma: a clinicopathological study of 119 cases, Clinical cancer research, 2003, V. 9, N. 4, pp. 1381-1386, p. 1383.
Taiwan Office Action dated May 16, 2022, issued in Taiwan application No. 107115571, 9 pages.
Japanese Office Action dated May 17, 2022, issued in Japanese Patent Application No. 2020-513390, 11 pages.

FIG. 15A
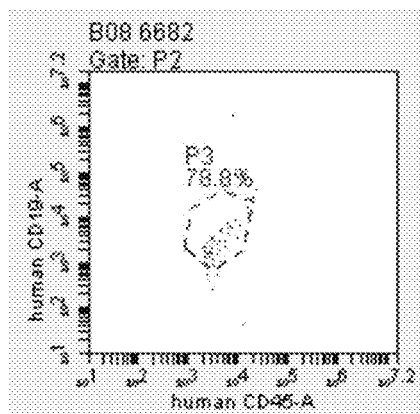
FIG. 15B
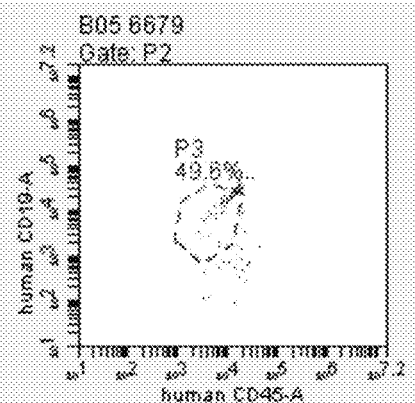
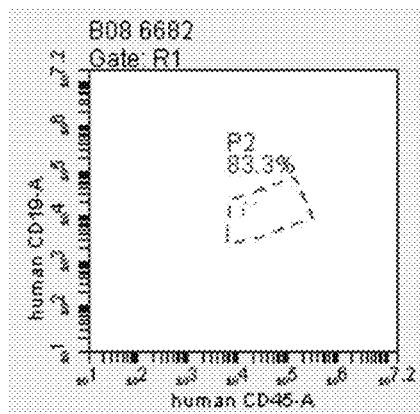
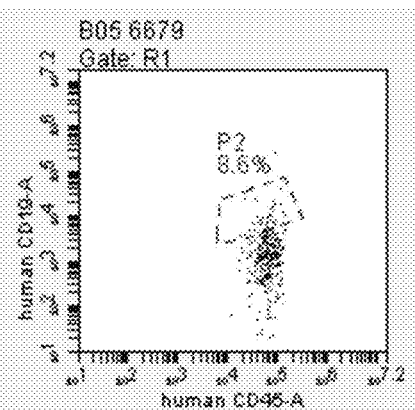
FIG. 15C
FIG. 15D

FIG. 16A
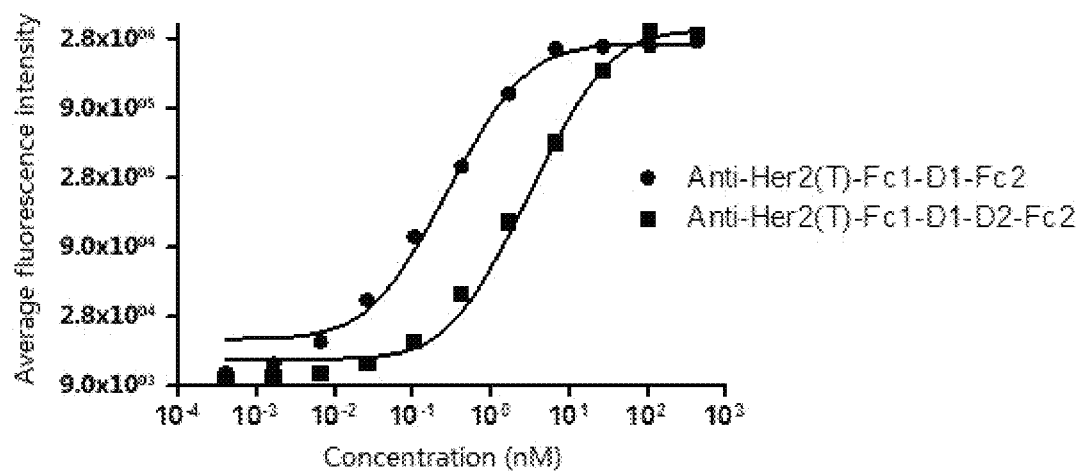
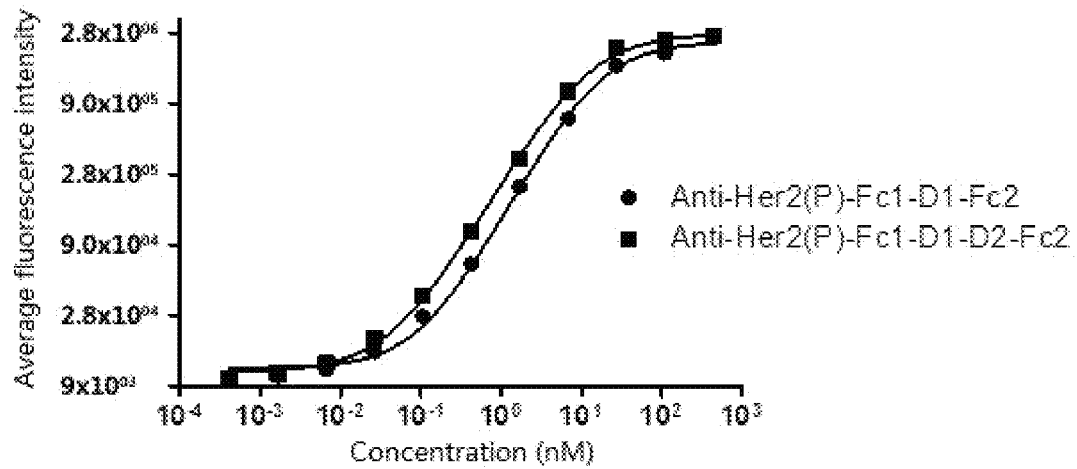
FIG. 16B

| No. | SEQ ID NOs: | Sequence name | Protein sequence |
|---|---|---|---|
| 1 | 1 | Ofatumumab heavy chain | MEWSWVFLFFLSVTTGVHSEVQLVESGGGLVQPGRSLRLSCAASGFTFNDYAMHWVRQAPGKGLEWVSTISWNSGSIGYADSVKGRFTISRDNAKKSLYLQMNSLRAEDTALYYCAKDIQYGNYYYGMDVWGQGTTVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 2 | 2 | Ofatumumab light chain | MSVPTQVLGLLLLWLTDARCEIVLTQSPATLSLSPGERATLSCRASQSVSSYLAWYQQKPGQAPRLLIYDASNRATGIPARFSGSGSGTDFTLTISSLEPEDFAVYYCQQRSNWPITFGQGTRLEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 3 | 3 | Obinutuzumab heavy chain | MEWSWVFLFFLSVTTGVHSQVQLVQSGAEVKKPGSSVKVSCKASGYAFSYSWINWVRQAPGQGLEWMGRIFPGDGDTDYNGKFKGRVTITADKSTSTAYMELSSLRSEDTAVYYCARNVFDGYWLVYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 4 | 4 | Obinutuzumab light chain | MSVPTQVLGLLLLWLTDARCDIVMTQTPLSLPVTPGEPASISCRSSKSLLHSNGITYLYWYLQKPGQSPQLLIYQMSNLVSGVPDRFSGSGSGTDFTLKISRVEAEDVGVYYCAQNLELPYTFGGGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 5 | 5 | Hu5F9-G4 heavy chain | MRAWIFFLLCLAGRALAQVQLVQSGAEVKKPGASVKVSCKASGYTFTNYNMHWVRQAPGQRLEWMGTIYPGNDDTSYNQKFKDRVTITADTSASTAYMELSSLRSEDTAVYYCARGGYRAMDYWGQGTLVTVSSASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK |
| 6 | 6 | Hu5F9-G4 light chain | MRAWIFFLLCLAGRALADIVMTQSPLSLPVTPGEPASISCRSSQSIVYSNGNTYLGWYLQKPGQSPQLLIYKVSNRFSGVPDRFSGSGSGTDFTLKISRVEAEDVGVYYCFQGSHVPYTFGQGTKLEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 7 | 7 | JMT101 heavy chain | MRAWIFFLLCLAGRALAQVQLQESGPGLVKPSETLSLTCTVSGFSLSNYDVHWVRQAPGKGLEWLGVIWSGGNTDYNTPFTSRLTISVDTSKNQFSLKLSSVTAADTAVYYCARALDYYDYEFAYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKRVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 8 | 8 | JMT101 light chain | MRAWIFFLLCLAGRALAEIVLTQSPDFQSVTPKEKVTITCRASQSIGTNIHWYQQKPDQSPKLLIKYASESISGIPSRFSGSGSGTDFTLTINSLEAEDAATYYCQQNNEWPTSFGQGTKLEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 9 | 9 | Trastuzumab heavy chain | MRAWIFFLLCLAGRALAEVQLVESGGGLVQPGGSLRLSCAASGFNIKDTYIHWVRQAPGKGLEWVARIYPTNGYTRYADSVKGRFTISADTSKNTAYLQMNSLRAEDTAVYYCSRWGGDGFYAMDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 10 | 10 | Trastuzumab light chain | MRAWIFFLLCLAGRALADIQMTQSPSSLSASVGDRVTITCRASQDVNTAVAWYQQKPGKAPKLLIYSASFLYSGVPSRFSGSRSGTDFTLTISSLQPEDFATYYCQQHYTTPPTFGQGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 11 | 11 | SIRPα D1-Fc | MEWSWVFLFFLSVTTGVHSEEELQVIQPDKSVSVAAGESAILHCTVTSLIPVGPIQWFRGAGPARELIYNQKEGHFPRVTTVSESTKRENMDFSISISAITPADAGTYYCVKFRKGSPDTEFKSGAGTELSVDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 12 | 12 | Atezolizumab heavy chain | MEFWLSWVFLVAILKGVQCEVQLVESGGGLVQPGGSLRLSCAASGFTFSDSWIHWVRQAPGKGLEWVAWISPYGGSTYYADSVKGRFTISADTSKNTAYLQMNSLRAEDTAVYYCARRHWPGGFDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 13 | 13 | Atezolizumab light chain | MEFWLSWVFLVAILKGVQCDIQMTQSPSSLSASVGDRVTITCRASQDVSTAVAWYQQKPGKAPKLLIYSASFLYSGVPSRFSGSGSGTDFTLTISSLQPEDFATYYCQQYLHPATFGQGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |

| No. | SEQ ID NOs: | Sequence name | Protein sequence | SEQ ID NOs: | DNA Sequence |
|---|---|---|---|---|---|
| 20 | 20 | Anti-Her2(T)-Fc1 heavy chain | MEWSWVFLFFLSVTTGVHSEVQLVESGGGLVQPGGSLRLSCAASGFNIKDTYIHWVRQAPGKGLEWVARIYPTNGYTRYADSVKGRFTISADTSKNTAYLQMNSLRAEDTAVYYCSRWGGDGFYAMDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSREEMTKNQVSLSCAVKGFYPSDIAVEWESNGQPENNYKTTPPVLDSDGSFFLVSKLTVDKSRWQQGNVFSCSVMHEALHNHYTQKSLSLSPGK | 38 | ATGGAATGGAGCTGGGTGTTCCTGTTCTTTCTGTTCCGTGACCACAGGCGTGCATTCTGAGGTGCAGTTGGTGGAGAGCGGGGGGGGGCTGGTGCAGCCTGGAGGAAGTTTGAGGTTGAGCTGTGCCGCCAAGCGGGTTCAACATTAAGGACACATACATTCACTGGGTGAGGCAGGCACCCGGAAAGGGACTGGAGTGGGTGGCTAGGATACTACCCCAACGGCTACAAAGGTACGCCGACATGTGAAAGGCCGGTTCACCATTTCCGCCGACACCTCCAAGAACACCGCCTACCTGCAGATGAACAGCCTGAGGGCCGAGGACACCGCCGTCTACTACTGCTCCAGGTGGGGAGGAGACGGATTCTATGCTATGGACTACTGGGGACAGGGCACCCTGGTGACCGTGTCATCTGCTTCTACCAAGGGCCCCTCCGTGTTTCCTCTGGCCCCTTCCAGCAAGTCCACCTCTGGCGGAACAGCCGCTCTGGGCTGCCTCGTGAAGGACTACTTCCCCGAGCCTGTGACCGTGTCCTGGAACTCTGGCGCTCTGACATCCGGCGTGCACACCTTCCCTGCTGTGCTGCAGTCTAGCGGCCTGTACTCCCTGTCCTCCGTGGACCGTGCCTTCCAGCTCTCTGGGCACCCAGACCTACATCTGCAACGTGAACCACAAGCCCTCCAACACCAAGGTGGACAAGAAGGTGGAACCCAAGTCCTGCGACAAGACCCACACCTGTCCCCCTTGTCCTGCCCTGAACTGCTGGGCGGACCTTCCGTGTTCCTGTTCCCCCCAAAAGCCCAAGGACACCCTGATGATCTCCCGGACCCCCGAAGTGACCTGCGTGGTGGATGTGTCCCACGAGGACCCTGAAGTGAAGTTCAATTGGTACGTGGACGGCGTGGAAGTGCACAACGCCAAGACCAAGCCTAGAGAGGAACAGTACAACTCCACCTACCGGGTGGTGTCCGTGCTGACCGTGCTGCACCAGGATTGGCTGAACGGCAAAGAGTACAAGTGCAAGGTGTCCAACAAGGCCCTGCCTGCCCCCATCGAAAAGACCATCTCCAAGGCCAAGGGCCAGCCCCGGGAACCCCAGGTGTACACACTGCCCCCCTAGCAGGGACGAGCTGACCAAGAACCAGGTGTCCCTGAGCTGTGCAGTGAAAGGCTTCTACCCCTCCGACATTGCCGTGGAATGGGAGTCCAACGGCCAGCCTGAGAACAACTACAAGACCACCCCCCCTGTGCTGGACTCCGACGGCTCATTCTTCCTGGTGAGCAAGCTGACAGTGGACAAGTCCCGGTGGCAGCAGGGCAACGTGTTCTCCTGCTCCGTGATGCACGAGGCCCTGCACAACCACTACACCCAGAAGTCCCTGTCCCTGAGCCCCGGCAAATGA |
| 21 | 21 | Anti-Her2(T)-Fc1 light chain | MSVPTQVLGLLLLWLTDARCDIQMTQSPSSLSASVGDRVTITCRASQDVNTAVAWYQQKPGKAPKLLIYSASFLYSGVPSRFSGSRSGTDFTLTISSLQPEDFATYYCQQHYTTPPTFGQGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC | 39 | ATGTCTGTGCCTACCCAGGTGCTGGGACTGCTGCTGCTGTGGCTGACAGACGCCCGCTGTGACATTCAGATGACCCAGAGCCCCTCCTCCCTCTCCGCCTCCGTGGGAGACAGAGTTACCATCACCTGCAGGGCCTCCCAGGACGTGAACACCGCCGTGGCCTGGTACCAGCAGAAACCGGCAAAGCCCCCAAACTGCTCATCTACTCCGCCTCATTTCTGTACAGCGGCGTGCCCTCCCGCTTCTCCGGTTCCAGATCCGGCACCGACTTCACCCTGACTATCTCCTCCCTCCAGCCCGAAGACTTCGCCACCTACTACTGCCAGCAGCACTACACCACCCCCCCCACCTTCGGCCAGGGCACCAAAGGTCGAAATCAAGAGAACCGTGGCCGCTCCCTCCGTGTTCATCTTCCCACCTTCCGACGAGCAGCTGAAGTCCGGCACCGCTTCTGTCGTGTGCCTGCTGAACAACTTCTACCCCCGCGAGGCCAAGGTGCAGTGGAAGGTGGACAACGCCCTGCAGTCCGGCAACTCCCAGGAATCCGTGACCGAGCAGGACTCCAAGGACAGCACCTACTCCCTGTCCTCCACCCTGACCCTGTCCAAGGCCGACTACGAGAAGCACAAGGTGTACGCCTGCGAAGTGACCCACCAGGGCCTGTCTAGCCCCGTGACCAAGTCTTTCAACCGGGGCGAGTGCTGA |
| 22 | 22 | Anti-Her2(P)-Fc1 heavy chain | MEWSWVFLFFLSVTTGVHSEVQLVESGGGLVQPGGSLRLSCAASGFTFTDYTMDWVRQAPGKGLEWVADVNPNSGGSIYNQRFKGRFTLSVDRSKNTLYLQMNSLRAEDTAVYYCARNLGPSFYFDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLSCAVKGFYPSDIAVEWESNGQPENNYKTTPPVLDSDGSFFLVSKLTVDKSRWQQGNVFSCSVMHEALHNHYTQKSLSLSPGK | 40 | ATGGAATGGAGCTGGGTGTTCCTGTTCTTTCTGTTCCGTGACCACAGGCGTGCATTCTGAGGTGCAGTTGGTGGAGAGCGGGGGGGGGCTGGTGCAGCCTGGAGGAAGTTTGAGGTTGAGCTGTGCCGCCAAGCGGGTTCAACATTTCCGCTGACTACACAATGGACTGGGTGAGGCAGGCACCCGGAAAGGGACTGGAGTGGGTGGCTGATGTGAATCCCAATAGCGGAGGGAGCATTTACAACCAGAGATTCAAGGGCCGGTTCACCTTGTCCGTGGACAGGAGCAAGAACACACTGTACCTGCAGATGAACAGCCTGAGGGCCGAGGATACCGCCGTCTACTACTGCGCCAGGAACCTCGGACCTTCCTTCTATTTTGACTACTGGGGCCAGGGAACCCTGGTGACCGTGTCATCTGCTTCTACCAAGGGCCCCTCCGTGTTTCCTCTGGCCCCTTCCAGCAAGTCCACCTCTGGCGGAACAGCCGCTCTGGGCTGCCTCGTGAAGGACTACTTCCCCGAGCCTGTGACCGTGTCCTGGAACTCTGGCGCTCTGACATCCGGCGTGCACACCTTCCCTGCTGTGCTGCAGTCTAGCGGCCTGTACTCCCTGTCCTCCGTGGTGACCGTGCCTTCCAGCTCTCTGGGCACCCAGACCTACATCTGCAACGTGAACCACAAGCCCTCCAACACCAAGGTGGACAAGAAGGTGGAACCCAAGTCCTGCGACAAGACCCACACCTGTCCCCCTTGTCCTGCCCCTGAACTGCTGGGCGGACCTTCCGTGTTCCTGTTCCCCCCAAAGCCCAAGGACACCCTGATGATCTCCCGGACCCCCGAAGTGACCTGCGTGGTGGATGTGTCCCACGAGGACCCTGAAGTTCAATTGGTACGTGGACGGCGTGGAAGTGCACAACGCCAAGACCAAGCCTAGAGAGGAACAGTACAACTCCACCTACCGGGTGGTGTCCGTGCTGACCGTGCTGCACCAGGATTGGCTGAACGGCAAAGAGTACAAGTGCAAGGTGTCCAACAAGGCCCTGCCTGCCCCCATCGAAAAGACCATCTCCAAGGCCAAGGGCCAGCCCCGGGAACCCCAGGTGTACACACTGCCCCCCTCCAGGGACGAGCTGACCAAGAACCAGGTGTCCCTGAGCTGTGCAGTGAAAGGCTTCTACCCCTCCGACATTGCCGTGGAATGGGAGTCCAACGGCCAGCCTGAGAACAACTACAAGACCACCCCCCCTGTGCTGGACTCCGACGGCTCATTCTTCCTGGTGAGCAAGCTGACAGTGGACAAGTCCCGGTGGCAGCAGGGCAACGTGTTCTCCTGCTCCGTGATGCACGAGGCCCTGCACAACCACTACACCCAGAAGTCCCTGTCCCTGAGCCCCGGCAAATGA |
| 23 | 23 | Anti-Her2(P)-Fc1 light chain | MSVPTQVLGLLLLWLTDARCDIQMTQSPSSLSASVGDRVTITCKASQDVSIGVAWYQQKPGKAPKLLIYSASYRYTGVPSRFSGSGSGTDFTLTISSLQPEDFATYYCQQYIYPYTFGQGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC | 41 | ATGTCTGTGCCTACCCAGGTGCTGGGACTGCTGCTGCTGTGGCTGACAGACGCCCGCTGTGACATTCAGATGACCCAGAGCCCCTCCTCCCTCTCCGCCTCCGTGGGAGACAGAGTTACCATCACCTGCAAAGCCAGCCAGGACGTGAGCATCGGCGTGGCCTGGTACCAGCAGAAACCGGCAAAGCCCCCAAACTGCTCATTTACTCCGCCTCATACCGTTACACCGGCGTTCCCTCCCGCTTCAGCGGATCCGGCTCCGGAACCGACTTCACCCTGACTATCTCCTCCCTCCAGCCCGAAGACTTCGCCACCTACTACTGCCAGCAGTACATTTACCCCTACACCTTCGGCCAGGGCACCAAGGTGGAAATCAAGAGAACCGTGGCCGCTCCCTCCGTGTTCATCTTCCCACCTTCCGACGAGCAGCTGAAGTCCGGCACCGCTTCTGTCGTGTGCCTGCTGAACAACTTCTACCCCCGCGAGGCCAAGGTGCAGTGGAAGGTGGACAACGCCCTGCAGTCCGGCAACTCCCAGGAATCCGTGACCGAGCAGGACTCCAAGGACAGCACCTACTCCCTGTCCTCCACCCTGACCCTGTCCAAGGCCGACTACGAGAAGCACAAGGTGTACGCCTGCGAAGTGACCCACCAGGGCCTGTCTAGCCCCGTGACCAAGTCTTTCAACCGGGGCGAGTGCTGA |
| 24 | 24 | Anti-PD-L1(Ate)-Fc1 heavy chain | MEWSWVFLFFLSVTTGVHSEVQLVESGGGLVQPGGSLRLSCAASGFTFSDSWIHWVRQAPGKGLEWVAWISPYGGSTYYADSVKGRFTISADTSKNTAYLQMNSLRAEDTAVYYCARRHWPGGFDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLSCAVKGFYPSDIAVEWESNGQPENNYKTTPPVLDSDGSFFLVSKLTVDKSRWQQGNVFSCSVMHEALHNHYTQKSLSLSPGK | 42 | ATGGAATGGAGCTGGGTGTTCCTGTTCTTTCTGTTCCGTGACCACAGGCGTGCATTCTGAAGTGCAGCTGGTGGAAAGCGGCGGCGGCCTGGTGCAGCCGGGCAGCAGCCTGCGCCTGAGCTGCGCCGCGAGCGGCTTTACCTTTAGCGATAGCTGGATTCATTGGGTGCGCCAGGCGCCGGGCAAAGGCCTGGAATGGGTGGCGTGGATTAGCCCGTATGGCGGCAGCACCTATTATGCGGATAGCGTGAAAGGCCGCTTTACCATTAGCGCGGATACCAGCAAAAACACCGCGTATCTGCAGATGAACAGCCTGCGCGCGGAAGATACCGCGGTGTATTATTGCGCGCGTCGCCATTGGCCGGGCGGCTTTGATTACTGGGGCCAGGGCACCCTGGTGACCGTGTCATCTGCTTCTACCAAGGGCCCCTCCGTGTTTCCTCTGGCCCCTTCCAGCAAGTCCACCTCTGGCGGAACAGCCGCTCTGGGCTGCCTCGTGAAGGACTACTTCCCCGAGCCTGTGACCGTGTCCTGGAACTCTGGCGCTCTGACATCCGGCGTGCACACCTTCCCTGCTGTGCTGCAGTCTAGCGGCCTGTACTCCCTGTCCTCCGTGGTGACCGTGCCTTCCAGCTCTCTGGGCACCCAGACCTACATCTGCAACGTGAACCACAAGCCCTCCAACACCAAGGTGGACAAGAAGGTGGAACCCAAGTCCTGCGACAAGACCCACACCTGTCCCCCTTGTCCTGCCCCTGAACTGCTGGGCGGACCTTCCGTGTTCCTGTTCCCCCCAAAGCCCAAGGACACCCTGATGATCTCCCGGACCCCCGAAGTGACCTGCGTGGTGGATGTGTCCCACGAGGACCCTGAAGTGAAGTTCAATTGGTACGTGGACGGCGTGGAAGTGCACAACGCCAAGACCAAGCCTAGAGAGGAACAGTACAACTCCACCTACCGGGTGGTGTCCGTGCTGACCGTGCTGCACCAGGATTGGCTGAACGGCAAAGAGTACAAGTGCAAGGTGTCCAACAAGGCCCTGCCTGCCCCCATCGAAAAGACCATCTCCAAGGCCAAGGGCCAGCCCCGGGAACCCCAGGTGTACACACTGCCCCCCTCCAGGGACGAGCTGACCAAGAACCAGGTGTCCCTGAGCTGTGCAGTGAAAGGCTTCTACCCCTCCGACATTGCCGTGGAATGGGAGTCCAACGGCCAGCCTGAGAACAACTACAAGACCACCCCCCCTGTGCTGGACTCCGACGGCTCATTCTTCCTGGTGAGCAAGCTGACAGTGGACAAGTCCCGGTGGCAGCAGGGCAACGTGTTCTCCTGCTCCGTGATGCACGAGGCCCTGCACAACCACTACACCCAGAAGTCCCTGTCCCTGAGCCCCGGCAAATGA |
| 25 | 13 | Anti-PD-L1(Ate)-Fc1 light chain | MEFWLSWVFLVAILKGVQCDIQMTQSPSSLSASVGDRVTITCRASQDVSTAVAWYQQKPGKAPKLLIYSASFLYSGVPSRFSGSGSGTDFTLTISSLQPEDFATYYCQQYLYHPATFGQGTKVEIKRTVAAPSVFIFPPSDEQLKSTASVVCLLNNFYPREAKVQWKVDNALQSGNSQESVTEQDSKDSTYSLSSTLTLSKADYEKHKVYACEVTHQGLSSPVTKSFNRGEC | / | / |

Fig. 17C

| No. | SEQ ID NOs: | Sequence name | Protein sequence | SEQ ID NOs: | DNA Sequence |
|---|---|---|---|---|---|
| 26 | 26 | D1-Fc2 | MEWSWVFLFFLSVTTGVHSEEELQVIQPDKSVSVA AGESAILHCTVTSLIPVGPIQWFRGAGPARELIYN QKEGHFPRVTTVSESTKRENMDFSISISAITPADA GTYYCVKFRKGSPDTEFKSGAGTELSVRAKPDKTH TCPPCPAPELLGGPSVFLFPPKPKDTLMISRTPEV TCVVVDVSHEDPEVKFNWYVDGVEVHNAKTKPREE QYNSTYRVVSVLTVLHQDWLNGKEYKCKVSNKALP APIEKTISKAKGQPREPQVYTLPPSRDELTKNQVS LWCLVKGFYPSDIAVEWESNGQPENNYKTTPPVLD SDGSFFLYSKLTVDKSRWQQGNVFSCSVMHEALHN HYTQKSLSLSPGK | 14 | ATGGAATGGAGCTGGGTGTTCCTGTTCTTTCTGTCCGTGACCACAGGCGTGCATTCTGAAGAGGAGCTGC AGGTCATCCAGCCCGATAAGAGCGTGTCCGTGGCCGCAGGAGAATCTGCCATCCTGCATTGCACCGTGAC CTCTCTGATCCCCGTGGGCCCAATCCAGTGGTTCAGAGGAGCCGGACCAGCTAGAGAGCTGATCTACAAC CAGAAGGAGGGCCACTTCCCCAGAGTGACAACCGTGTCCGAGTCTACCAAGCGGGAGAACATGGACTTCT CCATCTCCATCTCCGCCATCACACCAGCCGACGCCGGCACCTACTATTGCGTGAAGTTCCGGAAGGGCTC CCCAGATACCGAGTTTAAGAGCGGCGCCGGAACAGAGCTGAGCGTGCGGGCTAAGCCTGACAAGACCCAC ACCTGTCCCCCTTGTCCTGCCCCTGAACTGCTGGGCGGACCTTCCGTGTTCCTGTTCCCCCCAAAGCCCA AGGACACCCTGATGATCTCCCGGACCCCCGAAGTGACCTGCGTGGTGGTGGATGTGTCCCACGAGGACCC TGAAGTGAAGTTCAATTGGTACGTGGACGGCGTGGAAGTGCACAACGCCAAGACCAAGCCTAGAGAGGAA CAGTACAACTCCACCTACCGGGTGGTGTCCGTGCTGACCGTGCTGCACCAGGATTGGCTGAACGGCAAAG AGTACAAGTGCAAGGTGTCCAACAAGGCCCTGCCTGCCCCCATCGAAAAGACCATCTCCAAGGCCAAGGG CCAGCCCCGGGAACCCCAGGTGTACACACTGCCCCCTAGCAGGGACGAGCTGACCAAGAACCAGGTGTCC CTGTGGTGTCTCGTGAAAGGCTTCTACCCCTCCGACATTGCCGTGGAATGGGAGTCCAACGGCCAGCCTG AGAACAACTACAAGACCACCCCCCCTGTGCTGGACTCCGACGGCTCATTCTTCCTGTACAGCAAGCTGAC AGTGGACAAGTCCCGGTGGCAGCAGGGCAACGTGTTCTCCTGCTCCGTGATGCACGAGGCCCTGCACAAC CACTACACCCAGAAGTCCCTGTCCCTGAGCCCCGGCAAATGA |
| 27 | 27 | D1-D2-Fc2 | MEWSWVFLFFLSVTTGVHSEEELQVIQPDKSVSVA AGESAILHCTVTSLIPVGPIQWFRGAGPARELIYN QKEGHFPRVTTVSESTKRENMDFSISISAITPADA GTYYCVKFRKGSPDTEFKSGAGTELSVRAKPSAPV VSGPAARATPQHTVSFTCESHGFSPRDITLKWFKN GNELSDFQTNVDPVGESVSYSIHSTAKVVLTREDV HSQVICEVAHVTLQGDPLRGTANLSDKTHTCPPCP APELLGGPSVFLFPPKPKDTLMISRTPEVTCVVVD VSHEDPEVKFNWYVDGVEVHNAKTKPREEQYNSTY RVVSVLTVLHQDWLNGKEYKCKVSNKALPAPIEKT ISKAKGQPREPQVYTLPPSRDELTKNQVSLWCLVK GFYPSDIAVEWESNGQPENNYKTTPPVLDSDGSFF LYSKLTVDKSRWQQGNVFSCSVMHEALHNHYTQKS LSLSPGK | 15 | ATGGAATGGAGCTGGGTGTTCCTGTTCTTTCTGTCCGTGACCACAGGCGTGCATTCTGAAGAGGAGCTGC AGGTCATCCAGCCCGATAAGAGCGTGTCCGTGGCCGCAGGAGAATCTGCCATCCTGCATTGCACCGTGAC CTCTCTGATCCCCGTGGGCCCAATCCAGTGGTTCAGAGGAGCCGGACCAGCTAGAGAGCTGATCTACAAC CAGAAGGAGGGCCACTTCCCCAGAGTGACAACCGTGTCCGAGTCTACCAAGCGGGAGAACATGGACTTCT CCATCTCCATCTCCGCCATCACACCAGCCGACGCCGGCACCTACTATTGCGTGAAGTTCCGGAAGGGCTC CCCAGATACCGAGTTTAAGAGCGGCGCCGGAACAGAGCTGAGCGTGCGGGCTAAGCCTTCTGCTCCAGTG GTGTCAGGACCAGCAGCTAGAGCTACCCCTCAGCACACCGTGTCCTTCACCTGCGAGTCTCACGGCTTCT CCCCTAGAGACATCACCCTCAAGTGGTTCAAGAACGGCAACGAGCTGTCCGACTTCCAGACCAACGTGGA TCCAGTGGGCGAGAGCGTGTCTTACTCCATCCACTCCACCGCCAAGGTGGTGCTGACAAGGGAGGACGTG CACTCCCAGGTCATTTGCGAGGTGGCACACGTGACATTGCAGGGCGACCCCCTGAGGGGAACCGCCAACT TGAGTGACAAGACCCACACCTGTCCCCCTTGTCCTGCCCCTGAACTGCTGGGCGGACCTTCCGTGTTCCT GTTCCCCCCAAAGCCCAAGGACACCCTGATGATCTCCCGGACCCCCGAAGTGACCTGCGTGGTGGTGGAT GTGTCCCACGAGGACCCTGAAGTGAAGTTCAATTGGTACGTGGACGGCGTGGAAGTGCACAACGCCAAGA CCAAGCCTAGAGAGGAACAGTACAACTCCACCTACCGGGTGGTGTCCGTGCTGACCGTGCTGCACCAGGA TTGGCTGAACGGCAAAGAGTACAAGTGCAAGGTGTCCAACAAGGCCCTGCCTGCCCCCATCGAAAAGACC ATCTCCAAGGCCAAGGGCCAGCCCCGGGAACCCCAGGTGTACACACTGCCCCCTAGCAGGGACGAGCTGA CCAAGAACCAGGTGTCCCTGTGGTGTCTCGTGAAAGGCTTCTACCCCTCCGACATTGCCGTGGAATGGGA GTCCAACGGCCAGCCTGAGAACAACTACAAGACCACCCCCCCTGTGCTGGACTCCGACGGCTCATTCTTC CTGTACAGCAAGCTGACAGTGGACAAGTCCCGGTGGCAGCAGGGCAACGTGTTCTCCTGCTCCGTGATGC ACGAGGCCCTGCACAACCACTACACCCAGAAGTCCCTGTCCCTGAGCCCCGGCAAATGA |
| 28 | 28 | D1-D2-D3-Fc2 | MEWSWVFLFFLSVTTGVHSEEELQVIQPDKSVSVA AGESAILHCTVTSLIPVGPIQWFRGAGPARELIYN QKEGHFPRVTTVSESTKRENMDFSISISAITPADA GTYYCVKFRKGSPDTEFKSGAGTELSVRAKPSAPV VSGPAARATPQHTVSFTCESHGFSPRDITLKWFKN GNELSDFQTNVDPVGESVSYSIHSTAKVVLTREDV HSQVICEVAHVTLQGDPLRGTANLSETIRVPPTLE VTQQPVRAENQVNVTCQVRKFYPQRLQLTWLENGN VSRTETASTVTENKDGTYNWMSWLLVNVSAHRDDV KLTCDKTHTCPPCPAPELLGGPSVFLFPPKPKDTL MISRTPEVTCVVVDVSHEDPEVKFNWYVDGVEVHN AKTKPREEQYNSTYRVVSVLTVLHQDWLNGKEYKC KVSNKALPAPIEKTISKAKGQPREPQVYTLPPSRD ELTKNQVSLWCLVKGFYPSDIAVEWESNGQPENNY KTTPPVLDSDGSFFLYSKLTVDKSRWQQGNVFSCS VMHEALHNHYTQKSLSLSPGK | 25 | ATGGAATGGAGCTGGGTGTTCCTGTTCTTTCTGTCCGTGACCACAGGCGTGCATTCTGAAGAGGAGCTGC AGGTCATCCAGCCCGATAAGAGCGTGTCCGTGGCCGCAGGAGAATCTGCCATCCTGCATTGCACCGTGAC CTCTCTGATCCCCGTGGGCCCAATCCAGTGGTTCAGAGGAGCCGGACCAGCTAGAGAGCTGATCTACAAC CAGAAGGAGGGCCACTTCCCCAGAGTGACAACCGTGTCCGAGTCTACCAAGCGGGAGAACATGGACTTCT CCATCTCCATCTCCGCCATCACACCAGCCGACGCCGGCACCTACTATTGCGTGAAGTTCCGGAAGGGCTC CCCAGATACCGAGTTTAAGAGCGGCGCCGGAACAGAGCTGAGCGTGCGGGCTAAGCCTTCTGCTCCAGTG GTGTCAGGACCAGCAGCTAGAGCTACCCCTCAGCACACCGTGTCCTTCACCTGCGAGTCTCACGGCTTCT CCCCTAGAGACATCACCCTCAAGTGGTTCAAGAACGGCAACGAGCTGTCCGACTTCCAGACCAACGTGGA TCCAGTGGGCGAGAGCGTGTCTTACTCCATCCACTCCACCGCCAAGGTGGTGCTGACAAGGGAGGACGTG CACTCCCAGGTCATTTGCGAGGTGGCACACGTGACATTGCAGGGCGACCCCCTGAGAGGCACAGCAAACT TGAGCGAGACAATTAGAGTGCCCCCCACCCTGGAAGTTACACAGCAGCCCGTTAGAGCCGAGAACCAGGT CAACGTCACCTGCCAGGTCAGGAAGTTTTATCCACAGAGACTGCAGCTGACCTGGCTCGAGAACGGGAAC GTGAGCAGAACAGAGACCGCCAGCACCGTGACAGAGAACAAGGACGGGACCTACAACTGGATGAGTTGGC TGCTGGTGAACGTCAGCGCCCACAGAGACGACGTCAAGCTGACCTGCGACAAGACCCACACCTGTCCCCC TTGTCCTGCCCCTGAACTGCTGGGCGGACCTTCCGTGTTCCTGTTCCCCCCAAAGCCCAAGGACACCCTG ATGATCTCCCGGACCCCCGAAGTGACCTGCGTGGTGGTGGATGTGTCCCACGAGGACCCTGAAGTGAAGT TCAATTGGTACGTGGACGGCGTGGAAGTGCACAACGCCAAGACCAAGCCTAGAGAGGAACAGTACAACTC CACCTACCGGGTGGTGTCCGTGCTGACCGTGCTGCACCAGGATTGGCTGAACGGCAAAGAGTACAAGTGC AAGGTGTCCAACAAGGCCCTGCCTGCCCCCATCGAAAAGACCATCTCCAAGGCCAAGGGCCAGCCCCGGG AACCCCAGGTGTACACACTGCCCCCTAGCAGGGACGAGCTGACCAAGAACCAGGTGTCCCTGTGGTGTCT CGTGAAAGGCTTCTACCCCTCCGACATTGCCGTGGAATGGGAGTCCAACGGCCAGCCTGAGAACAACTAC AAGACCACCCCCCCTGTGCTGGACTCCGACGGCTCATTCTTCCTGTACAGCAAGCTGACAGTGGACAAGT CCCGGTGGCAGCAGGGCAACGTGTTCTCCTGCTCCGTGATGCACGAGGCCCTGCACAACCACTACACCCA GAAGTCCCTGTCCCTGAGCCCCGGCAAATGA |
| 29 | 29 | D1"-Fc2 | MEWSWVFLFFLSVTTGVHSEEELQIIQPDKSVSVA AGESAILHCTITSLFPVGPIQWFRGAGPARVLIYN QRQGPFPRVTTVSETTKRENMDFSISNITPADA GTYYCIKFRKGSPDTEFKSGAGTELSVRAKPSEPK SSDKTHTCPPCPAPELLGGPSVFLFPPKPKDTLMI SRTPEVTCVVVDVSHEDPEVKFNWYVDGVEVHNAK TKPREEQYNSTYRVVSVLTVLHQDWLNGKEYKCKV SNKALPAPIEKTISKAKGQPREPQVYTLPPSRDEL TKNQVSLWCLVKGFYPSDIAVEWESNGQPENNYKT TPPVLDSDGSFFLYSKLTVDKSRWQQGNVFSCSVM HEALHNHYTQKSLSLSPGK | 43 | ATGGAGTGGAGCTGGGTGTTCTTGTTCTTTCTTGTCCGTGACCACGGGGTGCACAGCGAGGAGGAGTTGC AGATCATCCAGCCTGACAAGAGCGTGAGCGTGGCCGCCGGGGAGAGCGCTATTCTGCACTGTACCATCAC CTCCCTCTTCCCCGTGGGCCCCATTCAGTGGTTCAGGGGAGCCGGGCCCGCCAGAGTTCTGATTTACAAC CAGAGGCAGGGCCCCTTTCCCCGGGTTACCACTGTCTCTGAGACCACCAAGCGGGAAACATGGATTTCA GCATCTCCATCAGCAACATTACTCCCGCCGACGCCGGCACCTACTACTGCATCAAATTCAGAAAGGGCTC TCCCGACACCGAATTCAAAAGCGGCGCCGGCACCGAACTGTCCGTGCGAGCTAAGCCTTCCGAGCCCAAA TCCTCAGACAAGACCCACACCTGTCCCCCTTGTCCTGCCCCTGAACTGCTGGGCGGACCTTCCGTGTTCC TGTTCCCCCCAAAGCCCAAGGACACCCTGATGATCTCCCGGACCCCCGAAGTGACCTGCGTGGTGGTGGA TGTGTCCCACGAGGACCCTGAAGTGAAGTTCAATTGGTACGTGGACGGCGTGGAAGTGCACAACGCCAAG ACCAAGCCTAGAGAGGAACAGTACAACTCCACCTACCGGGTGGTGTCCGTGCTGACCGTGCTGCACCAGG ATTGGCTGAACGGCAAAGAGTACAAGTGCAAGGTGTCCAACAAGGCCCTGCCTGCCCCCATCGAAAAGAC CATCTCCAAGGCCAAGGGCCAGCCCCGGGAACCCCAGGTGTACACACTGCCCCCTAGCAGGGACGAGCTG ACCAAGAACCAGGTGTCCCTGTGGTGTCTCGTGAAAGGCTTCTACCCCTCCGACATTGCCGTGGAATGGG AGTCCAACGGCCAGCCTGAGAACAACTACAAGACCACCCCCCCTGTGCTGGACTCCGACGGCTCATTCTT CCTGTACAGCAAGCTGACAGTGGACAAGTCCCGGTGGCAGCAGGGCAACGTGTTCTCCTGCTCCGTGATG CACGAGGCCCTGCACAACCACTACACCCAGAAGTCCCTGTCCCTGAGCCCCGGCAAATGA |

Fig. 17D

| No. | SEQ ID NOs: | Sequence name | Protein sequence |
|---|---|---|---|
| 30 | 30 | D1 | EEELQVIQPDKSVSVAAGESAILHCTVTSLIPVGPIQWFRGAGPARELIYNQKEGHFPRVTTVSESTKRENMDFSISISAITPADAGTYYCVKFRKGSPDTEFKSGAGTELSVRAKP |
| 31 | 31 | D1-D2 | EEELQVIQPDKSVSVAAGESAILHCTVTSLIPVGPIQWFRGAGPARELIYNQKEGHFPRVTTVSESTKRENMDFSISISAITPADAGTYYCVKFRKGSPDTEFKSGAGTELSVRAKPSAPVVSGPAARATPQHTVSFTCESHGFSPRDITLKWFKNGNELSDFQTNVDPVGESVSYSIHSTAKVVLTREDVHSQVICEVAHVTLQGDPLRGTANLS |
| 32 | 32 | D1-D2-D3 | EEELQVIQPDKSVSVAAGESAILHCTVTSLIPVGPIQWFRGAGPARELIYNQKEGHFPRVTTVSESTKRENMDFSISISAITPADAGTYYCVKFRKGSPDTEFKSGAGTELSVRAKPSAPVVSGPAARATPQHTVSFTCESHGFSPRDITLKWFKNGNELSDFQTNVDPVGESVSYSIHSTAKVVLTREDVHSQVICEVAHVTLQGDPLRGTANLSETIRVPPTLEVTQQPVRAENQVNVTCQVRKFYPQRLQLTWLENGNVSRTETASTVTENKDGTYNWMSWLLVNVSAHRDDVKLTC |
| 33 | 33 | D1* | EEELQIIQPDKSVSVAAGESAILHCTITSLFPVGPIQWFRGAGPARVLIYNQRQGPFPRVTTVSETTKRENMDFSISISNITPADAGTYYCIKFRKGSPDTEFKSGAGTELSVRAKPSEPKSS |
| 34 | 44 | D1*-D2-Fc2 | MEWSWVFLFFLSVTTGVHSEEELQIIQPDKSVSVAAGESAILHCTITSLFPVGPIQWFRGAGPARVLIYNQRQGPFPRVTTVSETTKRENMDFSISISNITPADAGTYYCIKFRKGSPDTEFKSGAGTELSVRAKPSEPKSSGPAARATPQHTVSFTCESHGFSPRDITLKWFKNGNELSDFQTNVDPVGESVSYSIHSTAKVVLTREDVHSQVICEVAHVTLQGDPLRGTANLSDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLWCLVKGFYPSDIAVEWESNGQPENNYKTTPPVLDSDGSFFLYSKLTVDKSRWQQGNVFSCSVMHEALHNHYTQKSLSLSPGK |

Fig. 17E

FIG. 18A
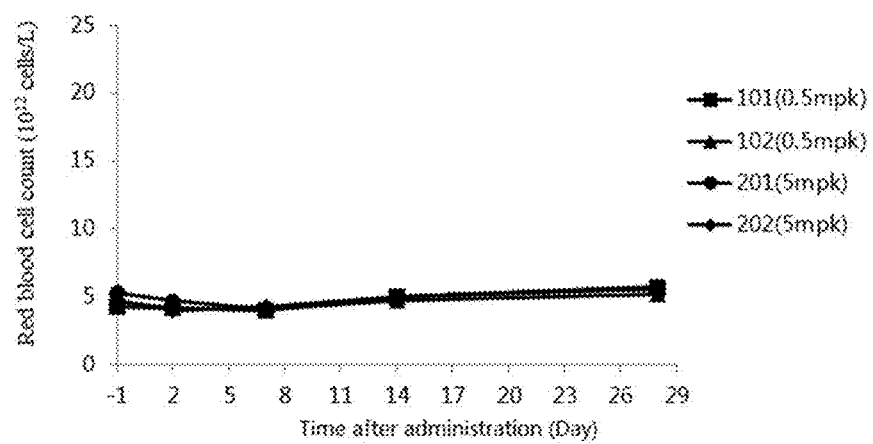
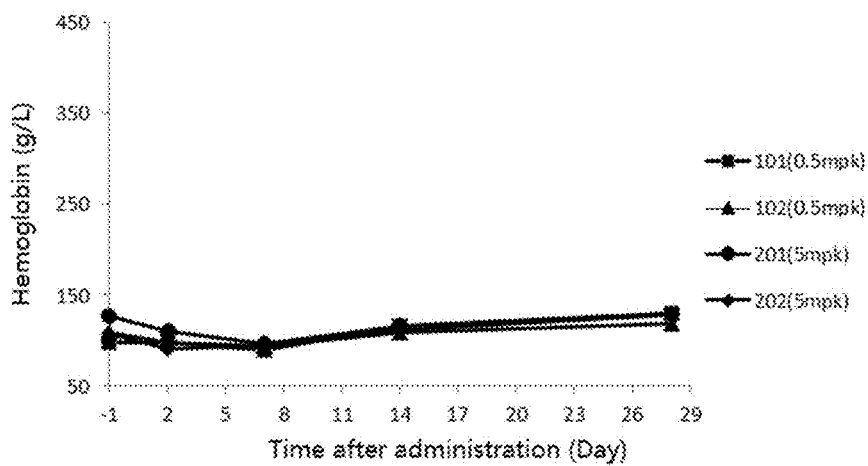
FIG. 18B

SEQUENCE LISTING

```
Sequence total quantity: 44
SEQ ID NO: 1              moltype = AA   length = 471
FEATURE                   Location/Qualifiers
REGION                    1..471
                          note = Ofa heavy chain amino acid sequence
source                    1..471
                          mol_type = protein
                          organism = synthetic construct
SEQUENCE: 1
MEWSWVFLFF LSVTTGVHSE VQLVESGGGL VQPGRSLRLS CAASGFTFND YAMHWVRQAP     60
GKGLEWVSTI SWNSGSIGYA DSVKGRFTIS RDNAKKSLYL QMNSLRAEDT ALYYCAKDIQ    120
YGNYYYGMDV WGQGTTVTVS SASTKGPSVF PLAPSSKSTS GGTAALGCLV KDYFPEPVTV    180
SWNSGALTSG VHTFPAVLQS SGLYSLSSVV TVPSSSLGTQ TYICNVNHKP SNTKVDKKVE    240
PKSCDKTHTC PPCPAPELLG GPSVFLFPPK PKDTLMISRT PEVTCVVVDV SHEDPEVKFN    300
WYVDGVEVHN AKTKPREEQY NSTYRVVSVL TVLHQDWLNG KEYKCKVSNK ALPAPIEKTI    360
SKAKGQPREP QVYTLPPSRD ELTKNQVSLT CLVKGFYPSD IAVEWESNGQ PENNYKTTPP    420
VLDSDGSFFL YSKLTVDKSR WQQGNVFSCS VMHEALHNHY TQKSLSLSPG K             471

SEQ ID NO: 2              moltype = AA   length = 234
FEATURE                   Location/Qualifiers
REGION                    1..234
                          note = Ofa
source                    1..234
                          mol_type = protein
                          organism = synthetic construct
SEQUENCE: 2
MSVPTQVLGL LLLWLTDARC EIVLTQSPAT LSLSPGERAT LSCRASQSVS SYLAWYQQKP     60
GQAPRLLIYD ASNRATGIPA RFSGSGSGTD FTLTISSLEP EDFAVYYCQQ RSNWPITFGQ    120
GTRLEIKRTV AAPSVIFPPP SDEQLKSGTA SVVCLLNNFY PREAKVQWKV DNALQSGNSQ    180
ESVTEQDSKD STYSLSSTLT LSKADYEKHK VYACEVTHQG LSSPVTKSFN RGEC          234

SEQ ID NO: 3              moltype = AA   length = 468
FEATURE                   Location/Qualifiers
REGION                    1..468
                          note = Obi
source                    1..468
                          mol_type = protein
                          organism = synthetic construct
SEQUENCE: 3
MEWSWVFLFF LSVTTGVHSQ VQLVQSGAEV KKPGSSVKVS CKASGYAFSY SWINWVRQAP     60
GQGLEWMGRI FPGDGDTDYN GKFKGRVTIT ADKSTSTAYM ELSSLRSEDT AVYYCARNVF    120
DGYWLVYWGQ GTLVTVSSAS TKGPSVFPLA PSSKSTSGGT AALGCLVKDY FPEPVTVSWN    180
SGALTSGVHT FPAVLQSSGL YSLSSVVTVP SSSLGTQTYI CNVNHKPSNT KVDKKVEPKS    240
CDKTHTCPPC PAPELLGGPS VFLFPPKPKD TLMISRTPEV TCVVVDVSHE DPEVKFNWYV    300
DGVEVHNAKT KPREEQYNST YRVVSVLTVL HQDWLNGKEY KCKVSNKALP APIEKTISKA    360
KGQPREPQVY TLPPSRDELT KNQVSLTCLV KGFYPSDIAV EWESNGQPEN NYKTTPPVLD    420
SDGSFFLYSK LTVDKSRWQQ GNVFSCSVMH EALHNHYTQK SLSLSPGK                 468

SEQ ID NO: 4              moltype = AA   length = 239
FEATURE                   Location/Qualifiers
REGION                    1..239
                          note = Obi/Obi-Fc1
source                    1..239
                          mol_type = protein
                          organism = synthetic construct
SEQUENCE: 4
MSVPTQVLGL LLLWLTDARC DIVMTQTPLS LPVTPGEPAS ISCRSSKSLL HSNGITYLYW     60
YLQKPGQSPQ LLIYQMSNLV SGVPDRFSGS GSGTDFTLKI SRVEAEDVGV YYCAQNLELP    120
YTFGGGTKVE IKRTVAAPSV FIFPPSDEQL KSGTASVVCL LNNFYPREAK VQWKVDNALQ    180
SGNSQESVTE QDSKDSTYSL SSTLTLSKAD YEKHKVYACE VTHQGLSSPV TKSFNRGEC     239

SEQ ID NO: 5              moltype = AA   length = 461
FEATURE                   Location/Qualifiers
REGION                    1..461
                          note = Hu5F9-G4
source                    1..461
                          mol_type = protein
                          organism = synthetic construct
SEQUENCE: 5
MRAWIFFLLC LAGRALAQVQ LVQSGAEVKK PGASVKVSCK ASGYTFTNYN MHWVRQAPGQ     60
RLEWMGTIYP GNDDTSYNQK FKDRVTITAD TSASTAYMEL SSLRSEDTAV YYCARGGYRA    120
MDYWGQGTLV TVSSASTKGP SVFPLAPCSR STSESTAALG CLVKDYFPEP VTVSWNSGAL    180
TSGVHTFPAV LQSSGLYSLS SVVTVPSSSL GTKTYTCNVD HKPSNTKVDK RVESKYGPPC    240
PPCPAPEFLG GPSVFLFPPK PKDTLMISRT PEVTCVVVDV SQEDPEVQFN WYVDGVEVHN    300
AKTKPREEQF NSTYRVVSVL TVLHQDWLNG KEYKCKVSNK GLPSSIEKTI SKAKGQPREP    360
QVYTLPPSQE EMTKNQVSLT CLVKGFYPSD IAVEWESNGQ PENNYKTTPP VLDSDGSFFL    420
YSRLTVDKSR WQEGNVFSCS VMHEALHNHY TQKSLSLSLG K                        461
```

```
SEQ ID NO: 6                moltype = AA  length = 236
FEATURE                     Location/Qualifiers
REGION                      1..236
                            note = Hu5F9-G4
source                      1..236
                            mol_type = protein
                            organism = synthetic construct
SEQUENCE: 6
MRAWIFFLLC LAGRALADIV MTQSPLSLPV TPGEPASISC RSSQSIVYSN GNTYLGWYLQ   60
KPGQSPQLLI YKVSNRFSGV PDRFSGSGSG TDFTLKISRV EAEDVGVYYC FQGSHVPYTF  120
GQGTKLEIKR TVAAPSVFIF PPSDEQLKSG TASVVCLLNN FYPREAKVQW KVDNALQSGN  180
SQESVTEQDS KDSTYSLSST LTLSKADYEK HKVYACEVTH QGLSSPVTKS FNRGEC      236

SEQ ID NO: 7                moltype = AA  length = 466
FEATURE                     Location/Qualifiers
REGION                      1..466
                            note = JMT101
source                      1..466
                            mol_type = protein
                            organism = synthetic construct
SEQUENCE: 7
MRAWIFFLLC LAGRALAQVQ LQESGPGLVK PSETLSLTCT VSGFSLSNYD VHWVRQAPGK   60
GLEWLGVIWS GGNTDYNTPF TSRLTISVDT SKNQFSLKLS SVTAADTAVY YCARALDYYD  120
YEFAYWGQGT LVTVSSASTK GPSVFPLAPS SKSTSGGTAA LGCLVKDYFP EPVTVSWNSG  180
ALTSGVHTFP AVLQSSGLYS LSSVVTVPSS SLGTQTYICN VNHKPSNTKV DKRVEPKSCD  240
KTHTCPPCPA PELLGGPSVF LFPPKPKDTL MISRTPEVTC VVVDVSHEDP EVKFNWYVDG  300
VEVHNAKTKP REEQYNSTYR VVSVLTVLHQ DWLNGKEYKC KVSNKALPAP IEKTISKAKG  360
QPREPQVYTL PPSREEMTKN QVSLTCLVKG FYPSDIAVEW ESNGQPENNY KTTPPVLDSD  420
GSFFLYSKLT VDKSRWQQGN VFSCSVMHEA LHNHYTQKSL SLSPGK                466

SEQ ID NO: 8                moltype = AA  length = 231
FEATURE                     Location/Qualifiers
REGION                      1..231
                            note = JMT101/Anti-EGFR-Fc1
source                      1..231
                            mol_type = protein
                            organism = synthetic construct
SEQUENCE: 8
MRAWIFFLLC LAGRALAEIV LTQSPDFQSV TPKEKVTITC RASQSIGTNI HWYQQKPDQS   60
PKLLIKYASE SISGIPSRFS GSGSGTDFTL TINSLEAEDA ATYYCQQNNE WPTSFGQGTK  120
LEIKRTVAAP SVFIFPPSDE QLKSGTASVV CLLNNFYPRE AKVQWKVDNA LQSGNSQESV  180
TEQDSKDSTY SLSSTLTLSK ADYEKHKVYA CEVTHQGLSS PVTKSFNRGE C           231

SEQ ID NO: 9                moltype = AA  length = 468
FEATURE                     Location/Qualifiers
REGION                      1..468
                            note = Trastuzumab
source                      1..468
                            mol_type = protein
                            organism = synthetic construct
SEQUENCE: 9
MRAWIFFLLC LAGRALAEVQ LVESGGGLVQ PGGSLRLSCA ASGFNIKDTY IHWVRQAPGK   60
GLEWVARIYP TNGYTRYADS VKGRFTISAD TSKNTAYLQM NSLRAEDTAV YYCSRWGGDG  120
FYAMDYWGQG TLVTVSSAST KGPSVFPLAP SSKSTSGGTA ALGCLVKDYF PEPVTVSWNS  180
GALTSGVHTF PAVLQSSGLY SLSSVVTVPS SSLGTQTYIC NVNHKPSNTK VDKKVEPPKS  240
CDKTHTCPPC PAPELLGGPS VFLFPPKPKD TLMISRTPEV TCVVVDVSHE DPEVKFNWYV  300
DGVEVHNAKT KPREEQYNST YRVVSVLTVL HQDWLNGKEY KCKVSNKALP APIEKTISKA  360
KGQPREPQVY TLPPSREEMT KNQVSLTCLV KGFYPSDIAV EWESNGQPEN NYKTTPPVLD  420
SDGSFFLYSK LTVDKSRWQQ GNVFSCSVMH EALHNHYTQK SLSLSPGK               468

SEQ ID NO: 10               moltype = AA  length = 231
FEATURE                     Location/Qualifiers
REGION                      1..231
                            note = Trastuzumab
source                      1..231
                            mol_type = protein
                            organism = synthetic construct
SEQUENCE: 10
MRAWIFFLLC LAGRALADIQ MTQSPSSLSA SVGDRVTITC RASQDVNTAV AWYQQKPGKA   60
PKLLIYSASF LYSGVPSRFS GSRSGTDFTL TISSLQPEDF ATYYCQQHYT TPPTFGQGTK  120
VEIKRTVAAP SVFIFPPSDE QLKSGTASVV CLLNNFYPRE AKVQWKVDNA LQSGNSQESV  180
TEQDSKDSTY SLSSTLTLSK ADYEKHKVYA CEVTHQGLSS PVTKSFNRGE C           231

SEQ ID NO: 11               moltype = AA  length = 359
FEATURE                     Location/Qualifiers
REGION                      1..359
                            note = SIRP D1-Fc
source                      1..359
                            mol_type = protein
```

```
                    organism = synthetic construct
SEQUENCE: 11
MEWSWVFLFF LSVTTGVHSE EELQVIQPDK SVSVAAGESA ILHCTVTSLI PVGPIQWFRG    60
AGPARELIYN QKEGHFPRVT TVSESTKREN MDFSISISAI TPADAGTYYC VKFRKGSPDT   120
EFKSGAGTEL SVDKTHTCPP CPAPELLGGP SVFLFPPKPK DTLMISRTPE VTCVVVDVSH   180
EDPEVKFNWY VDGVEVHNAK TKPREEQYNS TYRVVSVLTV LHQDWLNGKE YKCKVSNKAL   240
PAPIEKTISK AKGQPREPQV YTLPPSRDEL TKNQVSLTCL VKGFYPSDIA VEWESNGQPE   300
NNYKTTPPVL DSDGSFFLYS KLTVDKSRWQ QGNVFSCSVM HEALHNHYTQ KSLSLSPGK    359

SEQ ID NO: 12           moltype = AA   length = 467
FEATURE                 Location/Qualifiers
REGION                  1..467
                        note = Atezolizumab
source                  1..467
                        mol_type = protein
                        organism = synthetic construct
SEQUENCE: 12
MEFWLSWVFL VAILKGVQCE VQLVESGGGL VQPGGSLRLS CAASGFTFSD SWIHWVRQAP    60
GKGLEWVAWI SPYGGSTYYA DSVKGRFTIS ADTSKNTAYL QMNSLRAEDT AVYYCARRHW   120
PGGFDYWGQG TLVTVSSAST KGPSVFPLAP SSKSTSGGTA ALGCLVKDYF PEPVTVSWNS   180
GALTSGVHTF PAVLQSSGLY SLSSVVTVPS SSLGTQTYIC NVNHKPSNTK VDKKVEPKSC   240
DKTHTCPPCP APELLGGPSV FLFPPKPKDT LMISRTPEVT CVVVDVSHED PEVKFNWYVD   300
GVEVHNAKTK PREEQYASTY RVVSVLTVLH QDWLNGKEYK CKVSNKALPA PIEKTISKAK   360
GQPREPQVYT LPPSREEMTK NQVSLTCLVK GFYPSDIAVE WESNGQPENN YKTTPPVLDS   420
DGSFFLYSKL TVDKSRWQQG NVFSCSVMHE ALHNHYTQKS LSLSPGK                 467

SEQ ID NO: 13           moltype = AA   length = 233
FEATURE                 Location/Qualifiers
REGION                  1..233
                        note = Atezolizumab/Anti-PD-L1(Ate)-Fc1
source                  1..233
                        mol_type = protein
                        organism = synthetic construct
SEQUENCE: 13
MEFWLSWVFL VAILKGVQCD IQMTQSPSSL SASVGDRVTI TCRASQDVST AVAWYQQKPG    60
KAPKLLIYSA SFLYSGVPSR FSGSGSGTDF TLTISSLQPE DFATYYCQQY LYHPATFGQG   120
TKVEIKRTVA APSVFIFPPS DEQLKSGTAS VVCLLNNFYP REAKVQWKVD NALQSGNSQE   180
SVTEQDSKDS TYSLSSTLTL SKADYEKHKV YACEVTHQGL SSPVTKSFNR GEC          233

SEQ ID NO: 14           moltype = DNA   length = 1092
FEATURE                 Location/Qualifiers
misc_feature            1..1092
                        note = D1-Fc2 DNA
source                  1..1092
                        mol_type = other DNA
                        organism = synthetic construct
SEQUENCE: 14
atggaatgga gctgggtgtt cctgttcttt ctgtccgtga ccacaggcgt gcattctgaa    60
gaggagctgc aggtcatcca gcccgataag agcgtgtccg tggccgcagg agaatctgcc   120
atcctgcatt gcaccgtgac ctctctgatc cccgtgggcc caatccagtg gttcagagga   180
gccggaccag ctagagagct gatctacaac cagaaggagg gccacttccc cagagtgaca   240
accgtgtccg agtctaccaa gcgggagaac atggacttct ccatctccat ctccgccatc   300
acaccagccg acgccggcac ctactattgc gtgaagttcc ggaagggctc cccagatacc   360
gagtttaaga gcggcgccgg aacagagctg agcgtgcggg ctaagcctga caagacccac   420
acctgtcccc cttgtcctgc ccctgaactg ctgggcggac cttccgtgtt cctgttcccc   480
ccaaagccca aggacaccct gatgatctcc cggacccccg aagtgacctg cgtggtggtg   540
gatgtgtccc acgaggaccc tgaagtgaag ttcaattggt acgtggacgg cgtggaagtg   600
cacaacgcca agaccaagcc tagagaggaa cagtacaact ccacctaccg ggtggtgtcc   660
gtgctgaccg tgctgcacca ggattggctg aacggcaaag agtacaagtg caagtgtgtc   720
aacaaggccc tgcctgcccc catcgaaaag accatctcca aggccaaggg ccagccccgg   780
gaacccaggg tgtacacact gccccctagc agggacgagc tgaccaagaa ccaggtgtcc   840
ctgtggtgtc tcgtgaaagg cttctacccc tccgacattg ccgtggaatg ggagtccaac   900
ggccagcctg agaacaacta caagaccacc ccccctgtgc tggactccga cggctcattc   960
ttcctgtaca gcaagctgac agtggacaag tcccggtggc agcagggcaa cgtgttctcc  1020
tgctccgtga tgcacgaggc cctgcacaac cactacaccc agaagtccct gtccctgagc  1080
cccggcaaat ga                                                      1092

SEQ ID NO: 15           moltype = DNA   length = 1389
FEATURE                 Location/Qualifiers
misc_feature            1..1389
                        note = D1-D2-Fc2 DNA
source                  1..1389
                        mol_type = other DNA
                        organism = synthetic construct
SEQUENCE: 15
atggaatgga gctgggtgtt cctgttcttt ctgtccgtga ccacaggcgt gcattctgaa    60
gaggagctgc aggtcatcca gcccgataag agcgtgtccg tggccgcagg agaatctgcc   120
atcctgcatt gcaccgtgac ctctctgatc cccgtgggcc caatccagtg gttcagagga   180
gccgaccag ctagagagct gatctacaac cagaaggagg gccacttccc cagagtgaca   240
```

```
accgtgtccg agtctaccaa gcgggagaac atggacttct ccatctccat ctccgccatc  300
acaccagccg acgccggcac ctactattgc gtgaagttcc ggaagggctc ccagatacc   360
gagtttaaga gcggcgccgg aacagagctg agcgtgcggg ctaagccttc tgctccagtg  420
gtgtcaggac cagcagctag agctacccct cagcacaccg tgtccttcac ctgcgagtct  480
cacggcttct cccctagaga catcacccetc aagtggttca agaacggcaa cgagctgtcc  540
gacttccaga ccaacgtgga tccagtgggc gagagcgtgt cttactccat ccactccacc  600
gccaaggtgg tgctgacaag ggaggacgtg cactcccagg tcatttgcga ggtggcacac  660
gtgacattgc agggcgaccc cctgaggega accgccaact gagtgacaa gacccacacc  720
tgtccccctt gtcctgcccc tgaactgctg gcggaccttc ccgtgttcct gttcccccca  780
aagcccaagg acaccctgat gatctcccgg acccccgaag tgacctgcgt ggtggtggat  840
gtgtcccacg aggaccctga agtgaagttc aattggtacg tggacggcgt ggaagtgcac  900
aacgccaaga ccaagcctag agaggaacag tacaactcca cctaccgggt ggtgtccgtg  960
ctgaccgtgt tgcaccagga ttggctgaac ggcaaagagt acaagtgcaa ggtgtccaac 1020
aaggccctgc ctgcccccat cgaaaagacc atctccaagg ccaagggcca gccccgggaa 1080
ccccaggtgt acacactgcc ccctagcagg gacgagctga ccaagaacca ggtgtccctg 1140
tggtgtctcg tgaaaggctt ctaccctccc gacattgccg tggaatggga gtccaacggc 1200
cagcctgaga caaactacaa gaccaccccc cctgtgctgg actccgacgg ctcattcttc 1260
ctgtacagca agctgacagt ggacaagtcc cggtggcagc agggcaacgt gttctcctgc 1320
tccgtgatgc acgaggccct gcacaaccac tacacccaga gtccctgtc cctgagcccc 1380
ggcaaatga                                                          1389

SEQ ID NO: 16         moltype = AA   length = 471
FEATURE               Location/Qualifiers
REGION                1..471
                      note = Ofa-Fc1
source                1..471
                      mol_type = protein
                      organism = synthetic construct
SEQUENCE: 16
MEWSWVFLFF LSVTTGVHSE VQLVESGGGL VQPGRSLRLS CAASGFTFND YAMHWVRQAP   60
GKGLEWVSTI SWNSGSIGYA DSVKGRFTIS RDNAKKSLYL QMNSLRAEDT ALYYCAKDIQ  120
YGNYYYGMDV WGQGTTVTVS SASTKGPSVF PLAPSSKSTS GGTAALGCLV KDYFPEPVTV  180
SWNSGALTSG VHTFPAVLQS SGLYSLSSVV TVPSSSLGTQ TYICNVNHKP SNTKVDKKVE  240
PKSCDKTHTC PPCPAPELLG GPSVFLFPPK PKDTLMISRT PEVTCVVVDV SHEDPEVKFN  300
WYVDGVEVHN AKTKPREEQY NSTYRVVSVL TVLHQDWLNG KEYKCKVSNK ALPAPIEKTI  360
SKAKGQPREP QVYTLPPSRD ELTKNQVSLS CAVKGFYPSD IAVEWESNGQ PENNYKTTPP  420
VLDSDGSFFL VSKLTVDKSR WQQGNVFSCS VMHEALHNHY TQKSLSLSPG K          471

SEQ ID NO: 17         moltype = AA   length = 234
FEATURE               Location/Qualifiers
REGION                1..234
                      note = Ofa-Fc1
source                1..234
                      mol_type = protein
                      organism = synthetic construct
SEQUENCE: 17
MSVPTQVLGL LLLWLTDARC EIVLTQSPAT LSLSPGERAT LSCRASQSVS SYLAWYQQKP   60
GQAPRLLIYD ASNRATGIPA RFSGSGSGTD FTLTISSLEP EDFAVYYCQQ RSNWPITFGQ  120
GTRLEIKRTV AAPSVIFPPS DEQLKSGTA SVVCLLNNFY PREAKVQWKV DNALQSGNSQ   180
ESVTEQDSKD STYSLSSTLT LSKADYEKHK VYACEVTHQG LSSPVTKSFN RGEC        234

SEQ ID NO: 18         moltype = AA   length = 468
FEATURE               Location/Qualifiers
REGION                1..468
                      note = Obi-Fc1
source                1..468
                      mol_type = protein
                      organism = synthetic construct
SEQUENCE: 18
MEWSWVFLFF LSVTTGVHSQ VQLQESGPGL VKPSETLSLT CTVSGFSLSN YDVHWVRQAP   60
GKGLEWLGVI WSGGNTDYNT PFTSRLTISV DTSKNQFSLK LSSVTAADTA VYYCARALDY  120
YDYEFAYWGQ GTLVTVSSAS TKGPSVFPLA PSSKSTSGGT AALGCLVKDY FPEPVTVSWN  180
SGALTSGVHT FPAVLQSSGL YSLSSVVTVP SSSLGTQTYI CNVNHKPSNT KVDKKVEPKS  240
CDKTHTCPPC PAPELLGGPS VFLFPPKPKD TLMISRTPEV TCVVVDVSHE DPEVKFNWYV  300
DGVEVHNAKT KPREEQYNST YRVVSVLTVL HQDWLNGKEY KCKVSNKALP APIEKTISKA  360
KGQPREPQVY TLPPSRDELT KNQVSLSCAV KGFYPSDIAV EWESNGQPEN NYKTTPPVLD  420
SDGSFFLVSK LTVDKSRWQQ GNVFSCSVMH EALHNHYTQK SLSLSPGK              468

SEQ ID NO: 19         moltype = AA   length = 468
FEATURE               Location/Qualifiers
REGION                1..468
                      note = Anti-EGFR-Fc1
source                1..468
                      mol_type = protein
                      organism = synthetic construct
SEQUENCE: 19
MEWSWVFLFF LSVTTGVHSQ VQLQESGPGL VKPSETLSLT CTVSGFSLSN YDVHWVRQAP   60
GKGLEWLGVI WSGGNTDYNT PFTSRLTISV DTSKNQFSLK LSSVTAADTA VYYCARALDY  120
YDYEFAYWGQ GTLVTVSSAS TKGPSVFPLA PSSKSTSGGT AALGCLVKDY FPEPVTVSWN  180
```

```
SGALTSGVHT FPAVLQSSGL YSLSSVVTVP SSSLGTQTYI CNVNHKPSNT KVDKKVEPKS    240
CDKTHTCPPC PAPELLGGPS VFLFPPKPKD TLMISRTPEV TCVVVDVSHE DPEVKFNWYV    300
DGVEVHNAKT KPREEQYNST YRVVSVLTVL HQDWLNGKEY KCKVSNKALP APIEKTISKA    360
KGQPREPQVY TLPPSRDELT KNQVSLSCAV KGFYPSDIAV EWESNGQPEN NYKTTPPVLD    420
SDGSFFLVSK LTVDKSRWQQ GNVFSCSVMH EALHNHYTQK SLSLSPGK                 468

SEQ ID NO: 20           moltype = AA   length = 469
FEATURE                 Location/Qualifiers
REGION                  1..469
                        note = Anti-Her2(T)-Fc1
source                  1..469
                        mol_type = protein
                        organism = synthetic construct
SEQUENCE: 20
MEWSWVFLFF LSVTTGVHSE VQLVESGGGL VQPGGSLRLS CAASGFNIKD TYIHWVRQAP    60
GKGLEWVARI YPTNGYTRYA DSVKGRFTIS ADTSKNTAYL QMNSLRAEDT AVYYCSRWGG    120
DGFYAMDYWG QGTLVTVSSA STKGPSVFPL APSSKSTSGG TAALGCLVKD YFPEPVTVSW    180
NSGALTSGVH TFPAVLQSSG LYSLSSVVTV PSSSLGTQTY ICNVNHKPSN TKVDKKVEPK    240
SCDKTHTCPP CPAPELLGGP SVFLFPPKPK DTLMISRTPE VTCVVVDVSH EDPEVKFNWY    300
VDGVEVHNAK TKPREEQYNS TYRVVSVLTV LHQDWLNGKE YKCKVSNKAL PAPIEKTISK    360
AKGQPREPQV YTLPPSRDEL TKNQVSLSCA VKGFYPSDIA VEWESNGQPE NNYKTTPPVL    420
DSDGSFFLVS KLTVDKSRWQ QGNVFSCSVM HEALHNHYTQ KSLSLSPGK                469

SEQ ID NO: 21           moltype = AA   length = 234
FEATURE                 Location/Qualifiers
REGION                  1..234
                        note = Anti-Her2(T)-Fc1
source                  1..234
                        mol_type = protein
                        organism = synthetic construct
SEQUENCE: 21
MSVPTQVLGL LLLWLTDARC DIQMTQSPSS LSASVGDRVT ITCRASQDVN TAVAWYQQKP    60
GKAPKLLIYS ASFLYSGVPS RFSGSRSGTD FTLTISSLQP EDFATYYCQQ HYTTPPTFGQ    120
GTKVEIKRTV AAPSVFIFPP SDEQLKSGTA SVVCLLNNFY PREAKVQWKV DNALQSGNSQ    180
ESVTEQDSKD STYSLSSTLT LSKADYEKHK VYACEVTHQG LSSPVTKSFN RGEC          234

SEQ ID NO: 22           moltype = AA   length = 468
FEATURE                 Location/Qualifiers
REGION                  1..468
                        note = Anti-Her2(P)-Fc1
source                  1..468
                        mol_type = protein
                        organism = synthetic construct
SEQUENCE: 22
MEWSWVFLFF LSVTTGVHSE VQLVESGGGL VQPGGSLRLS CAASGFTFTD YTMDWVRQAP    60
GKGLEWVADV NPNSGGSIYN QRFKGRFTLS VDRSKNTLYL QMNSLRAEDT AVYYCARNLG    120
PSFYFDYWGQ GTLVTVSSAS TKGPSVFPLA PSSKSTSGGT AALGCLVKDY FPEPVTVSWN    180
SGALTSGVHT FPAVLQSSGL YSLSSVVTVP SSSLGTQTYI CNVNHKPSNT KVDKKVEPKS    240
CDKTHTCPPC PAPELLGGPS VFLFPPKPKD TLMISRTPEV TCVVVDVSHE DPEVKFNWYV    300
DGVEVHNAKT KPREEQYNST YRVVSVLTVL HQDWLNGKEY KCKVSNKALP APIEKTISKA    360
KGQPREPQVY TLPPSRDELT KNQVSLSCAV KGFYPSDIAV EWESNGQPEN NYKTTPPVLD    420
SDGSFFLVSK LTVDKSRWQQ GNVFSCSVMH EALHNHYTQK SLSLSPGK                 468

SEQ ID NO: 23           moltype = AA   length = 234
FEATURE                 Location/Qualifiers
REGION                  1..234
                        note = Anti-Her2(P)-Fc1
source                  1..234
                        mol_type = protein
                        organism = synthetic construct
SEQUENCE: 23
MSVPTQVLGL LLLWLTDARC DIQMTQSPSS LSASVGDRVT ITCKASQDVS IGVAWYQQKP    60
GKAPKLLIYS ASYRYTGVPS RFSGSGSGTD FTLTISSLQP EDFATYYCQQ YYIYPYTFGQ    120
GTKVEIKRTV AAPSVFIFPP SDEQLKSGTA SVVCLLNNFY PREAKVQWKV DNALQSGNSQ    180
ESVTEQDSKD STYSLSSTLT LSKADYEKHK VYACEVTHQG LSSPVTKSFN RGEC          234

SEQ ID NO: 24           moltype = AA   length = 467
FEATURE                 Location/Qualifiers
REGION                  1..467
                        note = Anti-PD-L1(Ate)-Fc1
source                  1..467
                        mol_type = protein
                        organism = synthetic construct
SEQUENCE: 24
MEWSWVFLFF LSVTTGVHSE VQLVESGGGL VQPGGSLRLS CAASGFTFSD SWIHWVRQAP    60
GKGLEWVAWI SPYGGSTYYA DSVKGRFTIS ADTSKNTAYL QMNSLRAEDT AVYYCARRHW    120
PGGFDYWGQG TLVTVSSAST KGPSVFPLAP SSKSTSGGTA ALGCLVKDYF PEPVTVSWNS    180
GALTSGVHTF PAVLQSSGLY SLSSVVTVPS SSLGTQTYIC NVNHKPSNTK VDKKVEPKSC    240
DKTHTCPPCP APELLGGPSV FLFPPKPKDT LMISRTPEVT CVVVDVSHED PEVKFNWYVD    300
```

```
GVEVHNAKTK PREEQYNSTY RVVSVLTVLH QDWLNGKEYK CKVSNKALPA PIEKTISKAK    360
GQPREPQVYT LPPSRDELTK NQVSLSCAVK GFYPSDIAVE WESNGQPENN YKTTPPVLDS    420
DGSFFLVSKL TVDKSRWQQG NVFSCSVMHE ALHNHYTQKS LSLSPGK                  467

SEQ ID NO: 25              moltype = DNA   length = 1641
FEATURE                    Location/Qualifiers
misc_feature               1..1641
                           note = D1-D2-D3-Fc2 DNA
source                     1..1641
                           mol_type = other DNA
                           organism = synthetic construct
SEQUENCE: 25
atggaatgga gctgggtgtt cctgttcttt ctgtccgtga ccacaggcgt gcattctgaa    60
gaggagctgc aggtcatcca gcccgataag agcgtgtccg tggccgcagg agaatctgcc   120
atcctgcatt gcaccgtgac ctctctgatc cccgtgggcc caatccagtg gttcagagga   180
gccgaccag ctagagagct gatctacaac cagaaggagg gccacttccc cagagtgaca    240
accgtgtccg agtctaccaa gcgggagaac atggacttct ccatctccat ctccgccatc   300
acaccagca acgccggcac ctactattgc gtgaagttcc ggaagggctc cccagataca   360
gagtttaaga gcggcgccgg aacagagctg agcgtgcggg ctaagccttc tgctccagtg   420
gtgtcaggac cagcagctag agctacccct cagcacaccg tgtccttcac ctgcgagtct   480
cacggcttct cccctagaga catcaccctc aagtggttca agaacggcaa cgagctgtcc   540
gacttccaga ccaacgtgga tccagtgggc gagagcgtgt cttactccat ccactccacc   600
gccaaggtgg tgctgacaag ggaggacgtg cactcccagg tcatttgcga ggtggcacac   660
gtgacattgc agggcgaccc cctgagaggc acagcaaact gagcgagac aattagagtg    720
cccccaccc tggaagttac acagcagccc gttagagccg agaaccaggt caacgtcacc    780
tgccagtca gaaagtttta tccacagaga ctgcagctga cctggctcga gaacggaaac   840
gtgagcagaa cagagaccgc cagcaccgtg acagaagaaca aggacgggga ctacaactgg   900
atgagttggc tgctggtgaa cgtcagcgcc cacagagacg acgtcaagct gacctgcgac   960
aagacccaca cctgtccccc ttgtcctgcc cctgaactgc tgggcggacc ttccgtgttc   1020
ctgttccccc caaagcccaa ggacacccta tgatctccc agtgacctgc                1080
gtggtggtgg atgtgtccca cgaggaccct gaagtgaagt tcaattggta cgtggacggc   1140
gtggaagtgc acaacgccaa gaccaagcct agagaggaac agtacaactc cacctaccgg   1200
gtggtgtccg tgctgaccgt gctgcaccag gattggctga acggcaaaga gtacaagtgc   1260
aaggtgtcca acaaggccct gcctgccccc atcgaaaaga ccatctccaa ggccaagggc   1320
cagcccccgg aaccccaggt gtacacactg cccctagca gggacgagct gaccaagaac   1380
caggtgtccc tgtggtgtct cgtgaaaggc ttctacccct ccgacattgc cgtggaatgc   1440
gagtccaacg gccagcctga gaacaactac aagaccaccc ccctgtgct ggactccgac   1500
ggctcattt tcctgtacag caagctgaca gtggacaagt cccggtggca gcagggcaac    1560
gtgttctcct gctccgtgat gcacgaggcc ctgcacaacc actacaccca gaagtccctg   1620
tccctgagcc ccggcaaatg a                                             1641

SEQ ID NO: 26              moltype = AA   length = 363
FEATURE                    Location/Qualifiers
REGION                     1..363
                           note = D1-Fc2
source                     1..363
                           mol_type = protein
                           organism = synthetic construct
SEQUENCE: 26
MEWSWVFLFF LSVTTGVHSE EELQVIQPDK SVSVAAGESA ILHCTVTSLI PVGPIQWFRG    60
AGPARELIYN QKEGHFPRVT TVSESTKREN MDFSISISAI TPADAGTYYC VKFRKGSPDT   120
EFKSGAGTEL SVRAKPDKTH TCPPCPAPEL LGGPSVFLFP PKPKDTLMIS RTPEVTCVVV   180
DVSHEDPEVK FNWYVDGVEV HNAKTKPREE QYNSTYRVVS VLTVLHQDWL NGKEYKCKVS   240
NKALPAPIEK TISKAKGQPR EPQVYTLPPS RDELTKNQVS LWCLVKGFYP SDIAVEWESN   300
GQPENNYKTT PPVLDSDGSF FLYSKLTVDK SRWQQGNVFS CSVMHEALHN HYTQKSLSLS   360
PGK                                                                 363

SEQ ID NO: 27              moltype = AA   length = 462
FEATURE                    Location/Qualifiers
REGION                     1..462
                           note = D1-D2-Fc2
source                     1..462
                           mol_type = protein
                           organism = synthetic construct
SEQUENCE: 27
MEWSWVFLFF LSVTTGVHSE EELQVIQPDK SVSVAAGESA ILHCTVTSLI PVGPIQWFRG    60
AGPARELIYN QKEGHFPRVT TVSESTKREN MDFSISISAI TPADAGTYYC VKFRKGSPDT   120
EFKSGAGTEL SVRAKPSAPV VSGPAARATP QHTVSFTCES HGFSPRDITL KWFKNGNELS   180
DFQTNVDPVG ESVSYSIHST AKVVLTREDV HSQVICEVAH VTLQGDPLRG TANLSDKTHT   240
CPPCPAPELL GGPSVFLFPP KPKDTLMISR TPEVTCVVVD VSHEDPEVKF NWYVDGVEVH   300
NAKTKPREEQ YNSTYRVVSV LTVLHQDWLN GKEYKCKVSN KALPAPIEKT ISKAKGQPRE   360
PQVYTLPPSR DELTKNQVSL WCLVKGFYPS DIAVEWESNG QPENNYKTTP PVLDSDGSFF   420
LYSKLTVDKS RWQQGNVFSC SVMHEALHNH YTQKSLSLSP GK                      462

SEQ ID NO: 28              moltype = AA   length = 546
FEATURE                    Location/Qualifiers
REGION                     1..546
                           note = D1-D2-D3-Fc2
source                     1..546
```

```
                        mol_type = protein
                        organism = synthetic construct
SEQUENCE: 28
MEWSVVFLFF  LSVTTGVHSE  EELQVIQPDK  SVSVAAGESA  ILHCTVTSLI  PVGPIQWFRG   60
AGPARELIYN  QKEGHFPRVT  TVSESTKREN  MDFSISISAI  TPADAGTYYC  VKFRKGSPDT  120
EFKSGAGTEL  SVRAKPSAPV  VSGPAARATP  QHTVSFTCES  HGFSPRDITL  KWFKNGNELS  180
DFQTNVDPVG  ESVSYSIHST  AKVVLTREDV  HSQVICEVAH  VTLQGDPLRG  TANLSETIRV  240
PPTLEVTQQP  VRAENQVNVT  CQVRKFYPQR  LQLTWLENGN  VSRTETASTV  TENKDGTYNW  300
MSWLLVNVSA  HRDDVKLTCD  KTHTCPPCPA  PELLGGPSVF  LFPPKPKDTL  MISRTPEVTC  360
VVVDVSHEDP  EVKFNWYVDG  VEVHNAKTKP  REEQYNSTYR  VVSVLTVLHQ  DWLNGKEYKC  420
KVSNKALPAP  IEKTISKAKG  QPREPQVYTL  PPSRDELTKN  QVSLWCLVKG  FYPSDIAVEW  480
ESNGQPENNY  KTTPPVLDSD  GSFFLYSKLT  VDKSRWQQGN  VFSCSVMHEA  LHNHYTQKSL  540
SLSPGK                                                                 546

SEQ ID NO: 29          moltype = AA  length = 369
FEATURE                Location/Qualifiers
REGION                 1..369
                       note = D1m-Fc2
source                 1..369
                       mol_type = protein
                       organism = synthetic construct
SEQUENCE: 29
MEWSVVFLFF  LSVTTGVHSE  EELQIIQPDK  SVSVAAGESA  ILHCTITSLF  PVGPIQWFRG   60
AGPARVLIYN  QRQGPFPRVT  TVSETTKREN  MDFSISISNI  TPADAGTYYC  IKFRKGSPDT  120
EFKSGAGTEL  SVRAKPSEPK  SSDKTHTCPP  CPAPELLGGP  SVFLFPPKPK  DTLMISRTPE  180
VTCVVVDVSH  EDPEVKFNWY  VDGVEVHNAK  TKPREEQYNS  TYRVVSVLTV  LHQDWLNGKE  240
YKCKVSNKAL  PAPIEKTISK  AKGQPREPQV  YTLPPSRDEL  TKNQVSLWCL  VKGFYPSDIA  300
VEWESNGQPE  NNYKTTPPVL  DSDGSFFLYS  KLTVDKSRWQ  QGNVFSCSVM  HEALHNHYTQ  360
KSLSLSPGK                                                              369

SEQ ID NO: 30          moltype = AA  length = 117
FEATURE                Location/Qualifiers
REGION                 1..117
                       note = D1
source                 1..117
                       mol_type = protein
                       organism = synthetic construct
SEQUENCE: 30
EEELQVIQPD  KSVSVAAGES  AILHCTVTSL  IPVGPIQWFR  GAGPARELIY  NQKEGHFPRV   60
TTVSESTKRE  NMDFSISISA  ITPADAGTYY  CVKFRKGSPD  TEFKSGAGTE  LSVRAKP     117

SEQ ID NO: 31          moltype = AA  length = 216
FEATURE                Location/Qualifiers
REGION                 1..216
                       note = D1-D2
source                 1..216
                       mol_type = protein
                       organism = synthetic construct
SEQUENCE: 31
EEELQVIQPD  KSVSVAAGES  AILHCTVTSL  IPVGPIQWFR  GAGPARELIY  NQKEGHFPRV   60
TTVSESTKRE  NMDFSISISA  ITPADAGTYY  CVKFRKGSPD  TEFKSGAGTE  LSVRAKPSAP  120
VVSGPAARAT  PQHTVSFTCE  SHGFSPRDIT  LKWFKNGNEL  SDFQTNVDPV  GESVSYSIHS  180
TAKVVLTRED  VHSQVICEVA  HVTLQGDPLR  GTANLS                              216

SEQ ID NO: 32          moltype = AA  length = 300
FEATURE                Location/Qualifiers
REGION                 1..300
                       note = D1-D2-D3
source                 1..300
                       mol_type = protein
                       organism = synthetic construct
SEQUENCE: 32
EEELQVIQPD  KSVSVAAGES  AILHCTVTSL  IPVGPIQWFR  GAGPARELIY  NQKEGHFPRV   60
TTVSESTKRE  NMDFSISISA  ITPADAGTYY  CVKFRKGSPD  TEFKSGAGTE  LSVRAKPSAP  120
VVSGPAARAT  PQHTVSFTCE  SHGFSPRDIT  LKWFKNGNEL  SDFQTNVDPV  GESVSYSIHS  180
TAKVVLTRED  VHSQVICEVA  HVTLQGDPLR  GTANLSETIR  VPPTLEVTQQ  PVRAENQVNV  240
TCQVRKFYPQ  RLQLTWLENG  NVSRTETAST  VTENKDGTYN  WMSWLLVNVS  AHRDDVKLTC  300

SEQ ID NO: 33          moltype = AA  length = 123
FEATURE                Location/Qualifiers
REGION                 1..123
                       note = D1m
source                 1..123
                       mol_type = protein
                       organism = synthetic construct
SEQUENCE: 33
EEELQIIQPD  KSVSVAAGES  AILHCTITSL  FPVGPIQWFR  GAGPARVLIY  NQRQGPFPRV   60
TTVSETTKRE  NMDFSISISN  ITPADAGTYY  CIKFRKGSPD  TEFKSGAGTE  LSVRAKPSEP  120
KSS                                                                    123
```

```
SEQ ID NO: 34          moltype = DNA   length = 1416
FEATURE                Location/Qualifiers
misc_feature           1..1416
                       note = Ofa-Fc1    DNA
source                 1..1416
                       mol_type = other DNA
                       organism = synthetic construct
SEQUENCE: 34
atggaatgga gctgggtgtt cctgttcttt ctgtccgtga ccacaggcgt gcattctgaa   60
gtgcagctgg tggaatctgg cggcggactg gtgcagcctg gcagatccct gagactgtct  120
tgtgccgcct ccggcttcac cttcaacgac tacgccatgc actgggtgcg acaggcccct  180
ggcaaaggcc tggaatgggt gtccaccatc agctggaact ccggctccat cggctacgcc  240
gactccgtga agggccggtt caccatctcc cgggacaacg ccaagaagtc cctgtacctg  300
cagatgaact ccctgcgggc cgaggacacc gccctgtact actgtgccaa ggacatccag  360
tacggcaact actactacgg catggacgtg tggggccagg gcaccacagt gaccgtgtca  420
tctgcttcta ccaagggccc ctccgtgttt cctctggccc cttccagcaa gtccacctcc  480
ggcggaacag ccgctctggg ctgcctcgtg aaggactact tccccgagcc tgtgaccgtg  540
tcctggaact ctggcgctct gacatccggc gtgcacacct tccctgctgt gctgcagtct  600
agcggcctgt actccctgtc ctccgtcgtg accgtgcctt ccagctctct gggcacccag  660
acctacatct gcaacgtgaa ccacaagccc tccaacacca aggtggacaa gaaggtggaa  720
cccaagtcct gcgacaagac ccacacctgt ccccccttgt ctgccccctga actgctgggc  780
ggaccttccg tgttcctgtt ccccccaaag cccaaggaca ccctgatgat ctcccggacc  840
cccgaagtga cctgcgtggt ggtggatgtg tcccacgagg accctgaagt gaagttcaat  900
tggtacgtgg acggcgtgga agtgcacaac gccaagacca gcctagaga gaacagtac  960
aactccacct accgggtggt gtccgtgctc accgtgctgc accaggattg gctgaacggc 1020
aaagagtaca agtgcaaggt gtccaacaag gccctgcctg cccccatcga aaagaccatc 1080
tccaaggcca agggccagcc ccgggaaccc caggtgtaca cactgccccc tagcagggac 1140
gagctgacca gaaccaggt gtccctgagc tgtgcagtga aaggcttcta ccctcccgac 1200
attgccgtgg aatgggagtc caacggccag cctgagaaca actacaagac caccccccct 1260
gtgctggact ccgacggctc attcttcctg gtgagcaagc tgacagtgga caagtcccgg 1320
tggcagcagg gcaacgtgtt ctcctgctcc gtgatgcacg aggccctgca caaccactac 1380
acccagaagt ccctgtccct gagccccggc aaatga                            1416

SEQ ID NO: 35          moltype = DNA   length = 705
FEATURE                Location/Qualifiers
misc_feature           1..705
                       note = Ofa-Fc1    DNA
source                 1..705
                       mol_type = other DNA
                       organism = synthetic construct
SEQUENCE: 35
atgtctgtgc ctacccaggt gctgggactg ctgctgctgt ggctgacaga cgcccgctgt   60
gagatcgtgc tgacccagtc tcctgccacc ctgtctctga ccctggcga gagagctacc  120
ctgtcctgca gagcctccca gtccgtgtcc tcttacctgg cctggtatca gcagaagccc  180
ggccaggctc cccggctgct gatctacgat gcctccaata gagccaccgg catccctgcc  240
agattctccg gctctggctc tggcaccgac tttaccctga ccatctccag cctggaaccc  300
gaggacttcg ccgtgtacta ctgccagcag cggtccaact ggcccatcac ctttggccag  360
ggcacccggc tggaaatcaa gagaaccgtg gccgctccct ccgtgttcat cttcccacct  420
tccgacgagc agctgaagtc cggcaccgct tctgtcgtgt gcctgctgaa caacttctac  480
ccccgcgagg ccaaggtgca gtggaaggtg gacaacgccc tgcagtccgg caactcccag  540
gaatccgtga ccgagcagga ctccaaggac agcacctact ccctgtcctc caccctgacc  600
ctgtccaagg ccgactacga aagcacaag gtgtacgcct gcgaagtgac ccaccagggc  660
ctgtctagcc ccgtgaccaa gtctttcaac cggggcgagt gctga                  705

SEQ ID NO: 36          moltype = DNA   length = 1407
FEATURE                Location/Qualifiers
misc_feature           1..1407
                       note = Obi-Fc1    DNA
source                 1..1407
                       mol_type = other DNA
                       organism = synthetic construct
SEQUENCE: 36
atggaatgga gctgggtgtt cctgttcttt ctgtccgtga ccacaggcgt gcattctcag   60
gtgcagctgg tgcagtctgg cgccgaagtg aagaaacccg gctcctccgt gaaggtgtcc  120
tgcaaggctt ccggctacgc cttctcctac tcctggatca actgggtgcg acaggcccct  180
ggacaggggc tggaatggat gggcagaatc ttccctggcg acggcgacac cgactacaac  240
ggcaagttca agggcagagt gaccatcacc gccgacaagt ccacctccag cgcctacatg  300
gaactgtcct ccctgcggga cgaggacacc gccgtgtact actgcgcccg gaacgtgttc  360
gacggctact ggctggtgta ttggggccag ggcaccctcg tgaccgtgtc ctctgcttct  420
accaagggcc cctccgtgtt tcctctggcc cttccagca gtccacctc tggcggaaca  480
gccgctctgg gctgcctcgt gaaggactac ttccccgagc ctgtgaccgt gtcctggaac  540
tctggcgctc tgacatccgg cgtgcacacc ttccctgctg tgctgcagtc tagcggcctg  600
tactccctgt cctccgtcgt gaccgtgcct tccagctctc tgggcaccca gacctacatc  660
tgcaacgtga accacaagcc ctccaacacc aaggtggaca gaaggtgga acccaagtcc  720
tgcgacaaga cccacacctg tcccccttgt cctgccccctg aactgctggg cggacctttcc  780
gtgttcctgt ccccccaaa gcccaaggac accctgatga tctcccggac ccccgaagtg  840
acctgcgtgg tggtggatgt gtcccacgag gaccctgaag tgaagttcaa ttggtacgtg  900
gacggcgtgg aagtgcacaa cgccaagacc agcctagaga ggaacagta caactccacc  960
```

```
taccgggtgg tgtccgtgct gaccgtgctg caccaggatt ggctgaacgg caaagagtac 1020
aagtgcaagg tgtccaacaa ggccctgcct gcccccatcg aaaagaccat ctccaaggcc 1080
aagggccagc cccgggaacc ccaggtgtac acactgcccc ctagcaggga cgagctgacc 1140
aagaaccagg tgtccctgtc ctgtgctgtg aaaggcttct acccctccga cattgccgtg 1200
gaatgggagt ccaacggcca gcctgagaac aactacaaac ccccccccc tgtgctggac 1260
tccgacggct cattcttcct ggtgagcaag ctgacagtgg acaagtcccg gtggcagcag 1320
ggcaacgtgt tctcctgctc cgtgatgcac gaggccctgc acaaccacta cacccagaag 1380
tccctgtccc tgagcccggg caaatga                                    1407
```

| | |
|---|---|
| SEQ ID NO: 37 | moltype = DNA length = 1407 |
| FEATURE | Location/Qualifiers |
| misc_feature | 1..1407 |
| | note = Anti-EGFR-Fc1 DNA |
| source | 1..1407 |
| | mol_type = other DNA |
| | organism = synthetic construct |

SEQUENCE: 37
```
atggaatgga gctgggtgtt cctgttctttt ctgtccgtga ccacaggcgt gcattctcag  60
gtccagctcc aggaaagcgg ccccggcctc gtcaaaccct ccgagacact ctccctcaca 120
tgcacagtct ccggcttctc cctcagcaac tacgacgtcc actgggtcag caggcccccc 180
ggcaaaggac tggaatggct cggcgtcatc tggtccggcg aaacaccgga ctacaacacc 240
ccattcacct ccaggctcac catctccgtg gacacctcca agaaccagtt ctcccctcaaa 300
ctgagctccg tgaccgccgc cgacaccgct gtctattatt gcgccagagc cctcgactac 360
tacgactacg aattcgccta ctggggccag ggcaccctgg tgaccgtgtc atctgcttct 420
accaaggccc cctccgtgtt tcctctggcc cttccagca agtccacctc tggcggaaca 480
gccgctctgg ctgcctcgt gaaggactac ttccccgagc ctgtgaccgt gtcctggaac 540
tctggcgctc tgacatccgg cgtgcacacc ttccctgctg tgctgcagtc tagcggcctg 600
tactccctgt cctccgtcgt gaccgtgcct tccagctctc tgggcaccca gacctacatc 660
tgcaacgtga accacaagcc ctccaacacc aaggtggaca gaaggtgga acccaagtcc 720
tgcgacaaga cccacacctg tcccccttgt cctgcccctg aactgctggg cggacctcc 780
gtgttcctgt tcccccaaa gcccaaggac accctgatga tctcccggac ccccgaagtg 840
acctgcgtgg tggtggatgt gtcccacgag gaccctgaag tgaagttcaa ttggtacgtg 900
gacggcgtgg aagtgcacaa cgccaagacc aagcctagag gaacagta caactccacc 960
tacccgggtgg tgtccgtgct gaccgtgctg caccaggatt ggctgaacgg caaagagtac 1020
aagtgcaagg tgtccaacaa ggccctgcct gcccccatcg aaaagaccat ctccaaggcc 1080
aagggccagc cccgggaacc ccaggtgtac acactgcccc ctagcaggga cgagctgacc 1140
aagaaccagg tgtccctgag ctgtgcagtg aaaggcttct acccctccga cattgccgtg 1200
gaatgggagt ccaacggcca gcctgagaac aactacaaga ccaccccccc tgtgctggac 1260
tccgacggct cattcttcct ggtgagcaag ctgacagtgg acaagtcccg gtggcagcag 1320
ggcaacgtgt tctcctgctc cgtgatgcac gaggccctgc acaaccacta cacccagaag 1380
tccctgtccc tgagcccggg caaatga                                    1407
```

| | |
|---|---|
| SEQ ID NO: 38 | moltype = DNA length = 1410 |
| FEATURE | Location/Qualifiers |
| misc_feature | 1..1410 |
| | note = Anti-Her2(T)-Fc1 DNA |
| source | 1..1410 |
| | mol_type = other DNA |
| | organism = synthetic construct |

SEQUENCE: 38
```
atggaatgga gctgggtgtt cctgttctttt ctgtccgtga ccacaggcgt gcattctgag  60
gtgcagttgg tggagagcgg ggggggctg gtgcagcctg gaggaagttt gaggttgagc 120
tgtgccgcaa gcgggttcaa cattaaggac acatacattc actgggtgag gcaggcaccc 180
ggaaagggac tggagtgggt ggctaggatc tacccacca acggctacac aagtacgcc 240
gacagtgtga agggccggtt caccatttcc gccgacacct ccaagaacac cgcctacctg 300
cagatgaaca gcctgagggc cgaggacacc gccgtctact actgctccag gtggggagga 360
gacggattct atgctatgga ctactgggga caggcaccc tggtgaccgt gtcatctgct 420
tctaccaagg gcccctccgt gtttcctctg gccccttcca gcaagtccac ctctggcgga 480
acagccgctc tgggctgcct cgtgaaggac tacttcccg agcctgtgac cgtgtcctgg 540
aactctggcg ctctgacatc cggcgtgcac accttccctg ctgtgctgca gtctagcggc 600
ctgtactccc tgtcctccgt cgtgaccgtg ccttccagct ctctgggcac ccagacctac 660
atctgcaacg tgaaccacaa gccctccaac accaaggtgg acaagaaggt ggaacccaag 720
tcctgcgaca gagacccacac ctgtcccccct tgtcctgccc ctgaactgct gggcggacct 780
tccgtgttcc tgttccccc aaagcccaag gacaccctga tgatctcccg gacccccgaa 840
gtgacctgcg tggtggtgga tgtgtcccac gaggaccctg aagtgaagtt caattggtac 900
gtggacggcg tggaagtgca caacgccaag accaagccta gaggaacag tacaactcc 960
acctaccggg tggtgtccgt gctgaccgtg ctgcaccagg attggctgaa cggcaaagag 1020
tacaagtgca aggtgtccaa caaggccctg cctgcccccca tcgaaaagac catctccaag 1080
gccaagggcc agccccggga accccaggtg tacacactgc ccctagcag ggacgagctc 1140
accaagaacc aggtgtccct gagctgtgca gtgaaaggct tctacccctc cgacattgcc 1200
gtggaatggg agtccaacgg ccagcctgag aacaactaca agaccacccc cctgtgctg 1260
gactccgacg gctcattctt cctggtgagc aagctgacag tggacaagtc ccggtggcag 1320
cagggcaacg tgttctcctg ctccgtgatg cacgaggccc tgcacaacca ctacacccag 1380
aagtccctgt ccctgagccc cggcaaatga                                 1410
```

| | |
|---|---|
| SEQ ID NO: 39 | moltype = DNA length = 705 |
| FEATURE | Location/Qualifiers |
| misc_feature | 1..705 |
| | note = Anti-Her2(T)-Fc1 DNA |

| source | 1..705 |
| --- | --- |
| | mol_type = other DNA |
| | organism = synthetic construct |

SEQUENCE: 39

```
atgtctgtgc ctacccaggt gctgggactg ctgctgctgt ggctgacaga cgcccgctgt    60
gacattcaga tgacccagag ccccteectee ctetecgect cegtgggaga cagagttacc   120
atcacctgca gggcctccca ggacgtgaac accgccgtgg cctggtacca gcagaaaccc   180
ggcaaagccc ccaaactgct catctactcc gcctcatttc tgtacagcgg cgtgccctcc   240
cgcttctccg gttccagatc cggcaccgac ttcaccctga ctatctcctc cctccagccc   300
gaagacttcg ccacctacta ctgccagcag cactacacca cccccccca cttcggccag   360
ggcacaaagg tcgaaatcaa gagaaccgtg gccgctccct ccgtgttcat cttcccacct   420
tccgacgagc agctgaagtc cggcaccgct tctgtcgtgt gcctgctgaa caacttctac   480
ccccgcgagg ccaaggtgca gtggaaggtg gacaacgccc tgcagtccgg caactcccag   540
gaatccgtga ccgagcagga ctccaaggac agcacctact ccctgtcctc caccctgacc   600
ctgtccaagg ccgactacga aagcacaag gtgtacgcct gcgaagtgac ccaccagggc   660
ctgtctagcc ccgtgaccaa gtcctttcaac cgggggcgagt gctga              705
```

| SEQ ID NO: 40 | moltype = DNA length = 1407 |
| --- | --- |
| FEATURE | Location/Qualifiers |
| misc_feature | 1..1407 |
| | note = Anti-Her2(P)-Fc1     DNA |
| source | 1..1407 |
| | mol_type = other DNA |
| | organism = synthetic construct |

SEQUENCE: 40

```
atggaatgga gctgggtgtt cctgttctttt ctgtccgtga ccacaggcgt gcattctgag    60
gtgcagttgg tggagagcgg gggggggctg gtgcagcctg gaggaagttt gaggttgagc   120
tgtgccgcaa gcgggttcac atttacagac tacacaatgg actgggtgag gcaggcaccc   180
ggaaagggac tggagtgggt ggctgatgtg aatcccaata gcgagggag catttacaac   240
cagagattca gggggcggtt caccttgtcc gtggacagga gcaagaacac actgtacctg   300
cagatgaaca gcctgagggc cgaggatacc gccgtctact attgcgccag gaacctcgga   360
ccctccttct attttgacta ctggggcag ggaaccctgg tgaccgtgtc atctgcttct   420
accaagggcc cctccgtgtt tcctctggcc cttccagca agtccacctc tggcggaaca   480
gccgctctgg gctgcctcgt gaaggactac ttccccgagc ctgtgaccgt gtcctggaac   540
tctggcgcte tgacatccgg cgtgcacacc ttccctgctg tgctgcagtc tagcggcctg   600
tactccctgt cctccgtcgt gaccgtgcct tccagctct tggcaccca gacctacatc   660
tgcaacgtga accacaagcc ctccaacacc aaggtggaca gaaggtgga acccaagtcc   720
tgcgacaaga cccacacctg tcccccttgt cctgcccctg aactgctggg cggaccttcc   780
gtgttcctgt tcccccccaaa gcccaaggac accctgatga tctcccggac ccccgaagtg   840
acctgcgtgg tggtggatgt gtcccacgag gaccctgaag tgaagttcaa ttggtacgtg   900
gacggcgtgg aagtgcacaa cgccaagacc aagcctagag aggaacagta caactccacc   960
taccgggtgg tgtccgtgct gaccgtgctg caccaggatt ggctgaacgg caaagagtac  1020
aagtgcaagg tgtccaacaa ggccctgcct gcccccatca aaaagaccat tccaaggcc  1080
aaggggcagc cccgggaacc ccaggtgtac acactgcccc ctagcaggga cgagctgacc  1140
aagaaccagg tgtccctgag ctgtgcagtg aaaggcttct accctcga cattgccgtg  1200
gaatgggagt ccaacggcca gcctgagaac aactacaaga ccacccccc tgtgctggac  1260
tccgacggct cattcttcct ggtgagcaag ctgacagtgg acaagtcccg gtggcagcag  1320
ggcaacgtgt tctcctgctc cgtgatgcac gaggccctgc acaaccacta cacccagaag  1380
tccctgtccc tgagccccgg caaatga                                     1407
```

| SEQ ID NO: 41 | moltype = DNA length = 705 |
| --- | --- |
| FEATURE | Location/Qualifiers |
| misc_feature | 1..705 |
| | note = Anti-Her2(P)-Fc1     DNA |
| source | 1..705 |
| | mol_type = other DNA |
| | organism = synthetic construct |

SEQUENCE: 41

```
atgtctgtgc ctacccaggt gctgggactg ctgctgctgt ggctgacaga cgcccgctgt    60
gacattcaga tgacccagag ccccteectee ctetecgect cegtgggaga cagagttacc   120
atcacctgca aagccagcca ggacgtgage atcggcgtgg cctggtacca gcagaaaccc   180
ggcaaagccc ccaaactgct catttactcc gcctcatacc gttacaccgg cgttccctcc   240
cgcttcagcg gatccggctc cggaaccgac ttcaccctga ctatctcctc cctccagccc   300
gaagacttcg ccacctttta ctgccagcag tactacacct accctcctg cttcggccag   360
ggcaccaagg tggaaatcaa gagaaccgtg gccgctccct ccgtgttcat cttcccacct   420
tccgacgagc agctgaagtc cggcaccgct tctgtcgtgt gcctgctgaa caacttctac   480
ccccgcgagg ccaaggtgca gtggaaggtg gacaacgccc tgcagtccgg caactcccag   540
gaatccgtga ccgagcagga ctccaaggac agcacctact ccctgtcctc caccctgacc   600
ctgtccaagg ccgactacga aagcacaag gtgtacgcct gcgaagtgac ccaccagggc   660
ctgtctagcc ccgtgaccaa gtcctttcaac cgggggcgagt gctga              705
```

| SEQ ID NO: 42 | moltype = DNA length = 1404 |
| --- | --- |
| FEATURE | Location/Qualifiers |
| misc_feature | 1..1404 |
| | note = Anti-PD-L1(Ate)-Fc1     DNA |
| source | 1..1404 |
| | mol_type = other DNA |
| | organism = synthetic construct |

SEQUENCE: 42

```
atggaatgga gctgggtgtt cctgttcttt ctgtccgtga ccacaggcgt gcattctgaa    60
gtgcagctgg tggaaagcgg cggcggcctg gtgcagccgg gcggcagcct gcgcctgagc   120
tgcgcggcga gcggctttac ctttagcgat agctggattc attgggtgcg ccaggcgccg   180
ggcaaaggcc tggaatgggt ggcgtggatt agcccgtatg gcggcagcac ctattatgcg   240
gatagcgtga aaggccgctt taccattagc gcggatacca gcaaaaacac cgcgtatctg   300
cagatgaaca gcctgcgcgc ggaagatacc gcggtgtatt attgcgcgcg ccgccattgg   360
ccgggcggct ttgattactg gggccagggc accctggtga ccgtgtcatc tgcttctacc   420
aagggcccct ccgtgtttcc tctggcccct tccagcaagt ccacctctgg cggaacagcc   480
gctctgggct gcctcgtgaa ggactacttc cccgagcctg tgaccgtgtc ctggaactct   540
ggcgctctga tcccggcgt gcacaccttc cctgctgtgc tgcagtctag cggcctgtac   600
tccctgtcct ccgtcgtgac cgtgccttcc agctctctgg gcacccagac ctacatctgc   660
aacgtgaacc acaagccctc caacaccaag gtggacaaga aggtggaacc caagtcctgc   720
gacaagaccc acacctgtcc cccttgtcct gcccctgaac tgctgggcgg accttccgtg   780
ttcctgttcc cccaaagcc caaggacacc ctgatgatct cccggacccc cgaagtgacc   840
tgcgtggtgg tggatgtgtc ccacgaggac cctgaagtga agttcaattg gtacgtggac   900
ggcgtggaag tgcacaacgc caagaccaag cctagagagg aacagtacaa ctccacctac   960
cgggtggtgt ccgtgctgac cgtgctgcac caggattggc tgaacggcaa agagtacaag  1020
tgcaaggtgt ccaacaaggc cctgcctgcc cccatcgaaa agaccatctc caaggccaag  1080
ggccagcccc gggaacccca ggtgtacaca ctgcccccta gcagggacga gctgaccaag  1140
aaccaggtgt ccctgagctg tgcagtgaaa ggcttctacc cctccgacat tgccgtggaa  1200
tgggagtcca acggccagcc tgagaacaac tacaagacca ccccccctgt gctggactcc  1260
gacggctcat tcttcctggt gagcaagctg acagtggaca agtcccggtg gcagcagggc  1320
aacgtgttct cctgctccgt gatgcacgag gccctgcaca accactacac ccagaagtcc  1380
ctgtccctga gccccggcaa atga                                         1404

SEQ ID NO: 43           moltype = DNA  length = 1110
FEATURE                 Location/Qualifiers
misc_feature            1..1110
                        note = D1m-Fc2 DNA
source                  1..1110
                        mol_type = other DNA
                        organism = synthetic construct
SEQUENCE: 43
atggagtgga gctgggtgtt cttgttcttc ttgtccgtga ccaccggggt gcacagcgag    60
gaggagttgc agatcatcca gcctgacaag agcgtgacg tggccgccgg ggagagcgct   120
attctgcact gtaccatcac ctccctcttc cccgtgggcc ccattcagtg gttcaggga   180
gccgggcccg ccagagttct gatttacaac cagaggcagg gcccctttcc ccgggttacc   240
actgtctctg agaccaccaa gcgggagaac atggatttca gcatctccat cagcaacatt   300
actcccgccg acgccggcac ctactactgc atcaaattca gaaagggctc tcccgacacc   360
gaattcaaaa gcggcgccgg caccgaactg tccgtgcgag ctaagccctc cgagcccaaa   420
tcctcagaca agacccacac ctgtcccct tgtcctgccc ctgaactgct gggcggacct   480
tccgtgttcc tgttcccccc aaagcccaag gacaccctga tgatcccg gacccccgaa   540
gtgacctgcg tggtggtgga tgtgtcccac gaggacccg aagtgaagtt caattggtac   600
gtggacggcg tggaagtgca acgccaag accaagccta gagaggaaca gtacaactcc   660
acctaccggg tggtgtccgt gctgaccgtg ctgcaccagg attggctgaa cggcaaagag   720
tacaagtgca aggtgtccaa caaggccctg cctgccccca tcgaaaagac catctccaag   780
gccaaggcc agccccggga accccaggtg tacacactgc ccctagcag ggacgagctg   840
accaagaacc aggtgtccct gtggtgtctc gtgaaaggct tctacccctc cgacattgcc   900
gtggaatggg agtccaacgg ccagcctgag aacaactaca agaccacccc cctgtgctg   960
gactccgacg gctcattctt cctgtacagc aagctgacag tggacaagtc ccggtggcag  1020
cagggcaacg tgttctcctg ctccgtgatg cacgaggccc tgcacaacca ctacacccag  1080
aagtccctgt ccctgagccc cggcaaatga                                   1110

SEQ ID NO: 44           moltype = AA  length = 462
FEATURE                 Location/Qualifiers
REGION                  1..462
                        note = D1m-D2-Fc2
source                  1..462
                        mol_type = protein
                        organism = synthetic construct
SEQUENCE: 44
MEWSWVFLFF LSVTTGVHSE EELQIIQPDK SVSVAAGESA ILHCTITSLF PVGPIQWFRG    60
AGPARVLIYN QRQGPFPRVT TVSETTKREN MDFSISISNI TPADAGTYYC IKFRKGSPDT   120
EFKSGAGTEL SVRAKPSEPK SSGPAARATP QHTVSFTCES HGFSPRDITL KWFKNGNELS   180
DFQTNVDPVG ESVSYSIHST AKVVLTREDV HSQVICEVAH VTLQGDPLRG TANLSDKTHT   240
CPPCPAPELL GGPSVFLFPP KPKDTLMISR TPEVTCVVVD VSHEDPEVKF NWYVDGVEVH   300
NAKTKPREEQ YNSTYRVVSV LTVLHQDWLN GKEYKCKVSN KALPAPIEKT ISKAKGQPRE   360
PQVYTLPPSR DELTKNQVSL WCLVKGFYPS DIAVEWESNG QPENNYKTTP PVLDSDGSFF   420
LYSKLTVDKS RWQQGNVFSC SVMHEALHNH YTQKSLSLSP GK                      462
```

BISPECIFIC RECOMBINANT PROTEIN AND USE THEREOF

CROSS REFERENCE TO RELATED APPLICATIONS

The present application is a continuation application of U.S. application Ser. No. 16/610,902 filed Nov. 4, 2019, which is a national stage of International Application No. PCT/CN2018/086050, filed on May 8, 2018, which claims priority of Chinese Patent Application No. CN201710317926.7 filed on May 8, 2017 and Chinese Patent Application No. CN201711269620.5 filed on Dec. 5, 2017, the contents of which are incorporated herein by reference in their entireties.

REFERENCE TO AN ELECTRONIC SEQUENCING LISTING

The contents of the electronic sequence listing (850274_401C1_SEQUENCE_LISTING.xml; Size: 82,463 bytes; and Date of Creation: Oct. 24, 2022) is herein incorporated by reference in its entirety.

FIELD OF INVENTION

The present disclosure belongs to the field of biomedicine, particularly relates to a recombinant protein and a use thereof.

PRIOR ART

With the deepening research in the field of cancer therapy, the research, development and application of molecular targeted therapeutic drugs for cancer have received more and more attention. Owing to the advantages of strong targetability, minimal side effects and remarkable therapeutic effects, antibody drugs have rapidly become hot spot of targeted cancer therapy. There are already dozens of tumor-targeting antibody drugs approved for clinical use, which have achieved significant therapeutic effects. The antibody drugs includes, for example, the antibodies targeting CD20, such as Rituxan® (rituximab, which is developed by Roche, is the first monoclonal antibody approved for treating cancer in the United States, and originally used to treat non-Hodgkin's lymphoma), Zevalin® (ibritumomab tiuxetan, which is developed by IDEC Pharmaceuticals, is originally approved for treating low-differentiated non-Hodgkin's lymphoma with resistance to Rituxan® by the FDA), Bexxar® (tositumomab and iodine I$^{131}$ tositumomab, GSK), Arzerra® (ofatumumab, GSK); the antibodies targeting Her2, such as Herceptin® (trastuzumab, which is developed by Genentech, is a well-known drug for treating breast cancer), Perjeta® (pertuzumab, Roche), Kadcyla® (ado-trastuzumab emtansine, Roche); the antibodies targeting VEGF or its receptor, such as Avastin® (bevacizumab, Genentech/Roche), Cyramaza® (ramucirumab, Eli Lilly); the antibodies targeting EGFR, such as Erbitux® (cetuximab, which is developed by Eli Lilly, is one of the top 10 best-selling anticancer drugs in the world, and originally approved for treating rectal cancer), Vectibix® (panitumumab, which is developed by Amgen for treating colorectal cancer); the antibodies targeting PD-L1, such as Tecentriq® (atezolizumab, Roche) (Cao Rui et al., Advances in antibody drugs for cancer targeted therapy, *Chinese Journal of Biochemical Pharmaceutics*, 2016, 36(6): 15-18).

Clinically applied anti-tumor antibody drugs that target tumor cells (unconjugated naked antibodies) achieve anti-tumor effect mainly by two functions of antibodies. The first function of antibodies is affinity, i.e., specifically binding to the target antigen on the surface of tumor cells and exerting its effector function to kill the tumor cells. Antibody molecules can block the tumor growth factor signaling pathway, induce apoptosis, or inhibit the neovascularization in the tumor microenvironment by binding to the target antigen. The second function of antibodies is achieved through the immune system, i.e., relying on the immune system to mediate cell death to achieve the effect of killing tumor cells, such as antibody-dependent cell-mediated cytotoxicity (ADCC) mediated by constant region of antibodies, complement dependent cytotoxicity (CDC) and antibody dependent cellular phagocytosis (ADCP). More and more researches show the cytotoxicity of antibody-mediated immune response is an important mechanism of the anti-tumor activity of antibodies (for review, see Barnhart B C, et al. Role of Fc-FcγR interactions in the antitumor activity of therapeutic antibodies. *Immunology and Cell Biology*, 2017, 95: 340-346).

In recent years, studies have confirmed that tumor cells can continually divide and grow by modifying their own surface antigens and changing the microenvironment around the tumor tissue to escape the surveillance, recognition and attack of the innate immune system, i.e., the so-called tumor immune escape. For example, tumor cells inhibit the immune function of macrophages and significantly inhibit the activity of immune cells by highly expressing CD47 which binds to the inhibitory receptor signal-regulatory protein α (SIRPα) on the surface of macrophages. Meanwhile, high expression of CD47 on tumor cells inhibits Fc receptor-mediated phagocytosis, ultimately affecting the targeted cancer therapeutic effects of antibody drugs (Willingham S B, et al. The CD47-signal regulatory protein Alpha (SIRPα) interaction is a therapeutic target for human solid tumors. *Proceedings of the National Academy of Sciences of the United States of America*. 2012, 109(17): 6662-6667).

CD47 is a widely expressed membrane glycoprotein, which interacts with SIRPα as mutual receptor and ligand and forms a CD47-SIRPα signal complex, thus triggering a series of reactions such as apoptosis, proliferation and immunity. In 2000, Oldenborg et al. demonstrated that CD47 is an important signal marker on cell surface for regulating macrophage phagocytosis (Oldenborg P A, et al. Role of CD47 as a marker of self on red blood cells. *Science*, 2000, 288 (5473): 2051-2054). CD47 releases a "don't eat me" signal, by binding to SIRPα on the surface of macrophages, phosphorylating its immune receptor tyrosine-based inhibitory motif (ITIM), subsequently recruiting SH2-containing protein tyrosine phosphatase 1 protein, and triggering a series of cascades to inhibit the phagocytosis of macrophages. The younger red blood cells (RBCs) highly express CD47 and release a signal of "I am your ally, don't eat me" to macrophages, while the aged RBCs down-regulate the expression of CD47 and are eventually eliminated by macrophages.

CD47 can be a target for treating various cancers because it is widely expressed on the surface of various cancer cells. The mouse allogeneic tumor transplantation model has demonstrated the effectiveness of CD47 blockade, so CD47 has become a novel target of immune checkpoint therapy for cancer (Vonderheide R H. CD47 blockade as another immune checkpoint therapy for cancer. *Nature Medicine*, 2015, 21(10): 1122-1123). The anti-CD47 antibody, SIRPα-Fc fusion protein and the like can relieve the inhibitory effect of CD47 on immune cells by blocking the CD47-SIRPα signaling pathway, and exhibit certain anti-tumor activity. However, since RBCs also highly express CD47 protein, the treatment with anti-CD47 antibody which binds to CD47 protein with high affinity may cause toxic side effects such as RBC agglutination and anemia (Mccracken M N, et al. Molecular Pathways: Activating T Cells after Cancer Cell Phagocytosis from Blockade of CD47 "Don't Eat Me" Signals. *Clinical Cancer Research,* 2015, 21(16): 3597-3601), which makes the clinical development of anti-CD47 antibody drugs very difficult. There is no anti-CD47 antibody drugs entering phase III clinical trials so far. The wild-type SIRPα-Fc fusion protein does not have potent efficacy due to its low affinity to CD47. Some researchers obtain SIRPα mutants with a thousand-fold affinity enhancement and better anti-tumor efficacy by high affinity mutations in wild-type SIRPα (Weiskopf K, et al. Engineered SIRPα variants as immunotherapeutic adjuvants to anticancer antibodies. *Science,* 2013, 341 (6141): 88-91). However, it remains to be clinically proved whether multiple point mutations affect the safety, immunogenicity, stability and even target specificity of the fusion proteins in humans.

On the other hand, studies have shown that the anti-tumor efficacy of anti-CD47 antibodies can be significantly improved by combining with other tumor-targeting therapeutic antibodies, such as a combination therapy with CD47+CD20, CD47+Her2 (Chao M P, et al. Anti-CD47 antibody synergizes with rituximab to promote phagocytosis and eradicate non-Hodgkin lymphoma. *Cell,* 2010, 142(5): 699-713; Zhao W, et al. CD47—signal regulatory protein-α (SIRPα) interactions form a barrier for antibody-mediated tumor cell destruction. *Proceedings of the National Academy of Sciences of the United States of America.* 2011, 108(45): 18342-18347). However, there is great uncertainty that whether and when the anti-CD47 antibody can be launched. Furthermore, even if the anti-CD47 antibody is available on the market, it is still difficult for patients to bear the combination therapy with tumor-targeting antibody drugs due to the high cost thereof.

Therefore, there is a need to develop a novel tumor-targeting drug, which can specifically target the tumor, activate and enhance immune function in patients, significantly improve the efficacy while ensuring safety, and reduce the cost of the medication in the meantime.

In addition, in view of the potential safety risks of monovalent or multivalent antibodies or recombinant proteins targeting CD47 (such as anemia, RBC agglutination, cytotoxicity of CD47-positive non-tumor target cells), the binding of human SIRPα to human CD47 is species-specific, while the application of human blood is restricted by ethics and the availability of genetic resources etc., an early immunological safety evaluation method for evaluating the immunological safety of antibodies or recombinant proteins targeting CD47 in vivo/in vitro is urgently needed.

CONTENT OF THE PRESENT INVENTION

The present disclosure provides a bispecific recombinant protein and a use thereof, which can significantly enhance the tumor-targeting saturation binding abundance of a recombinant protein with an effect of modulating the function of macrophages and reduce non-tumor-target side effects.

In one aspect, the present disclosure provides a bispecific recombinant protein, wherein the bispecific recombinant protein comprises a 'high affinity tumor-targeting arm' and a 'fusion protein with low affinity for blocking the interaction between CD47 and SIRPα'.

In one embodiment, the 'high affinity tumor-targeting arm' does not bind to CD47, and the ratio of the binding affinity of the antibody corresponding to the 'high affinity tumor-targeting arm' to the target antigen on tumor cell(s) to the binding affinity of the homodimer of a monomer fusion protein corresponding to the 'fusion protein with low affinity for blocking the interaction between CD47 and SIRPα' to CD47 on tumor cell(s) is at least 6, optionally 6, 7, 8, 9, 10, 11, 12, 13, 14, 15 or more, or any value between them;

The binding affinity of the 'fusion protein with low affinity for blocking the interaction between CD47 and SIRPα' to CD47 is not higher than the binding affinity of the homodimer of a 'monomer fusion protein comprising an extracellular truncated variant of SIRPα' to CD47. The 'fusion protein with low affinity for blocking the interaction between CD47 and SIRPα' comprises an extracellular truncated variant of SIRPα.

In one embodiment, the extracellular truncated variant of SIRPα comprises a part or full of the amino acid sequence of the extracellular domain of human SIRPα (wild-type or a variant with non-high affinity to CD47).

In one embodiment, the extracellular truncated variant of SIRPα is an extracellular truncated variant of human SIRPα. In a specific embodiment, the extracellular truncated variant of SIRPα comprises an amino acid sequence selected from the group consisting of a1), a2), a3) and a4): a1) SEQ ID No: 30; a2) SEQ ID No: 31; a3) SEQ ID No: 32; a4) an amino acid sequence obtained by inserting, deleting, modifying and/or conservatively substituting at least one amino acid residue such as 1-5 amino acid residue(s) of any one of the amino acid sequences described above, wherein the binding affinity of monomer thereof to a CD47 is not higher than the binding affinity of monomer of a1), a2) or a3) to a CD47.

In one embodiment, the bispecific recombinant protein has a configuration comprising a left arm and a right arm which are symmetrically arranged, wherein the 'high affinity tumor-targeting arm' is arranged in the left arm, and the 'fusion protein with low affinity for blocking the interaction between CD47 and SIRPα' is arranged in the right arm; preferably, the left arm is in the form of Fab or Fab' of immunoglobulin, and the right arm is an extracellular truncated variant of SIRPα. Wherein, the term 'a left arm and a right arm which are symmetrically arranged' herein is described with reference to the conventional 'Y' configuration of immunoglobulin, in this case, the left and right sides of the bispecific recombinant protein of the present disclosure have specific functional proteins targeting different targets respectively; this structural description mainly distinguish from the case that two specific functional proteins form an 'up-and-down' structure by linking the C-terminus and the N-terminus. Therefore, the spatial positions of the left and right arms described in the present disclosure are not specific limitations to the structure of the bispecific recombinant protein, only for distinguishing two arms structure of the recombinant protein from the "up-and-down" structure formed by linking the C-terminus and the N-terminus described above. It could be understand that when one arm is arranged in one side, the other arm is arranged on the other side; obviously, the left and right positions of the two arms are interchangeable.

In one embodiment, the length of the right arm is configured for the distance from the epitope to which the left arm binds to the membrane surface of the target cell. Preferably, when the 'high affinity tumor-targeting arm' is configured for binding a membrane-proximal epitope of the target cell, the extracellular truncated variant of SIRPα is selected from the shorter amino acid sequence among a1), a2), a3) and a4).

In one embodiment, the 'high affinity tumor-targeting arm' is specific to a target selected from the group consisting of 5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, nectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA and CD138.

Preferably, when the target is CD20, EGFR or PD-L1, the extracellular truncated variant of SIRPα is a1); when the target is HER2, the extracellular truncated variant of SIRPα is a1) or a2).

In one embodiment, the 'high affinity tumor-targeting arm' and the 'fusion protein with low affinity for blocking the interaction between CD47 and SIRPα' are combined via two or three of the following bindings: intermolecular force, covalent bond (such as interchain disulfide bond) and salt bond.

In one embodiment, the 'high affinity tumor-targeting arm' and the 'fusion protein with low affinity for blocking the interaction between CD47 and SIRPα' further comprise an Fc region. Generally, the Fc region of the present disclosure comprises a natural sequence of Fc region. However, the Fc region of the present disclosure may have one or more change(s) or modification(s) of amino acid sequence on the natural sequence of Fc region, such as change(s) or modification(s) of amino acid sequence altering the binding activity of C1q of the Fc region.

In one embodiment, the 'fusion protein with low affinity for blocking the interaction between CD47 and SIRPα' is a fusion protein comprising an extracellular truncated variant of SIRPα and a binding sequence for binding the arm, wherein, the extracellular truncated variant of SIRPα and the binding sequence for binding the arm are optionally linked by an adaptor sequence, and the binding sequence for binding the arm optionally comprises an Fc region.

In one embodiment, the Fc region of the present disclosure is conceptual, i.e., although it may not be present actually, antibody engineering can be performed according to the amino acid sequence of a desired Fc region variant to produce a polypeptide or a fusion protein comprising the sequence, or a DNA encoding the amino acid sequence of the desired Fc region variant.

In one embodiment, the Fc region can be an Fc region variant. The "Fc region variant" used herein refers to an Fc region with one or more amino acid residue modification(s) on the natural amino acid sequence of Fc. Methods for these modifications are well known to those skilled in the art, include but are not limited to, site-directed mutagenesis of the DNA sequence encoding the Fc region, such as using PCR mutagenesis and cassette mutagenesis to prepare the Fc region variant. For example, one or more amino acid residue (s) of the Fc region can be deleted to increase FcR binding. For example, in one embodiment, an insertion type of Fc region variant may be prepared to alter the effector function of the Fc region.

In one embodiment, for example, at least one amino acid residue (such as 1-2 amino acid residue(s), generally no more than 10 amino acid residues) can be inserted adjacent to one or more site(s) of the Fc region identified to affect FcR binding. 'Adjacent' means within 1-2 amino acid residue(s) distant from the site of the Fc region identified to affect the binding of FcR. Such Fc region variants may exhibit increased or decreased FcR binding and/or ADCC activity. In order to prepare such insertion type of variants, a co-crystal structure of a polypeptide comprising the FcR binding region (such as the extracellular domain of the target FcR) and an Fc region to which an amino acid residue is to be inserted can be assessed, to involve an Fc region variant having, such as increased FcR binding ability. Such insertions are generally located in the loop of the Fc region.

In one embodiment, an Fc region variant which mediates antibody-dependent cell-mediated cytotoxicity (ADCC) more efficiently and/or binds to Fcγ receptor (FcγR) with a higher affinity compared to the recombinant protein comprising a natural Fc region in the presence of human effector cells, can be prepared by introducing an appropriate amino acid sequence modification to the natural Fc region. The Fc region variant of the present disclosure generally comprises at least one amino acid modification in the Fc region. Preferably, a plurality of amino acid modifications are combined. For example, the Fc region variant may comprise 2, 3, 4, 5 or more amino acid residue substitutions, such as in the identified specific FcR binding site.

The natural Fc region is preferably a human Fc region, such as the natural sequence of the Fc region of human IgG1 (A or non-A isotype), IgG2, IgG3 or IgG4.

In one embodiment, the 'high affinity tumor-targeting arm' and the 'fusion protein with low affinity for blocking the interaction between CD47 and SIRPα' are heterodimerized by knobs-into-holes. For example, the knobs-into-holes is a protruding "knobs" formed by the T366W mutation, and a hollow "holes" formed by one amino acid mutation (Y407V) or three amino acid mutations (T366S, L368A and Y407V). The mutation follows Kabat numbering scheme [Eu numbering scheme of Kabat et al. (1991)], indicating the original amino acid residue, the mutation site and the substitution amino acid residue respectively from left to right, for example, in T366W, T is the original amino acid residue, 366 is the mutation site and W is the amino acid residue for substituting T.

In one embodiment, the 'high affinity tumor-targeting arm' is a half antibody specific to a target selected from the group consisting of 5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, nectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA and CD138, preferably a half antibody of IgG1 antibody, optionally a human-mouse chimeric half antibody, a humanized half antibody, a fully human half antibody; more preferably a humanized or fully human half antibody of IgG1 antibody.

In one embodiment, the 'fusion protein with low affinity for blocking the interaction between CD47 and SIRPα' comprises an amino acid sequence selected from the group consisting of b1), b2), b3) and b4): b1) SEQ ID No: 26; b2) SEQ ID No: 27; b3) SEQ ID No: 28; b4) an amino acid sequence obtained by inserting, deleting, modifying and/or conservatively substituting at least one amino acid residue such as 1-5 amino acid residue(s) of any one of the amino acid sequences described above, wherein the binding affinity of homodimer thereof to a CD47 is not higher than the binding affinity of homodimer of b1), b2) or b3) to a CD47. The signal peptide region sequence, adaptor sequence, hinge region sequence, Fc region sequence and/or binding sequence contained in the above sequences may be arbitrarily replaced according to the methods well known to those skilled in the art or with common signal peptide region sequences, adaptor sequences, hinge region sequences, Fc region sequences and/or binding sequences.

In one embodiment, the bispecific recombinant protein comprises the following sequence:

when the high affinity tumor-targeting arm targets CD20, the high affinity tumor-targeting arm comprises SEQ ID No: 16 and SEQ ID No: 17, the 'fusion protein with low affinity for blocking the interaction between CD47 and SIRPα' comprises SEQ ID No: 26, SEQ ID No: 27 or SEQ ID No: 28;

when the high affinity tumor-targeting arm targets EGFR, the high affinity tumor-targeting arm comprises SEQ ID No: 19 and SEQ ID No: 8, the 'fusion protein with low affinity for blocking the interaction between CD47 and SIRPα' comprises SEQ ID No: 26, SEQ ID No: 27 or SEQ ID No: 28;

when the high affinity tumor-targeting arm targets Her2, the high affinity tumor-targeting arm comprises SEQ ID No: 20 and SEQ ID No: 21, or SEQ ID No: 22 and SEQ ID No: 23, the 'fusion protein with low affinity for blocking the interaction between CD47 and SIRPα' comprises SEQ ID No: 26, SEQ ID No: 27 or SEQ ID No: 28; or when the high affinity tumor-targeting arm targets PD-L1, the high affinity tumor-targeting arm comprises SEQ ID No: 24 and SEQ ID No: 13, the 'fusion protein with low affinity for blocking the interaction between CD47 and SIRPα' comprises SEQ ID No: 26, SEQ ID No: 27 or SEQ ID No: 28.

In one aspect, the present disclosure provides a nucleic acid molecule encoding a bispecific recombinant protein. Preferably, the nucleic acid molecule encoding the 'high affinity tumor-targeting arm' and the nucleic acid molecule encoding the 'fusion protein with low affinity for blocking the interaction between CD47 and SIRPα' are presented together in a same DNA strand, or the nucleic acid molecule encoding the 'high affinity tumor-targeting arm' and the nucleic acid molecule encoding the 'fusion protein with low affinity for blocking the interaction between CD47 and SIRPα' are presented in separate DNA strands.

In another aspect, the present disclosure provides an expression vector comprising a nucleic acid molecule.

In another aspect, the present disclosure provides a cell comprising an expression vector.

In another aspect, the present disclosure provides a method for preparing a bispecific recombinant protein comprising: 1) providing a 'high affinity tumor-targeting arm'; 2) providing a 'fusion protein with low affinity for blocking the interaction between CD47 and SIRPα'; 3) contacting the 'high affinity tumor-targeting arm' and the 'fusion protein with low affinity for blocking the interaction between CD47 and SIRPα' to form the recombinant protein.

In one embodiment, a method for producing a recombinant protein comprises expressing the recombinant protein in a host cell comprising an expression vector, wherein the expression vector comprises a nucleic acid molecule encoding the recombinant protein.

In another aspect, the present disclosure also provides a method of tumor targeted therapy.

In one embodiment, the tumor is a hematological tumor or a solid tumor selected from the group consisting of breast cancer, colorectal cancer, lung cancer, pancreatic cancer, esophageal cancer, endometrial cancer, ovarian cancer, gastric cancer, prostate cancer, kidney cancer, cervical cancer, myeloma, lymphoma, leukemia, thyroid cancer, uterine cancer, bladder cancer, neuroendocrine cancer, head and neck cancer, liver cancer, nasopharyngeal carcinoma, testicular cancer, small cell lung cancer, non-small cell lung cancer, melanoma, basal cell skin cancer, squamous cell skin cancer, dermatofi-brosarcoma protuberan, merkel cell carcinoma, glioblastoma, glioma, sarcoma, mesothelioma, myelodysplastic syndrome and the like.

In another aspect, the present disclosure also provides a pharmaceutical composition comprising the recombinant protein or the fusion protein of the present disclosure, and an optional adjuvant, excipient or pharmaceutically acceptable carrier. The composition may comprise a pharmaceutically acceptable carrier. The composition may be present in any form of pharmaceutical preparation, including but not limited to, injections, powder, lyophilized powder, etc. The pharmaceutical composition in the form of the pharmaceutical preparation can be prepared according to the conventional techniques of pharmaceutics, including fusing a mixture of the pharmaceutically active ingredient such as the recombinant protein or the fusion protein of the present disclosure and a pharmaceutical carrier to form the desired dosage form according to the conventional techniques of pharmaceutics.

In one embodiment, the present disclosure also provides a pharmaceutical composition comprising an expression vector comprising a nucleic acid molecule encoding the recombinant protein or the fusion protein of the present disclosure, and an optional pharmaceutically acceptable carrier.

In another aspect, the present disclosure also provides a method for treating a tumor comprising administering to a patient or subject a therapeutically effective amount of the pharmaceutical composition of the present disclosure. The tumor expresses an additional target molecule, which includes, but is not limited to5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, nectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA, CD138.

In another aspect, the present disclosure also provides a method of gene therapy in vivo, comprising introducing a therapeutically effective amount of a nucleic acid molecule or a derivative thereof encoding the recombinant protein or the fusion protein of the present disclosure into a patient or subject.

In another aspect, the present disclosure also provides a method for evaluating the early immunological safety of a recombinant protein/antibody which targets CD47 and has ADCC activity in vitro, wherein the method comprises: a) providing a recombinant protein/antibody (including monovalent or multivalent) which targets and has ADCC activity; b) detecting the ADCC activity of the recombinant protein/antibody; and c) evaluating the early immunological safety of the recombinant protein/antibody (including monovalent or multivalent).

In one embodiment, the present disclosure provides a method for evaluating the early immunological safety of a recombinant protein/antibody which targets CD47 and has ADCC activity in vitro, wherein the method comprises: a) preparing an effector cell (such as human NK92MI-CD16a effector cell); b) contacting the effector cell and the recombinant protein/antibody; c) detecting the ADCC activity of the recombinant protein/antibody; and d) evaluating the early immunological safety of the recombinant protein/antibody based on the ADCC activity.

In another embodiment, the present disclosure provides a method for evaluating the early immunological safety of a recombinant protein/antibody which targets CD47 and has ADCC activity in vitro, wherein the method comprises: a) harvesting well-growth human NK92MI-CD16a effector cells, resuspending the harvested effector cells to a cell density of $1 \times 10^5$ cells/mL to $5 \times 10^6$ cells/mL; b) incubating the recombinant protein/antibody with a gradient concentration and the effector cells prepared in step a) for 0.5-5 h; c) determining the LDH activity and calculating the rate of cell lysis after the completion of incubation; and d) evaluating the early immunological safety of the recombinant protein/antibody based on the rate of cell lysis, wherein the recombinant protein/antibody with a lower rate of cell lysis rate has a higher immunological safety.

In another aspect, the present disclosure provides a method for evaluating the early immunological safety of a recombinant protein/antibody (including monovalent or multivalent) targeting CD47 in vivo, wherein the method comprises: a) providing the protein/antibody (including monovalent or multivalent) targeting CD47; b) providing a Hu-NSG mouse; c) contacting the recombinant protein/antibody and the Hu-NSG mouse; and d) evaluating the early immunological safety of the recombinant protein/antibody in the Hu-NSG mouse.

In another embodiment, the present disclosure provides a method for evaluating the early immunological safety of a recombinant protein/antibody (including monovalent or multivalent) targeting CD47 in vivo, wherein the method comprises: a) providing a Hu-NSG mouse; b) administrating the recombinant protein/antibody (including monovalent or multivalent); c) at 24-96 h after administration, taking venous blood from the mouse, lysing RBCs, incubating the remaining cells and fluorescently labeled anti-human CD45 antibody, anti-human CD19 antibody or anti-human CD3 antibody for 15-60 min, and detecting by flow cytometry; and d) evaluating the early immunological safety of the recombinant protein/antibody based on the clearance rate of cells, wherein the recombinant proteins/antibody with a lower clearance rate of cells (except the target cells) has a higher immunological safety.

The beneficial effects of the present disclosure are as follows:

The recombinant proteins of the present disclosure can achieve a higher safety (such as avoiding anemia, RBC agglutination, cytotoxicity of CD47-positive non-tumor target cells caused by anti-CD47 antibodies/recombinant proteins (such as Hu5F9-G4), reducing the risk of potential safety, immunogenicity, stability and other uncertainties brought by high affinity mutants of SIRPα-Fc fusion protein, etc.) by the 'fusion protein with low affinity for blocking the interaction between CD47 and SIRPα', which reduces the binding of the recombinant proteins of the present disclosure to the CD47 on non-tumor cells (such as RBCs, NK cells, T cells, etc.).

It has been surprisingly by the present disclosure that the binding affinity of the recombinant proteins of the present disclosure to tumor cells can be significantly enhanced by the 'high affinity tumor-targeting arm' and the 'fusion protein with low affinity for blocking the interaction between CD47 and SIRPα', thereby mediating efficient killing of the tumor cells (including but not limited to the effector function of antibodies upon specifically binding to the target antigen on the surface of tumor cells, targeted phagocytosis of macrophages).

The recombinant proteins of the present disclosure can achieve a dual targets effect by the 'high affinity tumor-targeting arm' (such as but not limited to half antibody) and the 'fusion protein with low affinity for blocking the interaction between CD47 and SIRPα', and the results of the present disclosure show that the recombinant proteins of the present disclosure exert anti-tumor effects through a variety of mechanisms with the multiple functions of the 'high affinity tumor-targeting arm' and the 'fusion protein with low affinity for blocking the interaction between CD47 and SIRPα', thereby achieving a higher efficacy.

Compared to a combination therapy of two separate targeting antibodies, the recombinant proteins of the present disclosure have the advantages such as a lower cost and more convenient use, and thus can solve the problems of low patient compliance and high cost accompanied by the combination therapy with antibodies.

The recombinant proteins of the present disclosure have a higher tissue permeability and efficacy than classical bispecific antibodies (consisted of two half antibodies), since the 'fusion protein with low affinity for blocking the interaction between CD47 and SIRPα' has a smaller molecular weight than the single arm of the classical bispecific antibodies (half antibody).

The 'fusion protein with low affinity for blocking the interaction between CD47 and SIRPα' of the present disclosure comprises different lengths of extracellular truncated variants of SIRPα, which can be quickly optimized to pair with the 'high affinity tumor-targeting arm' (such as half antibody), thereby avoiding the situation where the simultaneous binding of conventional bifunctional antibodies to the two target antigens may be affected by the spatial structure of the two target antigens (in particular, when the antibody recognition sites of the two target antigens differ greatly in the distance to the cell membrane, it is difficult to simultaneously bind to both the tumor-targeting antigen and the CD47 antigen), and providing an improved binding of the obtained recombinant proteins to tumor cells and a better killing of tumor cells.

The present disclosure provides a novel method for evaluating the safety of immunotherapeutic drugs targeting CD47 in vitro. Conventional early safety evaluation of anti-CD47 antibodies is generally performed by determining the effect of the drugs on RBC agglutination. In view of the species-specific binding of human SIRPα to human CD47, human blood must be used when evaluating whether a recombinant protein/antibody targeting CD47 has a safety problem of RBC agglutination in the human body, however, the application of human blood is restricted by ethics and the availability of genetic resources. In addition, experiments of RBC agglutination cannot be used to evaluate the early immunological safety of drugs. The present disclosure uses an optimized method for detecting ADCC activity (early in vitro immunological safety evaluation experiments), in place of the traditional human RBC agglutination experiment, to evaluate the early immunological safety of the recombinant proteins/antibodies (including monovalent or multivalent) which target CD47 and have ADCC activity. The method is simple, fast and not limited by blood resources.

The present disclosure provides a novel in vivo method for evaluating the safety of immunotherapeutic drugs targeting CD47. Pre-clinical in vivo evaluation on the immunological safety of drugs generally uses non-human primates, which requires a larger amount of the sample and thus increases the difficulty and cost of early sample preparation. There is yet no mature early immunological safety evaluation method on other species in vivo, leading to big safety risks in future clinical research and wastes in research and development investment. The present disclosure provides a Hu-NSG mouse, wherein the early safety evaluation experiment performed on the Hu-NSG can simulate the safety condition of the drug in the human immune system, reduce the preparation difficulty and cost, gain the advantages of low detection cost and high detection efficiency, and lower the risk in research and development of immune therapeutic drugs for cancer, compared to preclinical or clinical studies.

The present disclosure provides recombinant proteins, which achieves a high affinity and specific targetability to the tumor via a 'high affinity tumor-targeting arm' and the blocking of CD47-SIRPα interactions via a 'fusion protein with low affinity for blocking the interaction between CD47 and SIRPα'.

The recombinant proteins of the present disclosure overcome the technical problems of low yield and the difficulty in purifying the product accompanied with conventional bifunctional antibodies. In one embodiment of the present disclosure, for the recombinant proteins having a single-chain protein as the right arm (Fc knob mutation), when a light chain of the left arm, a heavy chain of the left arm (Fc hole mutation) and the right arm (Fc knob mutation) are all expressed in cells, more than 80% of the expressed products are the target proteins upon purification by protein A, the yield of expressed product is effectually increased. Although there are a small amount of left arm dimers, right arm dimers, left arm monomer and right arm monomer, they differ greatly from the desired product in properties such as molecular weight, charge distribution, and thus can be easily removed by conventional purification methods such as ion-exchange chromatography, hydrophobic interaction chromatography, size exclusion chromatography, affinity chromatography, salting out method (such as ammonium sulfate precipitation method), so the method of the present disclosure is suitable for industrial scale production.

The 'fusion protein with low affinity for blocking the interaction between CD47 and SIRPα' of the present disclosure and the 'high affinity tumor-targeting arm' (such as but not limited to half antibody) are generally capable of forming a recombinant protein which is capable of antagonizing the immunosuppressive effect of CD47.

The present disclosure overcomes the defects of the low pharmacological efficiency of the SIRPα-Fc fusion proteins in the prior art due to their low affinity to CD47, and avoid the adverse effects due to the high immunogenicity and high specificity for non-tumor targets of the high affinity variants of SIRPα. Meanwhile, the recombinant protein of the present disclosure has a weak binding affinity to CD47 expressed on the surface of normal cells (such as RBCs), therefore the side effects such as RBC agglutination and anemia caused by the treatment with conventional anti-CD47 antibodies can be reduced or avoided.

It should be understood by those skilled in the art that the scope of the present disclosure is not to be unduly limited due to one certain technical solution of the present disclosure which can achieve one certain express or implied beneficial effect of the present disclosure but cannot achieve or fully achieve another beneficial effect. It should be understood by those skilled in the art that any product, method, or use within the scope of the present disclosure is considered to have solved the technical problem of the present disclosure and achieved the corresponding technical effect, as long as it achieves any one of the explicit or implied beneficial effects of the present disclosure or an arbitrary combination thereof.

Specifically, the present disclosure relates to the following embodiments:

Embodiment 1: A bispecific recombinant protein, wherein the bispecific recombinant protein comprises a 'tumor-targeting arm' and a 'fusion protein for blocking the interaction between CD47 and SIRPα'.

Embodiment 2: The bispecific recombinant protein of embodiment 1, wherein the 'fusion protein for blocking the interaction between CD47 and SIRPα' comprises an extracellular truncated variant of SIRPα (including an extracellular truncated variant of human wild-type SIRPα or its variant with non-high affinity to CD47).

Embodiment 3: The bispecific recombinant protein of embodiment 2, wherein the extracellular truncated variant of SIRPα comprises a part or full of the amino acid sequence of the extracellular domain of SIRPα.

Embodiment 4: The bispecific recombinant protein of any one of embodiments 1-3, wherein a 'high affinity tumor-targeting arm' does not bind to a CD47, and the ratio of the binding affinity of the antibody corresponding to the 'high affinity tumor-targeting arm' to the target antigen on a tumor cell to the binding affinity of the homodimer of the monomer fusion protein corresponding to the 'fusion protein with low affinity for blocking the interaction between CD47 and SIRPα' to a CD47 on a tumor cell is at least 6.

Embodiment 5: The bispecific recombinant protein of any one of embodiments 1-4, wherein the extracellular truncated variant of SIRPα comprises an amino acid sequence selected from the group consisting of a1), a2), a3) and a4):
  a1) SEQ ID No: 30;
  a2) SEQ ID No: 31;
  a3) SEQ ID No: 32;
  a4) an amino acid sequence obtained by inserting, deleting, modifying and/or conservatively substituting at least one amino acid residue such as 1-5 amino acid residue(s) of any one of the amino acid sequence described above, wherein the binding affinity of monomer thereof to a CD47 is not higher than the binding affinity of monomer of a1), a2) or a3) to a CD47.

Embodiment 6: The bispecific recombinant protein of any one of embodiments 1-5, wherein the bispecific recombinant protein has a configuration comprising a left arm and a right arm which are symmetrically arranged, wherein the 'high affinity tumor-targeting arm' is arranged in the left arm, the 'fusion protein with low affinity for blocking the interaction between CD47 and SIRPα' is arranged in the right arm.

Embodiment 7: The bispecific recombinant protein of embodiment 6, wherein the left arm is in the form of Fab or Fab' of immunoglobulin, the right arm is an extracellular truncated variant of SIRPα.

Embodiment 8: The bispecific recombinant protein of embodiment 7, wherein the length of the right arm is configured for the distance from the epitope to which the left arm binds to the membrane surface of the target cell.

Embodiment 9: The bispecific recombinant protein of embodiment 8, when the 'high affinity tumor-targeting arm' is configured for binding a membrane-proximal epitope of the target cell, the extracellular truncated variant of SIRPα is selected from the shorter amino acid sequence among a1), a2), a3) and a4).

Embodiment 10: The bispecific recombinant protein of any one of embodiments 1-9, wherein the tumor-targeting arm is specific to a target selected from the group consisting of 5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, nectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA and CD138.

Embodiment 11: The bispecific recombinant protein of embodiment 10, wherein, when the target is CD20, EGFR or PD-L1, the extracellular truncated variant of SIRPα is a1); when the target is HER2, the extracellular truncated variant of SIRPα is a1) and a2).

Embodiment 12: The bispecific recombinant protein of any one of embodiments 1-11, wherein, the 'tumor-targeting arm' binds to the 'fusion protein blocking the interaction between CD47 and SIRPα' via two or three of the following bindings: intermolecular force, covalent bond (such as interchain disulfide bond) and salt bond.

Embodiment 13: The bispecific recombinant protein of any one of embodiments 1-12, wherein, the 'tumor-targeting arm' and/or the 'fusion protein for blocking the interaction between CD47 and SIRPα' further comprise an Fc region.

Embodiment 14: The bispecific recombinant protein of embodiment 13, wherein, the Fc region comprises a natural sequence of the Fc region or an unnatural sequence of the Fc region.

Embodiment 15: The bispecific recombinant protein of embodiment 14, wherein the Fc region is human Fc region.

Embodiment 16: The bispecific recombinant protein of embodiment 15, wherein the 'high affinity tumor-targeting arm' and the 'fusion protein with low affinity for blocking the interaction between CD47 and SIRPα' are heterodimerized by knobs-into-holes.

Embodiment 17: The bispecific recombinant protein of any one of embodiments 1-16, wherein the 'tumor-targeting arm' is a half antibody specific to a target selected from the group consisting of 5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, ectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA and CD138; preferably a half antibody of IgG1 antibody, optionally a human-mouse chimeric half antibody, a humanized half antibody, a fully human half antibody; more preferably a humanized or fully human half antibody of IgG1 antibody.

Embodiment 18: The bispecific recombinant protein of any one of embodiments 1-17, wherein the 'fusion protein for blocking the interaction between CD47 and SIRPα' is a fusion protein comprising an extracellular truncated variant of SIRPα and a binding sequence for binding the arm, the extracellular truncated variant of SIRPα and the binding sequence for binding the arm are optionally linked by an adaptor sequence, the binding sequence for binding the arm optionally comprises an Fc region.

Embodiment 19: The bispecific recombinant protein of any one of embodiments 1-18, wherein the 'fusion protein for blocking the interaction between CD47 and SIRPα' comprises an amino acid sequence selected from the group consisting of b1), b2), b3) and b4):
  b1) SEQ ID No: 26;
  b2) SEQ ID No: 27;
  b3) SEQ ID No: 28;
  b4) an amino acid sequence obtained by inserting, deleting, modifying and/or conservatively substituting at least one amino acid residue such as 1-5 amino acid residue(s) of any one of the amino acid sequence described above, wherein the binding affinity of homodimer thereof to a CD47 is not higher than the binding affinity of homodimer of b1), b2) or b3) to a CD47.

Embodiment 20: The bispecific recombinant protein of embodiment 19, wherein, when the 'high affinity tumor-targeting arm' targets CD20, then the 'high affinity tumor-targeting arm' comprises SEQ ID No: 16 and SEQ ID No: 17, the 'low affinity fusion protein for blocking the interaction between CD47 and SIRPα' comprises SEQ ID No: 26; when the 'high affinity tumor-targeting arm' targets EGFR, then the 'high affinity tumor-targeting arm' comprises SEQ ID No: 19 and SEQ ID No: 8, the 'fusion protein with low affinity for blocking the interaction between CD47 and SIRPα' comprises SEQ ID No: 26, SEQ ID No: 27 or SEQ ID No: 28; when the 'high affinity tumor-targeting arm' targets Her2, then the 'high affinity tumor-targeting arm' comprises SEQ ID No: 20 and SEQ ID No: 21, or SEQ ID No: 22 and SEQ ID No: 23, the 'fusion protein with low affinity for blocking the interaction between CD47 and SIRPα' comprises SEQ ID No: 26 or SEQ ID No: 27; or, when the 'high affinity tumor-targeting arm' targets PD-L1, then the 'high affinity tumor-targeting arm' comprises SEQ ID No: 24 and SEQ ID No: 13, and the 'fusion protein with low affinity for blocking the interaction between CD47 and SIRPα' comprises SEQ ID No: 26.

Embodiment 21: A nucleic acid molecule encoding the bispecific recombinant protein of any one of embodiments 1-20.

Embodiment 22: The nucleic acid molecule of embodiment 21, wherein the nucleic acid molecule encoding the 'high affinity tumor-targeting arm' and the nucleic acid molecule encoding the 'fusion protein with low affinity for blocking the interaction between CD47 and SIRPα' are presented in a same DNA strand, or presented in separate DNA strands.

Embodiment 23: An expression vector comprising the nucleic acid molecule of embodiment 21 or 22.

Embodiment 24: A cell comprising the expression vector of embodiment 23.

Embodiment 25: A method for preparing the bispecific recombinant protein comprising:
  1) providing a 'tumor-targeting arm';
  2) providing a 'fusion protein for blocking the interaction between CD47 and SIRPα';
  3) contacting the 'tumor-targeting arm' and the 'fusion protein for blocking the interaction between CD47 and SIRPα' to form the recombinant protein.

Embodiment 26: The method of embodiment 25, wherein expressing the recombinant protein in the cell of embodiment 24.

Embodiment 27: The method of embodiment 25, wherein the contacting comprises binding via two or three of the following bindings: intermolecular force, covalent bond (such as interchain disulfide bond) and salt bond.

Embodiment 28: The method of any one of embodiments 25-27, wherein the contacting comprises binding via knobs-into-holes technique.

Embodiment 29: A fusion protein, wherein the fusion protein comprises an extracellular truncated variant of SIRPα and a binding sequence for binding another polypeptide.

Embodiment 30: The fusion protein of embodiment 29, wherein the binding sequence for binding another polypeptide optionally is an Fc region; optionally, the Fc region comprises holes mutation(s) and/or knobs mutation(s).

Embodiment 31: The fusion protein of embodiment 29 or 30, wherein the extracellular truncated variant of SIRPα comprises a part or full of the amino acid sequence of the extracellular domain of human wild-type SIRPα or its high affinity variant.

Embodiment 32: The fusion protein of embodiment 31, wherein the extracellular truncated variant of SIRPα comprises an amino acid sequence selected from the group consisting of a1), a2), a3) and a4):
  a1) SEQ ID No: 30;
  a2) SEQ ID No: 31;
  a3) SEQ ID No: 32;
  a4) an amino acid sequence obtained by inserting, deleting, modifying and/or conservatively substituting at least one amino acid residue such as 1-5 amino acid residue(s) of any one of the amino acid sequence described above, wherein the binding affinity of monomer thereof to a CD47 is not higher than the binding affinity of monomer of a1), a2) or a3) to a CD47.

Embodiment 33: The fusion protein of any one of embodiments 29-31, wherein the fusion protein is selected from the group consisting of b1), b2), b3) and b4):
  b1) SEQ ID No: 26;
  b2) SEQ ID No: 27;
  b3) SEQ ID No: 28;
  b4) an amino acid sequence obtained by inserting, deleting, modifying and/or conservatively substituting at least one amino acid residue such as 1-5 amino acid residue(s) of any one of the amino acid sequence described above, wherein the binding affinity of homodimer thereof to a CD47 is not higher than the binding affinity of homodimer of b1), b2) or b3) to a CD47.

Embodiment 34: A nucleic acid molecule encoding the bispecific recombinant protein of any one of embodiments 29-33.

Embodiment 35: An expression vector comprising the nucleic acid molecule of embodiment 34.

Embodiment 36: A cell comprising the expression vector of embodiment 35.

Embodiment 37: A method for preparing the bispecific recombinant protein of any one of embodiments 29-33, wherein the method comprises:
  1) providing an extracellular truncated variant of SIRPα;
  2) providing a binding sequence for binding another polypeptide;
  3) contacting the extracellular truncated variant of SIRPα and the binding sequence for binding another polypeptide to form the bispecific recombinant protein.

Embodiment 38: A method for preparing the bispecific recombinant protein of any one of embodiments 29-33, wherein the method comprises expressing the bispecific recombinant protein in the cell of embodiment 32.

Embodiment 39: A pharmaceutical composition comprising the recombinant protein of any one of embodiments 1-20 or the fusion protein of any one of embodiments 29-33, and an optional adjuvant, excipient or pharmaceutically acceptable carrier.

Embodiment 40: The pharmaceutical composition of embodiment 39, which is in the form of injection or lyophilized powder.

Embodiment 41: A pharmaceutical composition comprising a nucleic acid molecule encoding the recombinant protein of any one of embodiments 1-20 or the fusion protein of any one of embodiments 29-33, and an optional pharmaceutically acceptable carrier.

Embodiment 42: A use of the fusion protein of any one of embodiments 29-33 in preparing the recombinant protein of any one of embodiments 1-20.

Embodiment 43: A use of the recombinant protein of any one of embodiments 1-20 or the fusion protein of any one of embodiments 29-33 in manufacturing a medicament for treating a tumor.

Embodiment 44: The use of embodiment 43, wherein the tumor is a hematological tumor or a solid tumor selected from the group consisting of breast cancer, colorectal cancer, lung cancer, pancreatic cancer, esophageal cancer, endometrial cancer, ovarian cancer, gastric cancer, prostate cancer, kidney cancer, cervical cancer, myeloma, lymphoma, leukemia, thyroid cancer, uterine cancer, bladder cancer, neuroendocrine cancer, head and neck cancer, liver cancer, nasopharyngeal carcinoma, testicular cancer, small cell lung cancer, non-small cell lung cancer, melanoma, basal cell skin cancer, squamous cell skin cancer, dermatofi-brosarcoma protuberan, merkel cell carcinoma, glioblastoma, glioma, sarcoma, mesothelioma, myelodysplastic syndrome and the like.

Embodiment 45: A use of the recombinant protein of any one of embodiments 1-20 or the fusion protein of any one of embodiments 29-33 in manufacturing a medicament for in vivo gene therapy.

Embodiment 46: A method for evaluating the early immunological safety of a recombinant protein/antibody which targets CD47 and has ADCC activity in vitro, wherein the method comprises:
  a) providing a recombinant protein/antibody (including monovalent or multivalent) which targets and has ADCC activity;
  b) detecting the ADCC activity of the recombinant protein/antibody; and
  c) evaluating the early immunological safety of the recombinant protein/antibody.

Embodiment 47: A method for evaluating the early immunological safety of a recombinant protein/antibody which targets CD47 and has ADCC activity in vitro, wherein the method comprises:
  a) preparing an effector cell, for example, but not limited to human NK92MI-CD16a effector cell;
  b) contacting the effector cell and the recombinant protein/antibody;
  c) detecting the ADCC activity of the recombinant protein/antibody; and
  d) evaluating the early immunological safety of the recombinant protein/antibody based on the ADCC activity.

Embodiment 48: The method of embodiment 47, comprising:

a) harvesting well-grown human NK92MI-CD16a effector cells, resuspending the harvested effector cells to a cell density of $1\times10^5$ cells/mL to $5\times10^6$ cells/mL;

b) incubating the recombinant protein/antibody with a gradient concentration and the effector cells prepared in step a) for 0.5-5 h;

c) determining the LDH activity and calculating the rate of cell lysis after the completion of incubation; and d) evaluating the early immunological safety of the recombinant protein/antibody based on the rate of cell lysis, wherein the recombinant protein/antibody with a lower rate of cell lysis has a higher immunological safety.

Embodiment 49: A method for evaluating the early immunological safety of a recombinant protein/antibody (including monovalent or multivalent) targeting CD47 in vivo, wherein the method comprises:

a) providing the protein/antibody (including monovalent or multivalent) targeting CD47;

b) providing a Hu-NSG mouse;

c) contacting the recombinant protein/antibody and the Hu-NSG mouse; and d) evaluating the early immunological safety of the recombinant protein/antibody in the Hu-NSG mouse.

Embodiment 50: A method for evaluating the early immunological safety of a recombinant protein/antibody (including monovalent or multivalent) targeting CD47 in vivo, wherein the method comprises:

a) providing a Hu-NSG mouse;

b) administrating the recombinant protein/antibody (including monovalent or multivalent);

c) at 24-96 h after administration, taking venous blood from the mouse, lysing the RBCs, incubating the remaining cells and fluorescently labeled anti-human CD45 antibody, anti-human CD19 antibody or anti-human CD3 antibody for 15-60 min, and detecting by flow cytometry; and d) evaluating the early immunological safety of the recombinant protein/antibody based on the clearance rate of cells, wherein the recombinant proteins/antibody with a lower clearance rate of cells (except the target cells) has a higher immunological safety.

BRIEF DESCRIPTION OF THE DRAWINGS

FIG. 8A corresponds to Raji cells (CD20+CD47); FIG. 8B corresponds to SKBR-3 cells (Her2+CD47); FIG. 8C corresponds to A431 cells (EGFR+CD47); FIG. 8D corresponds to NCI-H441 cells (PD-L1+CD47).

FIG. 13B corresponds to Hu5F9-G4 (6.7 µg/mouse); FIG. 13C corresponds to Ofa-Fc1-D1-Fc2 (5 µg/mouse).

FIG. 14A-D correspond to Ofa-Fc1-D1-Fc2 (1 µg/mouse), wherein FIGS. 14A and 14B show the detection results before administration, and FIGS. 14C and 14D show the detection results at 72 hours after administration. FIG. 14E-H correspond to Ofa-Fc1-D1m-Fc2 (1 µg/mouse), wherein FIG. 14E and FIG. 14F show the detection results before administration, FIG. 14G and FIG. 14H show the detection results at 72 hours after administration.

FIGS. 15A-15D shows the immunophenotyping FACS analysis at 96 hours after treating the Hu-NSG mice with different samples at a high dose. FIG. 15A-B show the results at 96 hours after administration, wherein Fig. A corresponds to Hu5F9-G4 (200 µg/mouse) and FIG. 15B corresponds to Ofa-Fc1-D1-Fc2 at a high dose (150 µg/mouse). FIG. 15C-D show the results at 14 days after administration, wherein FIG. 15C corresponds to Hu5F9-G4 (200 µg/mouse) and FIG. 15D corresponds to Ofa-Fc1-D1-Fc2 at a high dose (150 µg/mouse).

FIGS. 16A-16B show the results of the binding of the recombinant proteins of the present disclosure to the dual targets (Her2, CD47) in SKBR-3. FIG. 16A shows the detection results of Anti-Her2(T)-Fc1-D1-Fc2 and Anti-Her2(T)-Fc1-D1-D2-Fc2; and FIG. 16B shows the detection results of Anti-Her2(P)-Fc1-D1-Fc2 and Anti-Her2(P)-Fc1-D1-D2-Fc2.

FIGS. 17A-17E show the amino acid sequences and DNA sequences corresponding to the exemplary proteins of the present disclosure.

FIGS. 18A-18B show the effect of Ofa-Fc1-D1-Fc2 on the number of RBCs of cynomolgus monkeys at two doses; FIG. 18B shows the effect of Ofa-Fc1-D1-Fc2 on the hemoglobin of cynomolgus monkeys at two doses.

DETAILED DESCRIPTION OF THE PREFERRED EMBODIMENT

Figure 1:
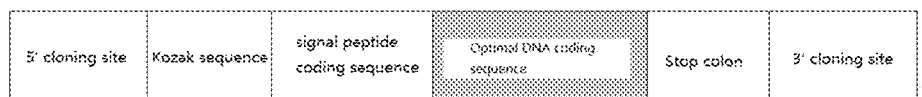
FIG. 1 shows the structure of the insert of the present disclosure to be inserted into the expression vector.

In order to promote an understanding of the present disclosure, the present disclosure will be illustrated with reference to certain examples and some specific terms described below. However, it should be understood that these specific examples are not intended to limit the scope of the present disclosure, any alterations and further modifications to the described examples, as well as any further applications of the disclosure, will all be obvious to those skilled in the art.

Recombinant Protein

As used herein, the term "recombinant protein" refers to a protein that is artificially engineered/constructed, rather than a naturally occurring protein. "Recombinant" contained in the term "recombinant protein" of the present disclosure does not denote a mode of production, and is merely used to indicate that "recombinant protein" does not naturally occur. The recombinant protein of the present disclosure may be an expressed protein and may be an assembled protein.

Optionally, the bispecific recombinant protein of the present disclosure comprises a 'high affinity tumor-targeting arm' and a 'fusion protein with low affinity for blocking the interaction between CD47 and SIRPα'.

As used herein, "high affinity tumor-targeting" refers to that the binding affinity of the recombinant protein of the present disclosure to a tumor is higher than or substantially equivalent to the binding affinity of tumor-binding antibody drugs in the prior art to the tumor, wherein the binding affinity of tumor-binding antibody drugs in the prior art to the tumor generally has an EC50 at nM or pM level. Preferably, the ratio of the binding affinity of the antibody corresponding to the 'high affinity tumor-targeting arm' to the target antigen on a tumor cell to the binding affinity of the homodimer of the monomer fusion protein corresponding to the 'fusion protein with low affinity for blocking the interaction between CD47 and SIRPα' to CD47 on a tumor cell is at least 6, optionally 6, 7, 8, 9, 10, 11, 12, 13, 14, 15 or more, or any value between them. Optionally, in the recombinant protein of the present disclosure, the ratio of the binding affinity of the antibody corresponding to the 'high affinity tumor-targeting arm' to the target antigen on a tumor cell to the binding affinity of the homodimer of SIRPα-Fc corresponding to the 'fusion protein with low affinity for blocking the interaction between CD47 and SIRPα' to CD47 on a tumor cell is at least 6, optionally 6, 7, 8, 9, 10, 11, 12, 13, 14, 15 or more, or any value between them.

As used herein, "low affinity for blocking the interaction between CD47 and SIRPα" refers to that the recombinant protein of the present disclosure is capable of blocking the interaction between CD47 and SIRPα with a low affinity. Preferably, the binding affinity of the 'fusion protein with low affinity for blocking the interaction between CD47 and SIRPα' to CD47 is not higher than the binding affinity of 'the homodimer of a monomer fusion protein comprising an extracellular truncated variant of SIRPα' to CD47. More preferably, the binding affinity of which is not higher than the binding affinity of humanized SIRPα-Fc fusion protein to CD47.

The bispecific recombinant protein described herein can significantly enhance the tumor-targeting saturation binding abundance of a recombinant protein with an effect of modulating the function of macrophages and reduce non-tumor target side effects, as long as the ratio of the binding affinity of the antibody corresponding to the 'high affinity tumor-targeting arm' to the target antigen on tumor cell to the binding affinity of the homodimer of the monomer fusion protein corresponding to the 'fusion protein with low affinity for blocking the interaction between CD47 and SIRPα to CD47' on tumor cell is at least 6.

The method for detecting the binding affinity used herein is well known to those skilled in the art, including but is not limited to, ELISA and/or flow cytometry.

Optionally, the fusion protein of a extracellular truncated variant of signal regulatory protein alpha α (including a wild-type truncated variant and its non-high affinity variant) and a Fc described in the present disclosure and a half antibody can form a heterodimer by modifying the heavy chain of antibody, specifically, can be heterodimerized by Knobs-into-holes and/or mediated by interchain disulfide bond and/or salt bond to form a recombinant protein.

Figure 3:
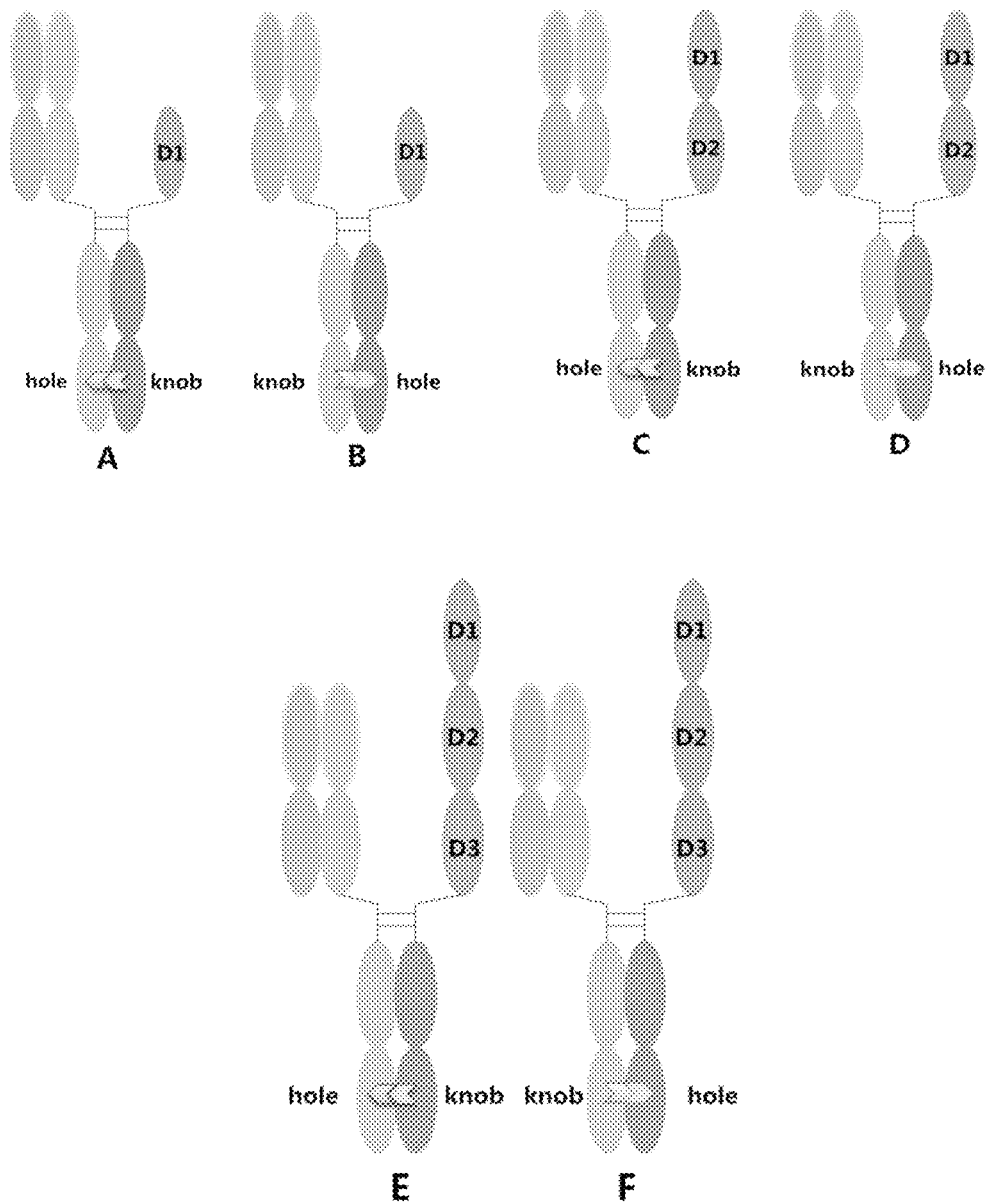
FIG. 3 shows the structure of an exemplary embodiment of the recombinant proteins of the present disclosure.

Optionally, when "tumor-targeting arm" or "half antibody" or "left arm" or "half antibody structure" or "Ig molecular monomer" and "CD47-targeting arm" or "right arm" or "fusion protein of a truncated variant of signal regulatory protein α and Fc" or "SIRPα-Fc" are heterodimerized by knobs-into-holes to form a recombinant protein, the structure of the obtained recombinant protein is as shown in FIG. 3. Wherein, the left arm is a tumor-targeting half antibody, including but is not limited to anti-5T4 half antibody, anti-AGS-16 half antibody, anti-ALK1 half antibody, anti-ANG-2 half antibody, anti-B7-H3 half antibody, anti-B7-H4 half antibody, anti-c-fms half antibody, anti-c-Met half antibody, anti-CA6 half antibody, anti-CD123 half antibody, anti-CD19 half antibody, anti-CD20 half antibody, anti-CD22 half antibody, anti-EpCAM half antibody, anti-CD30 half antibody, anti-CD32b half antibody, anti-CD37 half antibody, anti-CD38 half antibody, anti-CD40 half antibody, anti-CD52 half antibody, anti-CD70 half antibody, anti-CD74 half antibody, anti-CD79b half antibody, anti-CD98 half antibody, anti-CEA half antibody, anti-CEACAM5 half antibody, anti-CLDN18.2 half antibody, anti-CLDN6 half antibody, anti-CS1 half antibody, anti-CXCR4 half antibody, anti-DLL-4 half antibody, anti-EGFR half antibody, anti-EGP-1 half antibody, anti-ENPP3 half antibody, anti-EphA3 half antibody, anti-ETBR half antibody, anti-FGFR2 half antibody, anti-FN half antibody, anti-FR-α half antibody, anti-GCC half antibody, anti-GD2 half antibody, anti-GPC-3 half antibody, anti-GPNMB half antibody, anti-HER2 half antibody, anti-HER3 half antibody, anti-HLA-DR half antibody, anti-ICAM-1 half antibody, anti-IGF-1R half antibody, anti-IL-3R half antibody, anti-LIV-1 half antibody, anti-MSLN half antibody, anti-MUC16 half antibody, anti-MUC1 half antibody, anti-NaPi2b half antibody, anti-nectin-4 half antibody, anti-Notch 2 half antibody, anti-Notch 1 half antibody, anti-PD-L1 half antibody, anti-PD-L2 half antibody, anti-PDGFR-α half antibody, anti-PS half antibody, anti-PSMA half antibody, anti-SLTRK6 half antibody, anti-STEAP1 half antibody, anti-TEM1 half antibody, anti-VEGFR half antibody, anti-CD25 half antibody, anti-CD27L half antibody, anti-DKK-1 half antibody, anti-CSF-1R half antibody, anti-MSB0010718C half antibody, anti-BCMA half antibody, anti-CD138 half antibody. The right arm is a fusion protein formed by linking an extracellular truncated variant of SIRPα (including human wild-type SIRPα and its non-high affinity mutant) and hinge region and Fc region of IgG antibody. Wherein the Fc region of the right arm is a hole mutant, the corresponding Fc region of the left arm is a knob mutant; or the right arm is a knob mutant, the corresponding Fc region of the left arm is a hole mutant. As known to those skilled in the art, the Fc region can also contain multiple mutations of holes and/or knobs simultaneously.

Table 1 shows the configuration of exemplary recombinant protein molecules.

TABLE 1

Exemplary recombinant protein molecules

| No. | Left arm | Right arm |
| --- | --- | --- |
| 1 | Anti-CD20-Fc | D1-Fc2 |
| 2 | Anti-CD20-Fc1 | D1-D2-Fc2 |
| 3 | Anti-CD20-Fc1 | D1-D2-D3-Fc2 |
| 4 | Anti-CD20-Fc1 | D1'''-Fc2 |
| 5 | Anti-CD20-Fc1 | D1'''-D2-Fc2 |
| 6 | Anti-PD-L1-Fc1 | D1-Fc2 |
| 7 | Anti-PD-L1-Fc1 | D1-D2-Fc2 |
| 8 | Anti-PD-L1-Fc1 | D1-D2-D3-Fc2 |
| 9 | Anti-PD-L1-Fc1 | D1'''-Fc2 |
| 10 | Anti-PD-L1-Fc1 | D1'''-D2-Fc2 |
| 11 | Anti-EGFR-Fc1 | D1-Fc2 |
| 12 | Anti-EGFR-Fc1 | D1-D2-Fc2 |
| 13 | Anti-EGFR-Fc1 | D1-D2-D3-Fc2 |
| 14 | Anti-EGFR-Fc1 | D1'''-Fc2 |
| 15 | Anti-EGFR-Fc1 | D1'''-D2-Fc2 |
| 16 | Anti-Her2-Fc1 | D1-Fc2 |
| 17 | Anti-Her2-Fc1 | D1-D2-Fc2 |
| 18 | Anti-Her2-Fc1 | D1-D2-D3-Fc2 |
| 19 | Anti-Her2-Fc1 | D1'''-Fc2 |
| 20 | Anti-Her2-Fc1 | D1'''-D2-Fc2 |

Notes:
D1''' represents a high affinity mutant of SIRPα extracellular truncated variant D1; D1 represents the extracellular D1 domain of human wild-type SIRPα or its non-high affinity mutant; Fc represents a wild-type Fc region; Fc1 represents an Fc region having a hole or holes mutation, Fc2 represents an Fc region having a knob or knobs mutation.

The corresponding amino acid sequence and DNA sequence of the recombinant proteins of the present disclosure are shown in FIG. 17A-E and the sequence listing file of the present disclosure.

Antibody

As used herein, the term "antibody" or "immunoglobulin" is a heterotetrameric glycoprotein of about 150,000 Daltons having a same structural feature, composing of two identical light chains (L) and two identical heavy chains (H). Each light chain is linked to a heavy chain by covalent disulfide bond(s), while the number of interchain disulfide bonds of the heavy chains varies between different immunoglobulin isotypes. Each heavy and light chain also has regularly spaced intrachain disulfide bonds. Each heavy chain has, at one end, a variable domain ($V_H$) followed by a number of constant domains. Each light chain has a variable domain at one end ($V_L$) and a constant domain at its other end; the constant domain of the light chain is aligned with the first constant domain of the heavy chain, and the light chain variable domain is aligned with the variable domain of the heavy chain. Particular amino acid residues are believed to form an interface between the light- and heavy-chain variable domains.

Tumor-Targeting Arm

As used herein, the term "tumor-targeting arm" or "half antibody" or "left arm" or "half antibody structure" or "Ig molecule monomer" refers to a heterodimeric glycoprotein composed of a light chain (L) and a heavy chain (H) of the antibody, which is the basic structure of the immunoglobulin molecule, and these terms can be used interchangeably herein. Its molecular weight is half of the molecular weight of the corresponding antibody, about 75,000 Daltons, wherein the light chain is linked to the heavy chain by a covalent disulfide bond. The heavy and light chain also has regularly spaced intrachain disulfide bonds. Each heavy chain has, at one end, a variable domain ($V_H$) followed by a number of constant domains. Each light chain has a variable domain at one end ($V_L$) and a constant domain at its other end; the constant domain of the light chain is aligned with the first constant domain of the heavy chain, and the light chain variable domain is aligned with the variable domain of the heavy chain. Particular amino acid residues are believed to form an interface between the light- and heavy-chain variable domains.

As used herein, the term "tumor-targeting arm", "half antibody" or "left arm" or "half antibody structure" or "Ig molecular monomer" may be an IgG protein targeting various tumors. The target molecules include, but are not limited to 5T4, AGS-16, ALK1, ANG-2, B7-H3, B7-H4, c-fms, c-Met, CA6, CD123, CD19, CD20, CD22, EpCAM, CD30, CD32b, CD37, CD38, CD40, CD52, CD70, CD74, CD79b, CD98, CEA, CEACAM5, CLDN18.2, CLDN6, CS1, CXCR4, DLL-4, EGFR, EGP-1, ENPP3, EphA3, ETBR, FGFR2, FN, FR-α, GCC, GD2, GPC-3, GPNMB, HER2, HER3, HLA-DR, ICAM-1, IGF-1R, IL-3R, LIV-1, MSLN, MUC16, MUC1, NaPi2b, nectin-4, Notch 2, Notch 1, PD-L1, PD-L2, PDGFR-α, PS, PSMA, SLTRK6, STEAP1, TEM1, VEGFR, CD25, CD27L, DKK-1, CSF-1R, MSB0010718C, BCMA and CD138.

The Fc sequence of "tumor-targeting arm", "half antibody" or "left arm" or "half antibody structure" or "Ig molecular monomer" can employ a hole or holes mutant and/or a knob or knobs mutant.

CD47-Targeting Arm

As used herein, the term "CD47-targeting arm" or "right arm" or "fusion protein of a truncated variant of signal regulatory protein α and Fc" or "SIRPα-Fc" or 'fusion protein for blocking the interaction between CD47 and SIRPα' can be used interchangeably herein. As known to those skilled in the art, the "CD47-targeting arm" or "right arm" or "fusion protein of a truncated variant of signal regulatory protein α and Fc" or "SIRPα-Fc" or "fusion protein blocking the interaction between CD47 and SIRPα" has a variable molecular length. Optionally, the "CD47-targeting arm" or "right arm" or "fusion protein of a truncation of signal regulatory protein α and Fc" or "SIRPα-Fc" or "fusion protein blocking the interaction between CD47 and SIRPα" with a plurality of different molecular lengths can be formed by linking an extracellular truncated variant of SIRPα (including a human wild type SIRPα and its non-high affinity mutant) to the hinge region and Fc region of the IgG1 antibody. The IgG1 can be human IgG1.

The Fc of the "CD47-targeting arm" or "right arm" or "fusion protein of a truncation of signal regulatory protein α and Fc" or "SIRPα-Fc" or "fusion protein for blocking the interaction between CD47 and SIRPα" can employ a hole or holes mutant and/or a knob or knobs mutant.

As known to those skilled in the art, "tumor-targeting arm" or "half antibody" or "left arm" or "half antibody structure" or "Ig molecular monomer" and "CD47-targeting arm" or "right arm" or "signal regulatory protein atruncated variant-Fc fusion protein" or "SIRPα-Fc" or "fusion protein for blocking the interaction between CD47 and SIRPα" can form a heterodimeric recombinant protein by modifying the Fc fragment (region). Specifically, the recombinant proteins of the present disclosure can be obtained via two or three of the following bindings: intermolecular force, covalent bond (such as interchain disulfide bond) and salt bond. Optionally, the recombinant proteins of the present disclosure are obtained by the knobs-into-holes technique.

Knobs-into-Holes Technique

As used herein, the term "knobs-into-holes technology" or "knobs-into-holes" is using genetic engineering techniques to induce different mutations in two CH3 domains of the heavy chain, thereby promoting the heterodimerization of the heavy chain. In this technology, a knob is made on one heavy chain and a hole is made on the other heavy chain, then the two heavy chains preferentially couple together to form an asymmetric antibody (Ridgway J B, et al. 'Knobs-into-holes' engineering of antibody CH3 domains for heavy chain heterodimerization. Protein Engineering, 1996, 9(7): 617-621). As known to those skilled in the art, a plurality of knobs and/or holes can be made on one heavy chain, and correspondingly, a plurality of holes and/or holes can also be made on the other heavy chain.

SIRPα

As used herein, the term "SIRPα" is signal regulatory protein α, also known as CD172a. Signal regulatory protein (SIRP) is a transmembrane glycoprotein including three family members, SIRPα (CD172a), SIRPβ (CD172b) and SIRPγ (CD172g). These three members have similar extramembranous region and different intramembranous region. The extramembranous region contains three immunoglobulin (Ig)-like regions, of which the first region belongs to IgV region and the second and third regions belong to IgC region. The intramembranous region of SIRPα (CD172a) contains two inhibitory signal domains that transmit an inhibitory signal and inhibit the corresponding function of the cell. The intramembranous region of SIRPβ (CD172b) and SIRPγ (CD172g) is short and has no signal transduction region, but SIRPβ (CD172b) can transmit an activation signal via an adaptor protein (such as DAP12). SIRP proteins are mainly expressed in macrophages (Mφ), dendritic cells (DC) and neuronal cells. It specifically refers to human wild type SIRPαand its mutant with non-high affinity to CD47.

Extracellular Truncated Variant of SIRPα

"Extracellular truncated variant" is used in relation to a protein that has a transmembrane function. As used herein, "extracellular truncated variant of SIRPα" refers to a part or full of the amino acid sequence of the extramembranous region of human wild type SIRPαand its mutant with non-high affinity to CD47 that was selectively truncated.

As used herein, the terms "D1", "D2" and "D3" refer to the three Ig-like extracellular domains of SIRPα, which are successively D1 domain (Ig variable region-like domain, IgV region), D2 domain (Ig constant region-like domain, IgC region) and D3 domain (Ig constant region-like domain, IgC region) starting from N-terminus of the protein (Lee W Y, et al. The Role of cis Dimerization of Signal Regulatory Protein α (SIRPα) in Binding to CD47. *J Biol Chem*, 2010, 285 (49): 37953-37963).

SIRPα-Fc Fusion Protein

As used herein, the term "SIRPα-Fc fusion protein" refers to a fusion protein comprising an extracellular truncated variant of SIRPα, an adaptor sequence and an Fc region. The adaptor sequence and/or Fc region contained in the above sequences can be arbitrarily replaced according to the methods well known to those skilled in the art or with common adaptor sequences and/or Fc regions.

In order to avoid the influence of glycosylation, the present disclosure mutates asparagine to alanine on D1 (Reference: Lee W Y, et al. Novel Structural Determinants on SIRP α that Mediate Binding to CD47. *Journal of Immunology*, 2007, 179(11): 7741-7750).

D1, D2 and D3 of the present disclosure also include corresponding adaptor sequence.

Adaptor Sequence

As used herein, the term "adaptor sequence" refers to an amino acid sequence linking an extracellular truncated variant of SIRPα and a binding sequence, optionally, the adaptor sequence is a hinge region of IgG antibody, optionally comprising a hinge region and a heavy chain CH1 domain of IgG. The adaptor sequence or hinge region sequence contained in the above sequences may be arbitrarily replaced according to the methods well known to those skilled in the art or with common adaptor sequences or hinge region sequences.

Binding Sequence

As used herein, the term "binding sequence" refers to a sequence that binds a 'high affinity tumor-targeting arm' to a 'fusion protein with low affinity for blocking the interaction between CD47 and SIRPα', optionally, the binding sequence comprises a hinge region and an Fc region; more optionally, the Fc region comprises a knob or knobs mutation(s) and/or a hole or holes mutation(s). The binding sequence, hinge region sequence or Fc region sequence contained in the above sequences may be arbitrarily replaced according to the methods well known to those skilled in the art or with common binding sequences, hinge region sequences or Fc region sequences.

CD47

CD47 is a transmembrane glycoprotein belonging to the immunoglobulin superfamily and is expressed on the cell surface of almost all cells including RBCs. Ligands for CD47 include integrin, thrombospondin-1 and signal regulatory protein (SIRP). CD47 has a variety of biological functions, including cell migration, T cell activation, dendritic cell activation, axonal development, and the like. In addition, CD47 can inhibit phagocytosis of macrophages by interacting with SIRPα. In this way, CD47 transmits a so-called "don't eat me" signal that protects normal cells such as RBCs, B cells, and T cells from being phagocytosed by macrophages.

Ofa

As used herein, the terms "Ofa", "Ofatumumab" and "Anti-CD20 (Ofatumumab)" are used interchangeably herein and refer to the anti-CD20 antibody Ofatumumab.

Obi

As used herein, the terms "Obi", "Obinutuzumab" and "Anti-CD20 (Obinutuzumab)" are used interchangeably herein and refer to the anti-CD20 antibody Obinutuzumab.

Hu5F9-G4

As used herein, the terms "Anti-CD47 mAb", "anti-CD47 antibody" and "Hu5F9-G4" are used interchangeably herein and refer to the anti-CD47 antibody Hu5F9-G4.

Anti-EGFR mAb

As used herein, the terms "Anti-EGFR mAb" and "JMT101" are used interchangeably herein and refer to the anti-EGFR antibody JMT101. JMT101 is a humanized anti-EGFR monoclonal antibody, see BA03 of the patent ZL201210406288.3.

Trastuzumab

As used herein, the terms "trastuzumab", "Trastuzumab", "Anti-Her2(T) mAb" and "Herceptin" are used interchangeably herein and refer to the anti-Her2 antibody Trastuzumab.

Pertuzumab

As used herein, the terms "patezumab", "Pertuzumab", "Anti-Her2(P) mAb" and "Perjeta" are used interchangeably herein and refer to the anti-Her2 antibody Pertuzumab.

Atezolizumab

As used herein, the terms "Tecentriq" and "Atezolizumab" are used interchangeably herein and refer to the anti-PD-L1 antibody Atezolizumab.

SIRPα D1-Fc

As used herein, the terms "SIRPα D1-Fc" and "D1-Fc" are used interchangeably herein and refer to a dimer of the single-chain fusion protein SIRPα. D1-Fc.

Ofa-Fc1

Ofa-Fc1 refers to Ofatumumab half antibody having an Fc region with a hole mutation.

Anti-Her2(T)-Fc1

Anti-Her2(T)-Fc1 refers to Transtuzumab half antibody having an Fc region with a hole mutation.

Anti-Her2(P)-Fc1

Anti-Her2(P)-Fc1 refers to Pertuzumab half antibody having an Fc region with a hole mutation.

Anti-EGFR-Fc1

Anti-EGFR-Fc1 refers to anti-EGFR half antibody having an Fc region with a hole mutation.

D1-Fc2

D1-Fc2 refers to a fusion protein comprising D1 domain truncated from the extracellular domain of SIRPα and an Fc region having a knob mutation.

D1-D2-Fc2

D1-D2-Fc2 refers to a fusion protein comprising D1 and D2 domains truncated from the extracellular domain of SIRPα and an Fc region with a knob mutation.

D1-D2-D3-Fc2

D1-D2-D3-Fc2 refers to a fusion protein comprising D1, D2 and D3 domains truncated from the extracellular domain of SIRPα and an Fc region with a knob mutation.

Treatment

As used herein, the terms "treating" "therapy" and "treatment" are used interchangeably. The term "treating" includes controlling the progression of a disease, a disorder and a condition and related symptoms, preferably reducing or alleviating the influence of one or more symptoms of a disease, a disorder and a condition. This term includes cure of the disease or complete elimination of the symptom. This term includes remission of the symptom. This term also includes, but is not limited to, non-cure palliative treatment. The term "treating" includes administering to a subject a therapeutically effective amount of a pharmaceutical composition comprising the recombinant protein or the fusion protein of the present disclosure to prevent or delay, alleviate or relieve the progression of a disease, a disorder, a condition, or the influence of one or more symptoms of a disease, a disorder and a condition.

Administration

As used herein, the term "administration" refers to the delivery of a therapeutically effective amount of a pharmaceutical composition comprising the recombinant protein or the fusion protein of the present disclosure to a subject. The administration can be systemic or topical. The administration can be performed with a delivery device, such as a syringe. Mode of administration include, but is not limited to, embedding, snorting, spraying, injecting, and the like. Route of administration include inhalation, intranasal, oral, intravenous, subcutaneous or intramuscular administration and the like.

TABLE 2-1

Correspondence between sequence name and sequence number

| Sequence number | Sequence name |
|---|---|
| SEQ ID NO: 1 | Ofa heavy chain amino acid sequence |
| SEQ ID NO: 2 | Ofa light chain amino acid sequence |
| SEQ ID NO: 3 | Obi heavy chain amino acid sequence |
| SEQ ID NO: 4 | Obi/Obi-Fc1 light chain amino acid sequence |
| SEQ ID NO: 5 | Hu5F9-G4 heavy chain amino acid sequence |
| SEQ ID NO: 6 | Hu5F9-G4 light chain amino acid sequence |
| SEQ ID NO: 7 | JMT101 heavy chain amino acid sequence |
| SEQ ID NO: 8 | JMT101/Anti-EGFR-Fc1 light chain amino acid sequence |
| SEQ ID NO: 9 | Trastuzumab heavy chain amino acid sequence |
| SEQ ID NO: 10 | Trastuzumab light chain amino acid sequence |
| SEQ ID NO: 11 | SIRPα D1-Fc amino acid sequence |
| SEQ ID NO: 12 | Atezolizumab heavy chain amino acid sequence |
| SEQ ID NO: 13 | Atezolizumab/Anti-PD-L1(Ate)-Fc1 light chain amino acid sequence |
| SEQ ID NO: 14 | D1-Fc2 DNA sequence |
| SEQ ID NO: 15 | D1-D2-Fc2 DNA sequence |
| SEQ ID NO: 16 | Ofa-Fc1 heavy chain amino acid sequence |
| SEQ ID NO: 17 | Ofa-Fc1 light chain amino acid sequence |
| SEQ ID NO: 18 | Obi-Fc1 heavy chain amino acid sequence |
| SEQ ID NO: 19 | Anti-EGFR-Fc1 heavy chain amino acid sequence |
| SEQ ID NO: 20 | Anti-Her2(T)-Fc1 heavy chain amino acid sequence |
| SEQ ID NO: 21 | Anti-Her2(T)-Fc1 light chain amino acid sequence |
| SEQ ID NO: 22 | Anti-Her2(P)-Fc1 heavy chain amino acid sequence |
| SEQ ID NO: 23 | Anti-Her2(P)-Fc1 light chain amino acid sequence |
| SEQ ID NO: 24 | Anti-PD-L1(Ate)-Fc1 heavy chain amino acid sequence |
| SEQ ID NO: 25 | D1-D2-D3-Fc2 DNA sequence |
| SEQ ID NO: 26 | D1-Fc2 amino acid sequence |
| SEQ ID NO: 27 | D1-D2-Fc2 amino acid sequence |
| SEQ ID NO: 28 | D1-D2-D3-Fc2 amino acid sequence |
| SEQ ID NO: 29 | D1′′′-Fc2 amino acid sequence |
| SEQ ID NO: 30 | D1 amino acid sequence |
| SEQ ID NO: 31 | D1-D2 amino acid sequence |
| SEQ ID NO: 32 | D1-D2-D3 amino acid sequence |
| SEQ ID NO: 33 | D1′′′ amino acid sequence |
| SEQ ID NO: 34 | Ofa-Fc1 heavy chain DNA sequence |
| SEQ ID NO: 35 | Ofa-Fc1 light chain DNA sequence |
| SEQ ID NO: 36 | Obi-Fc1 heavy chain DNA sequence |
| SEQ ID NO: 37 | Anti-EGFR-Fc1 heavy chain DNA sequence |
| SEQ ID NO: 38 | Anti-Her2(T)-Fc1 heavy chain DNA sequence |
| SEQ ID NO: 39 | Anti-Her2(T)-Fc1 light chain DNA sequence |
| SEQ ID NO: 40 | Anti-Her2(P)-Fc1 heavy chain DNA sequence |
| SEQ ID NO: 41 | Anti-Her2(P)-Fc1 light chain DNA sequence |
| SEQ ID NO: 42 | Anti-PD-L1(Ate)-Fc1 heavy chain DNA sequence |
| SEQ ID NO: 43 | D1′′′-Fc2 DNA sequence |
| SEQ ID NO: 44 | D1′′′-D2-Fc2 amino acid sequence |

TABLE 2

Correspondence between the recombinant proteins and the sequences

| Protein name | Sequence number in the sequence listing |
|---|---|
| SIRPα D1-Fc | SEQ ID NO: 11 |
| Ofa-Fc1-D1-Fc2 | SEQ ID NO: 16 (Ofa-Fc1 heavy chain) + SEQ ID NO: 17 (Ofa-Fc1 light chain) + SEQ ID NO: 26 (D1-Fc2) |
| Ofa-Fc1-D1'''-Fc2 | SEQ ID NO: 16 (Ofa-Fc1 heavy chain) + SEQ ID NO: 17 (Ofa-Fc1 light chain) + SEQ ID NO: 29 (D1'''-Fc2) |
| Ofa-Fc1-D1-D2-Fc2 | SEQ ID NO: 16 (Ofa-Fc1 heavy chain) + SEQ ID NO: 17 (Ofa-Fc1 light chain) + SEQ ID NO: 27 (D1-D2-Fc2) |
| Ofa-Fc1-D1'''-D2-Fc2 | SEQ ID NO: 16 (Ofa-Fc1 heavy chain) + SEQ ID NO: 17 (Ofa-Fc1 light chain) + SEQ ID NO: 44 (D1'''-D2-Fc2) |
| Ofa-Fc1-D1-D2-D3-Fc2 | SEQ ID NO: 16 (Ofa-Fc1 heavy chain) + SEQ ID NO: 17 (Ofa-Fc1 light chain) + SEQ ID NO: 28 (D1-D2-D3-Fc2) |
| Obi-Fc1-D1-Fc2 | SEQ ID NO: 18 (Obi-Fc1 heavy chain) + SEQ ID NO: 4 (Obi-Fc1 light chain) + SEQ ID NO: 26 (D1-Fc2) |
| Anti-PD-L1(Ate)-Fc1-D1-Fc2 | SEQ ID NO: 24 (Anti-PD-L1(Ate)-Fc1 heavy chain) + SEQ ID NO: 10 (Anti-PD-L1(Ate)-Fc1 light chain) + SEQ ID NO: 26 (D1-Fc2) |
| Anti-PD-L1(13G4)-Fc1-D1-Fc2 | CN104356236A SEQ ID NO: 10 (Anti-PD-L1(13G4)-Fc1 heavy chain) + CN104356236A SEQ ID NO: 20 (Anti-PD-L1(13G4)-Fc1 light chain) + SEQ ID NO: 26 (D1-Fc2) |
| Anti-PD-L1(12A4)-Fc1-D1-Fc2 | CN104356236A SEQ ID NO: 2 (Anti-PD-L1(12A4)-Fc1 heavy chain) + CN104356236A SEQ ID NO: 12 (Anti-PD-L1(12A4)-Fc1 light chain) + SEQ ID NO: 26 (D1-Fc2) |
| Anti-EGFR-Fc1-D1-Fc2 | SEQ ID NO: 19 (Anti-EGFR-Fc1 heavy chain) + SEQ ID NO: 8 (Anti-EGFR-Fc1 light chain) + SEQ ID NO: 26 (D1-Fc2) |
| Anti-Her2(T)-Fc1-D1-Fc2 | SEQ ID NO: 20 (Anti-Her-2(T)-Fc1 heavy chain) + SEQ ID NO: 21 (Anti-Her2(T)-Fc1 light chain) + SEQ ID NO: 26 (D1-Fc2) |
| Anti-Her2(P)-Fc1-D1-Fc2 | SEQ ID NO: 22 (Anti-Her2(P)-Fc1 heavy chain) + SEQ ID NO: 23 (Anti-Her2(P)-Fc1 light chain) + SEQ ID NO: 26 (D1-Fc2) |
| Obi-Fc1-D1'''-Fc2 | SEQ ID NO: 18 (Obi-Fc1 heavy chain) + SEQ ID NO: 4 (Obi-Fc1 light chain) + SEQ ID NO: 29 (D1'''-Fc2) |
| Anti-PD-L1(Ate)-Fc1-D1'''-Fc2 | SEQ ID NO: 24 (Anti-PD-L1(Ate)-Fc1 heavy chain) + SEQ ID NO: 10 (Anti-PD-L1(Ate)-Fc1 light chain) + SEQ ID NO: 29 (D1'''-Fc2) |
| Anti-PD-L1(13G4)-Fc1-D1'''-Fc2 | CN104356236A SEQ ID NO: 10 (Anti-PD-L1(13G4)-Fc1 heavy chain) + CN104356236A SEQ ID NO: 20 (Anti-PD-L1(13G4)-Fc1 light chain) + SEQ ID NO: 29 (D1'''-Fc2) |
| Anti-PD-L1(12A4)-Fc1-D1'''-Fc2 | CN104356236A SEQ ID NO: 2 (Anti-PD-L1(12A4)-Fc1 heavy chain) + CN104356236A SEQ ID NO: 12 (Anti-PD-L1(12A4)-Fc1 light chain) + SEQ ID NO: 29 (D1'''-Fc2) |
| Anti-EGFR-Fc1-D1'''-Fc2 | SEQ ID NO: 19 (Anti-EGFR-Fc1 heavy chain) + SEQ ID NO: 8 (Anti-EGFR-Fc1 light chain) + SEQ ID NO: 29 (D1'''-Fc2) |
| Anti-Her2(T)-Fc1-D1'''-Fc2 | SEQ ID NO: 20 (Anti-Her2(T)-Fc1 heavy chain) + SEQ ID NO: 21 (Anti-Her2(T)-Fc1 light chain) + SEQ ID NO: 29 (D1'''-Fc2) |
| Anti-Her2(P)-Fc1-D1'''-Fc2 | SEQ ID NO: 22 (Anti-Her2(P)-Fc1 heavy chain) + SEQ ID NO: 23 (Anti-Her2(P)-Fc1 light chain) + SEQ ID NO: 29 (D1'''-Fc2) |
| Obi-Fc1-D1-D2-Fc2 | SEQ ID NO: 18 (Obi-Fc1 heavy chain) + SEQ ID NO: 4 (Obi-Fc1 light chain) + SEQ ID NO: 27 (D1-D2-Fc2) |
| Anti-PD-L1(Ate)-Fc1-D1-D2-Fc2 | SEQ ID NO: 24 (Anti-PD-L1(Ate)-Fc1 heavy chain) + SEQ ID NO: 10 (Anti-PD-L1(Ate)-Fc1 light chain) + SEQ ID NO: 27 (D1-D2-Fc2) |

TABLE 2-continued

Correspondence between the recombinant proteins and the sequences

| Protein name | Sequence number in the sequence listing |
|---|---|
| Anti-PD-L1(13G4)-Fc1-D1-D2-Fc2 | CN104356236A SEQ ID NO: 10 (Anti-PD-L1(13G4)-Fc1 heavy chain) + CN104356236A SEQ ID NO: 20 (Anti-PD-L1(13G4)-Fc1 light chain) + SEQ ID NO: 27 (D1-D2-Fc2) |
| Anti-PD-L1(12A4)-Fc1-D1-D2-Fc2 | CN104356236A SEQ ID NO: 2 (Anti-PD-L1(12A4)-Fc1 heavy chain) + CN104356236A SEQ ID NO: 12 (Anti-PD-L1(12A4)-Fc1 light chain) + SEQ ID NO: 27 (D1-D2-Fc2) |
| Anti-EGFR-Fc1-D1-D2-Fc2 | SEQ ID NO: 19 (Anti-EGFR-Fc1 heavy chain) + SEQ ID NO: 8 (Anti-EGFR-Fc1 light chain) + SEQ ID NO: 27 (D1-D2-Fc2) |
| Anti-Her2(T)-Fc1-D1-D2-Fc2 | SEQ ID NO: 20 (Anti-Her2(T)-Fc1 heavy chain) + SEQ ID NO: 21 (Anti-Her2(T)-Fc1 light chain) + SEQ ID NO: 27 (D1-D2-Fc2) |
| Anti-Her2(P)-Fc1-D1-D2-Fc2 | SEQ ID NO: 22 (Anti-Her2(P)-Fc1 heavy chain) + SEQ ID NO: 23 (Anti-Her2(P)-Fc1 light chain) + SEQ ID NO: 27 (D1-D2-Fc2) |
| Obi-Fc1-D1'''-D2-Fc2 | SEQ ID NO: 18 (Obi-Fc1 heavy chain) + SEQ ID NO: 4 (Obi-Fc1 light chain) + SEQ ID NO: 44 (D1'''-D2-Fc2) |
| Anti-PD-L1(Ate)-Fc1-D1'''-D2-Fc2 | SEQ ID NO: 24 (Anti-PD-L1(Ate)-Fc1 heavy chain) + SEQ ID NO: 10 (Anti-PD-L1(Ate)-Fc1 light chain) + SEQ ID NO: 44 (D1'''-D2-Fc2) |
| Anti-PD-L1(13G4)-Fc1-D1'''-D2-Fc2 | CN104356236A SEQ ID NO: 10 (Anti-PD-L1(13G4)-Fc1 heavy chain) + CN104356236A SEQ ID NO: 20 (Anti-PD-L1(13G4)-Fc1 light chain) + SEQ ID NO: 44 (D1'''-D2-Fc2) |
| Anti-PD-L1(12A4)-Fc1-D1'''-D2-Fc2 | CN104356236A SEQ ID NO: 2 (Anti-PD-L1(12A4)-Fc1 heavy chain) + CN104356236A SEQ ID NO: 12 (Anti-PD-L1(12A4)-Fc1 light chain) + SEQ ID NO: 44 (D1'''-D2-Fc2) |
| Anti-EGFR-Fc1-D1'''-D2-Fc2 | SEQ ID NO: 19 (Anti-EGFR-Fc1 heavy chain) + SEQ ID NO: 8 (Anti-EGFR-Fc1 light chain) + SEQ ID NO: 44 (D1'''-D2-Fc2) |
| Anti-Her2(T)-Fc1-D1'''-D2-Fc2 | SEQ ID NO: 20 (Anti-Her2(T)-Fc1 heavy chain) + SEQ ID NO: 21(Anti-Her2(T)-Fc1 light chain) + SEQ ID NO: 44 (D1'''-D2-Fc2) |
| Anti-Her2(P)-Fc1-D1'''-D2-Fc2 | SEQ ID NO: 22 (Anti-Her2(P)-Fc1 heavy chain) + SEQ ID NO: 23 (Anti-Her2(P)-Fc1 light chain) + SEQ ID 44 (D1'''-D2-Fc2) |
| Obi-Fc1-D1-D2-D3-Fc2 | SEQ ID NO: 18 (Obi-Fc1 heavy chain) + SEQ ID NO: 4 (Obi-Fc1 light chain) + SEQ ID NO: 28 (D1-D2-D3-Fc2) |
| Anti-PD-L1(Ate)-Fc1-D1-D2-D3-Fc2 | SEQ ID NO: 24 (Anti-PD-L1(Ate)-Fc1 heavy chain) + SEQ ID NO: 10 (Anti-PD-L1(Ate)-Fc1 light chain) + SEQ ID NO: 28 (D1-D2-D3-Fc2) |
| Anti-PD-L1(13G4)-Fc1-D1-D2-D3-Fc2 | CN104356236A SEQ ID NO: 10 (Anti-PD-L1(13G4)-Fc1 heavy chain) + CN104356236A SEQ ID NO: 20 (Anti-PD-L1(13G4)-Fc1 light chain) + SEQ ID NO: 28 (D1-D2-D3-Fc2) |
| Anti-PD-L1(12A4)-Fc1-D1-D2-D3-Fc2 | CN104356236A SEQ ID NO: 2 (Anti-PD-L1(12A4)-Fc1 heavy chain) + CN104356236A SEQ ID NO: 12 (Anti-PD-L1(12A4)-Fc1 light chain) + SEQ ID NO: 28 (D1-D2-D3-Fc2) |
| Anti-EGFR-Fc1-D1-D2-D3-Fc2 | SEQ ID NO: 19 (Anti-EGFR-Fc1 heavy chain) + SEQ ID NO: 8 (Anti-EGFR-Fc1 light chain) + SEQ ID NO: 28 (D1-D2-D3-Fc2) |
| Anti-Her2(T)-Fc1-D1-D2-D3-Fc2 | SEQ ID NO: 20 (Anti-Her2(T)-Fc1 heavy chain) + SEQ ID NO: 21 (Anti-Her2(T)-Fc1 light chain) + SEQ ID NO: 28 (D1-D2-D3-Fc2) |
| Anti-Her2(P)-Fc1-D1-D2-D3-Fc2 | SEQ ID NO: 22 (Anti-Her2(P)-Fc1 heavy chain) + SEQ ID NO: 23 (Anti-Her2(P)-Fc1 light chain) + SEQ ID NO: 28 (D1-D2-D3-Fc2) |

EXAMPLE 1

Construction of Expression Vector

Basing on the designed molecular structure, the amino acid sequences of each component were spliced together. According to the preference of Chinese hamsters (*Cricetulus griseus*) for codons, an optimal DNA coding sequence was designed and endonuclease restriction recognition sites for later use in gene cloning operation were excluded. Then a cloning site, Kozak sequence and a signal peptide coding sequence were added successively at the 5' end of the sequence, and a stop codon and a cloning site were added successively at the 3' end of the sequence, as shown in FIG. 1.

Figure 2:
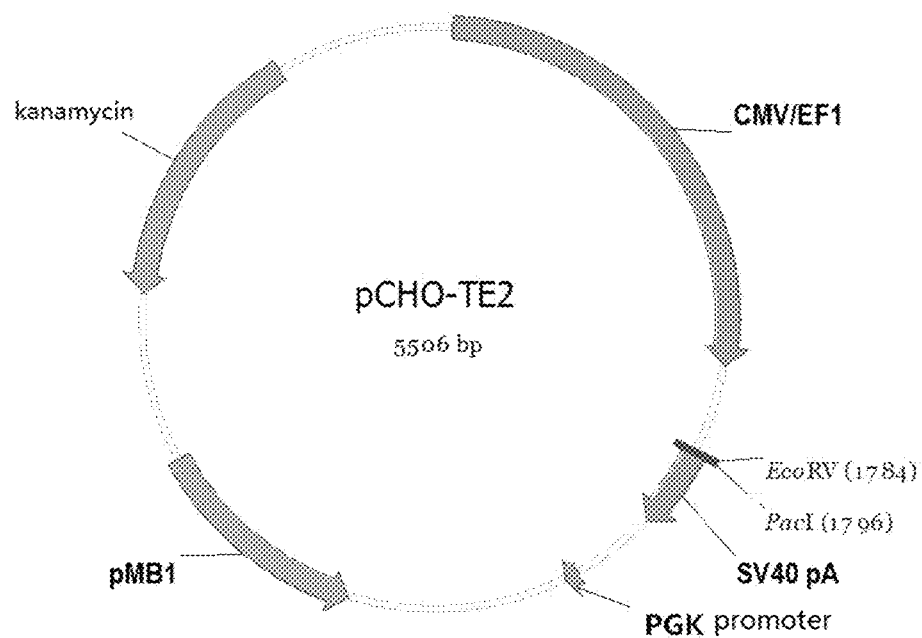
FIG. 2 shows the plasmid map of an exemplary expression vector pCHO-TE2 of the present disclosure.

Whole gene synthesis was performed, and the whole gene was directionally cloned between the corresponding cloning sites of expression vector pCHO-TE2 (purchased from Thermo Fisher) using the 5'end and 3' end cloning sites. After the correctness of the sequence was verified, the expression plasmid was obtained. All the cloning sites used at 5'end and 3' end are EcoRV and PacI sites respectively. FIG. 2 was a plasmid map of the expression vector pCHO-TE2.

EXAMPLE 2

Preparation of Expression Plasmid, Cell Transfection, and Expression and Purification of Target Protein Preparation of Expression Plasmid A bacterial glycerol stock containing the expression plasmid (1 mL of a solution of *Escherichia coli* containing the expression plasmid was thoroughly mixed with 0.5 mL of 60% sterilized glycerin solution) was inoculated into a liquid LB medium at a ratio of 1:1000. After 16 hours of culture in a shaker at 37° C., 220 rpm, the bacteria were collected by centrifugation. The expression plasmid was obtained by using endotoxin-free plasmid prep kits (DP117, purchased from Tiangen Biotech (Beijing) Co., Ltd.) according to the standard procedure provided by kit instructions.

Cell Transfection and Protein Expression

After the obtained expression plasmid was filtered through a 0.22 μm microfiltration membrane, 3 mg of the plasmid solution (wherein the product was a typical antibody molecule, and the ratio of the light chain and the heavy chain expression plasmids were 1:1 (molar ratio); wherein the product was a recombinant protein, the ratio of the light chain, the heavy chain and the right arm expression plasmids were 1:1:1 (molar ratio), as shown in Table 3) was pipetted into 50 mL Opti MEM I Reduced Serum Medium (purchased from GIBCO), then mixed thoroughly. 6 mg of transfection reagent polyetherimide (PEI, purchased from Polysciences, dissolved in sterile ultrapure water at a concentration of 1 mg/mL) was transferred into 50 mL Opti MEM I Reduced Serum Medium, then mixed thoroughly. The obtained PEI solution was added to the Opti MEM I Reduced Serum Medium solution containing the plasmid and mixed thoroughly. The mixture of the plasmid and PEI was allowed to stand at room temperature for 15 minutes, and then slowly and evenly added into 1 L of a suspension of host cell CHO-S (purchased from Thermo Fisher) with a cell density of $3 \times 10^6$ cells/mL. The cells was cultured in an incubator containing 5% CO2 at 37° C. 4 hours later, a feed medium (the feed medium was prepared by dissolving 80 g of CD Efficient Feed C AGT (purchased from Gibco) and 75 g of 5×00483 (purchased from Kerry)in 1 L of water) of a volume equivalent to 7% of the initial volume was added therein. The culture temperature was lowered to 33° C. and the cells were harvested upon 6 days of culture. The cell suspension was centrifuged at 10,000 g, 10° C. for 30 minutes, and the supernatant (i.e., the cell culture harvest solution) was used for purification of the target protein.

Protein Purification

The following method takes Ofa-Fc1-D1-Fc2 as an example, using protein A for affinity-capture of the product.

The above cell culture harvest solution was centrifuged at 10,000 rpm for 30 min to remove the cells and fragments thereof, then loaded onto a protein A affinity column (Art No. 17-5438-02, GE Healthcare), and eluted to harvest the target protein. The purity of the target protein was determined by SDS-PAGE.

The protein A purification method is a conventional protein purification method well known to those skilled in the art, and the detailed test procedure can refer to the product description of GE Healthcare Protein A and the GE antibody purification handbook.

Figure 4A:
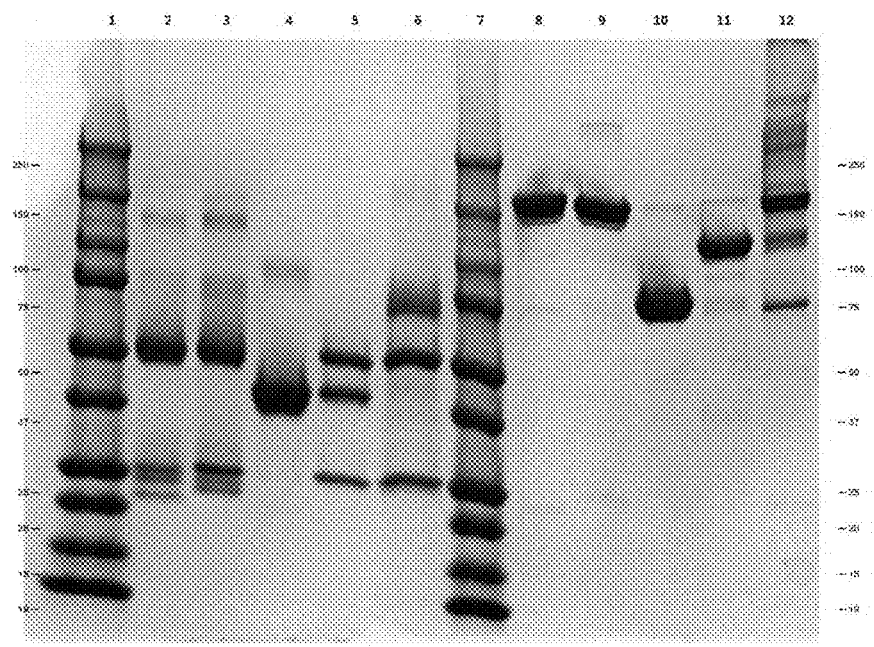
FIGS. 4A-4B show the SDS-PAGE electrophoretogram of the recombinant proteins purified by protein A. Lanes 1-6 of FIG. 4A show reduced samples, wherein,1: Marker; 2: Anti-CD20 mAb (Ofatumumab); 3: Anti-CD47 mAb (Hu5F9-G4); 4: SIRPα D1-Fc; 5: Ofa-Fc1-D1-Fc2; 6: Ofa-Fc1-D1-D2-D3-Fc2. Lanes 7-12 of FIG. 4A show non-reduced samples, wherein, 7: Marker; 8: Anti-CD20 mAb (Ofatumumab); 9: Anti-CD47 mAb (Hu5F9-G4); 10: SIRPα D1-Fc; 11: Ofa-Fc1-D1-Fc2; 12: Ofa-Fc1-D1-D2-D3-Fc2. Lane 1 of FIG. 4B: the non-reduced sample of Ofa-Fc1-D1-D2-Fc2; Lane 2 of FIG. 4B: Marker; Lane 3 of FIG. 4B: the reduced sample of Ofa-Fc1-D1-D2-Fc2.
Figure 4B:
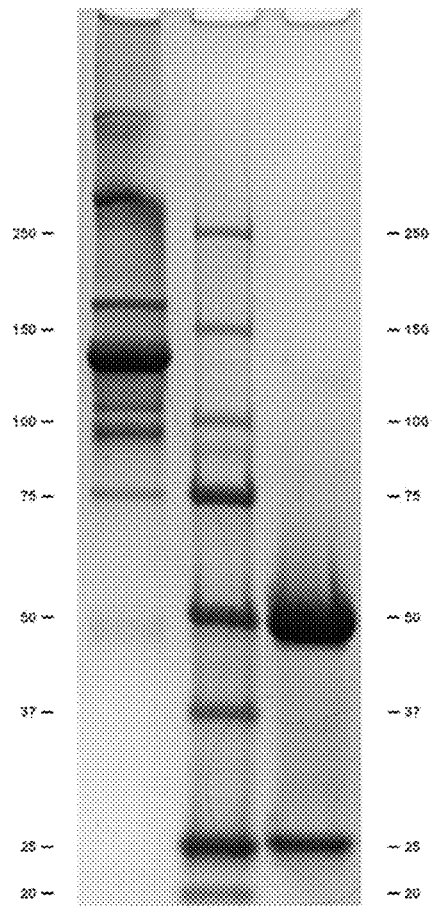

The theoretical molecular weights of the four proteins SIRPα D1-Fc, Ofa-Fc1-D1-Fc2, Ofa-Fc1-D1-D2-Fc2, and Ofa-Fc1-D1-D2-D3-Fc2 are 37.8 kD, 110.7 kD, 121.7 kD and 131.4 kD, respectively. The results of SDS-PAGE are shown in FIG. 4A and FIG. 4B.

Protein electrophoresis (SDS-PAGE): The results show (FIG. 4A and FIG. 4B) that the target proteins in each lane are efficiently expressed and purified, wherein Ofa-Fc1-D1-Fc2 (FIG. 4A, lane 11), Ofa-Fc1-D1-D2-Fc2 (FIG. 4A, lane 1) and Ofa-Fc1-D1-D2-D3-Fc2 (FIG. 4A, lane 12) shows different degrees of left arm dimer (Ofa-Fc1-Ofa-Fc1), right arm dimer (SIRPα-Fc2) and/or multimer.

TABLE 3

| | Ratio of the expression plasmid | |
|---|---|---|
| | Product | Ratio of the expression plasmid |
| Typical antibody molecules/ fusion protein dimer | Anti-CD20 mAb (Ofatumumab) Anti-CD20 mAb (Obinutuzumab) Anti-EGFR mAb (JMT101) Anti-CD47 mAb (Hu5F9-G4) Anti-Her2(T) mAb (Transtuzumab) Anti-Her2(P) mAb (Pertuzumab) Anti-PD-L1mAb (Atezolizumab) Anti-PD-L1mAb(12A4) Anti-PD-L1mAb (13G4) | the ratio of the light chain and the heavy chain expression plasmids were 1:1 |
| | SIRPα D1-Fc | Dimer |

TABLE 3-continued

| | Product | Ratio of the expression plasmid |
|---|---|---|
| Recombinant proteins | Ofa-Fc1-D1-Fc2<br>Ofa-Fc1-D1′′′-Fc2<br>Ofa-Fc1-D1-D2-Fc2<br>Ofa-Fc1-D1′′′-D2-Fc2<br>Ofa-Fc1-D1-D2-D3-Fc2<br>Obi-Fc1-D1-Fc2<br>Anti-PD-L1(Ate)-Fc1-D1-Fc2<br>Anti-PD-L1(13G4)-Fc1-D1-Fc2<br>Anti-PD-L1(12A4)-Fc1-D1-Fc2<br>Anti-EGFR-Fc1-D1-Fc2<br>Anti-Her2(T)-Fc1-D1-Fc2<br>Anti-Her2(P)-Fc1-D1-Fc2<br>Obi-Fc1-D1′′′-Fc2<br>Anti-PD-L1(Ate)-Fc1-D1′′′-Fc2<br>Anti-PD-L1(13G4)-Fc1-D1′′′-Fc2<br>Anti-PD-L1(12A4)-Fc1-D1′′′-Fc2<br>Anti-EGFR-Fc1-D1′′′-Fc2<br>Anti-Her2(T)-Fc1-D1′′′-Fc2<br>Anti-Her2(P)-Fc1-D1′′′-Fc2<br>Obi-Fc1-D1-D2-Fc2<br>Anti-PD-L1(Ate)-Fc1-D1-D2-Fc2<br>Anti-PD-L1(13G4)-Fc1-D1-D2-Fc2<br>Anti-PD-L1(12A4)-Fc1-D1-D2-Fc2<br>Anti-EGFR-Fc1-D1-D2-Fc2<br>Anti-Her2(T)-Fc1-D1-D2-Fc2<br>Anti-Her2(P)-Fc1-D1-D2-Fc2<br>Obi-Fc1-D1′′′-D2-Fc2<br>Anti-PD-L1(Ate)-Fc1-D1′′′-D2-Fc2<br>Anti-PD-L1(13G4)-Fc1-D1′′′-D2-Fc2<br>Anti-PD-L1(12A4)-Fc1-D1′′′-D2-Fc2<br>Anti-EGFR-Fc1-D1′′′-D2-Fc2<br>Anti-Her2(T)-Fc1-D1′′′-D2-Fc2<br>Anti-Her2(P)-Fc1-D1′′′-D2-Fc2<br>Obi-Fc1-D1-D2-D3-Fc2<br>Anti-PD-L1(Ate)-Fc1-D1-D2-D3-Fc2<br>Anti-PD-L1(13G4)-Fc1-D1-D2-D3-Fc2<br>Anti-PD-L1(12A4)-Fc1-D1-D2-D3-Fc2<br>Anti-EGFR-Fc1-D1-D2-D3-Fc2<br>Anti-Her2(T)-Fc1-D1-D2-D3-Fc2<br>Anti-Her2(P)-Fc1-D1-D2-D3-Fc2 | the ratio of the expression plasmids of light chain, heavy chain and right arm follows the aforementioned ratio |

Notes:
D1′′′represents a high affinity mutant of SIRPα extracellular truncated variantD1; D1 represents the extracellular D1 domain of human wild-type SIRPα and its non-high affinity mutant; Fc is a wild-type Fc region; Fc1 is an Fc region having a hole or holes mutation(s), and Fc2 is an Fc region having a knob or knobs mutation(s).

EXAMPLE 3

Determination of Affinity, Competitive Binding Activity to the Target

1. Detection method for affinity of the target CD47, CD20, EGFR and Her2

The binding affinity of the recombinant proteins Ofa-Fc1-D1-Fc2, Ofa-Fc1-D1′′′-Fc2, Ofa-Fc1-D1-D2-Fc2, Ofa-Fc1-D1′′′-D2-Fc2, Ofa-Fc1-D1-D2-D3-Fc2, Obi-Fc1-D1-Fc2, Obi-Fc1-D1′′′-Fc2, Obi-Fc1-D1-D2-Fc2, Obi-Fc1-D1′′′-D2-Fc and Obi-Fc1-D1-D2-D3-Fc2 to the targets CD47 and CD20 was determined by ELISA and/or flow cytometry. Taking Ofa-Fc1-D1-Fc2 as an example, the following detect method is suitable for the recombinant proteins with a left arm targeting CD20.

The binding affinity of the recombinant proteins Anti-Her2(P)-Fc1-D1-Fc2, Anti-Her2(P)-Fc1-D1′′′-Fc2, Anti-Her2(P)-Fc1-D1-D2-Fc2, Anti-Her2(P)-Fc1-D1′′′-D2-Fc2, Anti-Her2(P)-Fc1-D1-D2-D3-Fc2, Anti-Her2(P)-Fc1-D1-Fc2, Anti-Her2(P)-Fc1-D1′′′-Fc2, Anti-Her2(P)-Fc1-D1-D2-Fc2, Anti-Her2(P)-Fc1-D1′′′-D2-Fc2, Anti-Her2(P)-Fc1-D1-D2-D3-Fc2, Anti-Her2(T)-Fc1-D1-Fc2, Anti-Her2(T)-Fc1-D1′′′-Fc2, Anti-Her2(T)-Fc1-D1-D2-Fc2, Anti-Her2(T)-Fc1-D1′′′-D2-Fc2, Anti-Her2(T)-Fc1-D1-D2-D3-Fc2, Anti-Her2(T)-Fc1-D1-Fc2, Anti-Her2(T)-Fc1-D1′′′-Fc2, Anti-Her2(T)-Fc1-D1-D2-Fc2, Anti-Her2(T)-Fc1-D1′′′-D2-Fc2 and Anti-Her2(T)-Fc1-D1-D2-D3-Fc2 to the targets CD47 and Her2 was determined by ELISA and/or flow cytometry. Taking Anti-Her2(T)-Fc1-D1-Fc2 as an example, the following detect method is suitable for the recombinant proteins with a left arm targeting Her2.

The binding affinity of the recombinant proteins Anti-EGFR-Fc1-D1-Fc2, Anti-EGFR-Fc1-D1′′′-Fc2, Anti-EGFR-Fc1-D1-D2-Fc2, Anti-EGFR-Fc1-D1′′′-D2-Fc2 and Anti-EGFR-Fc1-D1-D2-D3-Fc2 to the targets CD47 and EGFR was determined by ELISA and/or flow cytometry. Taking Anti-EGFR-Fc1-D1-Fc as an example, the following detect method is suitable for the recombinant proteins with a left arm targeting EGFR.

The binding affinity of the recombinant proteins Anti-PD-L1(Ate)-Fc1-D1-Fc2, Anti-PD-L1(Ate)-Fc1-D1′′′-Fc2, Anti-PD-L1(Ate)-Fc1-D1-D2-Fc2, Anti-PD-L1(Ate)-Fc1-D1′′′-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1′′′-Fc2, Anti-PD-L1(13G4)-Fc1-D1-D2-Fc2, Anti-PD-L1(13G4)-Fc1-D1′′′-D2-Fc2, Anti-PD-L1(13G4)-Fc1-D1-D2-D3-Fc2, Anti-PD-L1(12A4)-Fc1-D1-Fc2, Anti-PD-L1

(12A4)-Fc1-D1‴-Fc2, Anti-PD-L1(12A4)-Fc1-D1-D2-Fc2, Anti-PD-L1(12A4)-Fc1-D1‴-D2-Fc2 and Anti-PD-L1 (12A4)-Fc1-D1-D2-D3-Fc2 to the targets CD47 and PD-L1 was determined by ELISA. Taking Anti-PD-L1(Ate)-Fc1-D1-Fc2 as an example, the following detect method is suitable for the recombinant proteins with a left arm targeting PD-L1.

Determination of the Affinity of Ofa-Fc1-D1-Fc2 and Anti-EGFR-Fc1-D1-Fc2 to the Target CD47 by ELISA:

An ELISA plate (Art No. 9018, Corning) was coated with 100 μL of 1 μg/mL CD47-His (12283-H08H-200, Sino Biological) and placed at 4° C. overnight. The plate was rinsed with PBST solution (PBS containing 0.1% Tween 20), and then blocked with PBS+1% BSA for 2 hours at room temperature. After rinsing, 100 μL of diluted Ofa-Fc1-D1-Fc2 and Anti-EGFR-Fc1-D1-Fc2 (2.5-fold serial dilutions starting from 1000 ng/mL, 11 dilutions) was added to each well of the coated plate, then incubated for 1 hour at 25° C. After discarding the sample and rinsing the plate three times with PBST solution, 100 μL of diluted mouse anti-human IgG Fc-HRP (1:10000) (Ab7499, abcam) was added, then incubated at 25° C. for 1 hour. After discarding the solution and rinsing the plate three times with PBST solution, TMB (P0209, beyotime) was added, and the plate was developed and protected from light for about 20 minutes. The reaction was stopped with $H_2SO_4$, and the OD value at 450-650 nm was read on a microplate reader.

The test results showed that anti-CD47 antibodies Hu5F9-G4, SIRPα D1-Fc, Ofa-Fc1-D1-Fc2, Ofa-Fc1-D1‴-Fc2, Ofa-Fc1-D1-D2-Fc2, Ofa-Fc1-D1‴-D2-F$_c$2, Ofa-Fc1-D1-D2-D3-Fc2, Obi-Fc1-D1-Fc2, Obi-Fc1-D1‴-Fc2, Obi-Fc1-D1-D2-Fc2, Obi-Fc1-D1‴-D2-Fc2, Obi-Fc1-D1-D2-D3-Fc2, Anti-EGFR-Fc1-D1-Fc2, Anti-EGFR-Fc1-D1‴-Fc2, Anti-EGFR-Fc1-D1-D2-Fc2, Anti-EGFR-Fc1-D1‴-D2-Fc2, Anti-EGFR-Fc1-D1-D2-D3-Fc2 were all capable of binding to CD47; the binding affinity of Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2 to CD47 was slightly weaker than the binding affinity of anti-CD47 antibody Hu5F9-G4 and/or SIRPα D1-Fc to CD47.

The above test results demonstrate that the recombinant proteins of the present disclosure are capable of specifically targeting the CD47 antigen on tumor cells at the protein level, and their binding affinity to CD47 is not higher than the binding affinity of SIRPα D1-Fc fusion protein to CD47. The recombinant proteins of the present disclosure can reduce or avoid the side effects such as RBC agglutination, anemia caused by the treatment with anti-CD47 antibody and/or killing of non-tumor target cells caused by the treatment with high affinity SIRPα mutant (Petrova P S, et al. TTI-621 (SIRPα Fc): A CD47-Blocking Innate Immune Checkpoint Inhibitor with Broad Antitumor Activity and Minimal Erythrocyte Binding. *Clin Cancer Res,* 2017, 23(4): 1068-1079).

Figure 5:
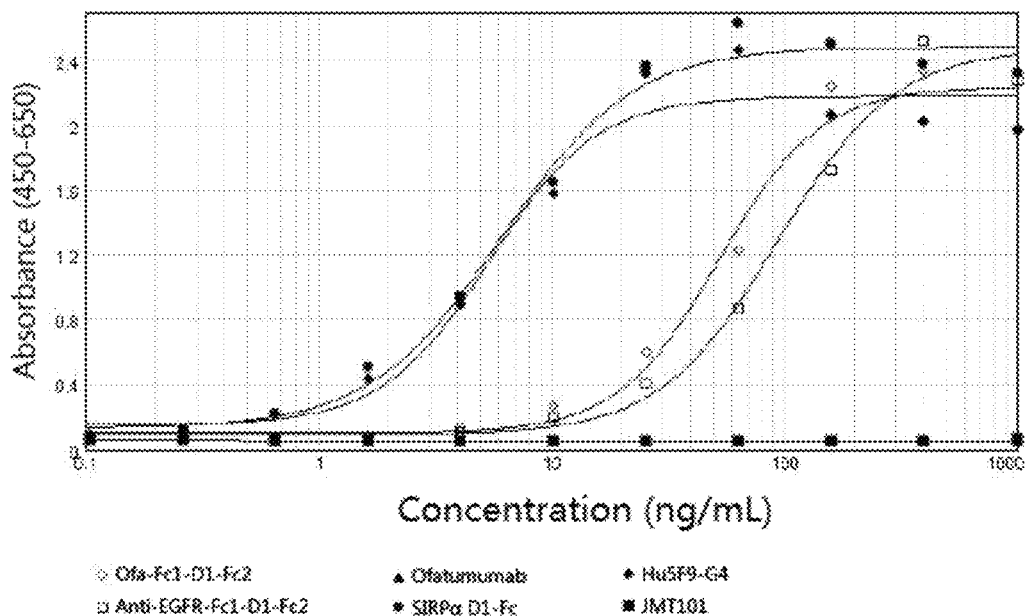
FIG. 5 shows the ELISA detection results of the binding affinity of the recombinant proteins of the present disclosure to human CD47 (protein level).

For example, as shown in FIG. 5, except that the anti-CD20 antibody Ofatumumab and the anti-EGFR antibody JMT101 cannot bind to CD47, anti-CD47 antibodies Hu5F9-G4, SIRPα D1-Fc, OFa-Fc1-D1-Fc2, Anti-EGFR-Fc1-D1-Fc2 are all capable of binding to CD47. However, the binding affinity of Ofa-Fc1-D1-Fc2 and Anti-EGFR-Fc1-D1-Fc2 ($EC_{50}$=52.57 ng/mL, $EC_{50}$=93.86 ng/mL), of which only the right arm can bind to CD47 antigen, is weaker than that of anti-CD47 antibody ($EC_{50}$=5.439 ng/mL) and SIRPα D1-Fc (EC50=6.118 ng/mL).

Determination of Affinity of Ofa-Fc1-D1-Fc2 to the Target CD47 by ELISA Flow Cytometry:

Well-grown A431 cells (human epidermal cancer cell) were collected and counted, centrifuged and resuspended to a concentration of 3×10$^6$ cells/mL with PBS+2% FBS (purchased from Gibco). 100 μL of the cell suspension was aliquoted to each well of a 96-well U-plate (Art No. 3799, Corning) and allowed to stand for at least 15 minutes. The supernatant was pipetted and discarded after centrifugation, then 9 serial dilutions of Ofa-Fc1-D1-Fc2 were added (5-fold serial dilutions starting from 15000 ng/mL, a total of 9 concentrations) and incubated in a refrigerator at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since A431 cells do not express CD20 antigen and cannot bind to Ofatumumab and Obinutuzumab, A431 cells can be used to evaluate the binding affinity of Ofa-Fc1-D1-Fc2, Ofa-Fc1-D1‴-Fc2, Ofa-Fc1-D1-D2-Fc2, Ofa-Fc1-D1‴-D2-F$_c$2, Ofa-Fc1-D1-D2-D3-Fc2, Obi-Fc1-D1-Fc2, Obi-Fc1-D1‴-Fc2, Obi-Fc1-D1-D2-Fc2, Obi-Fc1-D1‴-D2-Fc2 and Obi-Fc1-D1-D2-D3-Fc to CD47 at the cellular level.

The test results showed, except that the anti-CD20 antibodies Ofatumumab and Obinutuzumab cannot bind to A431 cells, anti-CD47 antibodies Hu5F9-G4, SIRPα D1-Fc, Ofa-Fc1-D1-Fc2, Ofa-Fc1-D1‴-Fc2, Ofa-Fc1-D1-D2-Fc2, Ofa-Fc1-D1‴-D2-Fc2, Ofa-Fc1-D1-D2-D3-Fc2, Obi-Fc1-D1-Fc2, Obi-Fc1-D1‴-Fc2, Obi-Fc1-D1-D2-Fc2, Obi-Fc1-D1‴-D2-Fc2 and Obi-Fc1-D1-D2-D3-Fc2 were all capable of binding to A431 cells. The binding affinity of Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2 and Obi-Fc1-D1-D2-D3-Fc2 to CD47 was slightly weaker than the binding affinity of anti-CD47 antibody and/or SIRPα D1-Fc to CD47, which was consistent with the trend of ELISA data.

The above test results demonstrate that the recombinant proteins of the present disclosure are capable of specifically targeting the CD47 antigen on tumor cells at the protein level, and the binding affinity to CD47 is not higher than the binding affinity of SIRPα D1-Fc fusion protein to CD47. The recombinant proteins of the present disclosure can reduce or avoid the side effects such as RBC agglutination, anemia caused by the treatment with anti-CD47 antibody and/or killing of non-tumor target cells caused by the treatment with high affinity SIRPα mutant.

Figure 6:
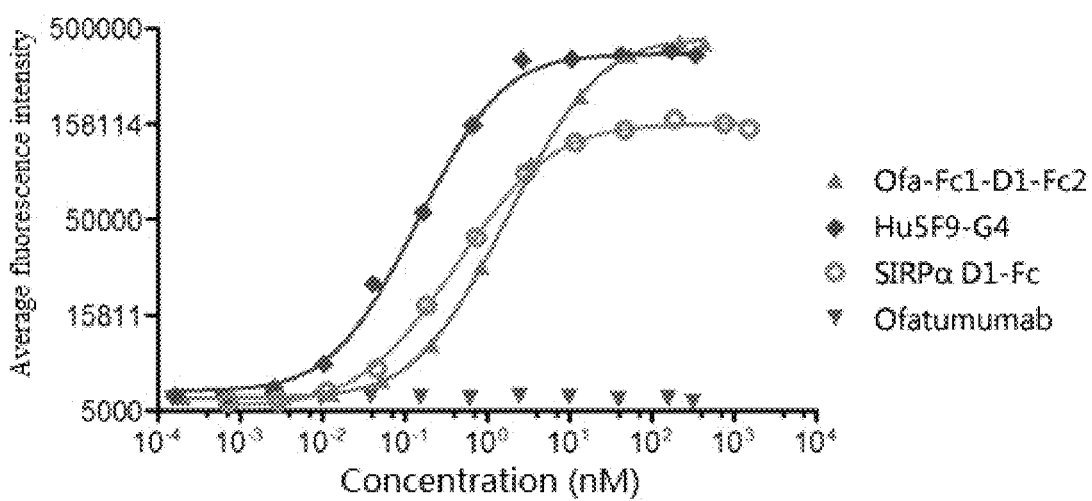
FIG. 6 shows the flow cytometry results of the binding affinity of the recombinant proteins of the present disclosure to human CD47 (cellular level).

For example, as shown in FIG. 6, anti-CD47 antibodies Hu5F9-G4, SIRPα D1-Fc and Ofa-Fc1-D1-Fc2 are all capable of binding to A431 cells. Specifically, the binding affinity of Ofa-Fc1-D1-Fc2 is slightly weaker than that of the anti-CD47 antibody and/or SIRPα D1-Fc, which is consistent with the trend of ELISA data.

Determination of Affinity of Ofa-Fc1-D1-Fc2 to the Target CD20 by Flow Cytometry Well-grown Raji cells (human B-cell lymphoma, purchased from the Cell Bank of Chinese Academy of Sciences, Shanghai) were collected and counted, centrifuged and resuspended to a concentration of 3×10$^6$ cells/mL with PBS+2% FBS. 100 μL of the cell suspension was aliquoted to each of a 96-well U-plate (Art No. 3799, Corning) and allowed to stand for at least 15 minutes. The supernatant was pipetted and discarded after centrifugation, then 100 μL PBS+2% FBS (control group) or 1.5 μg/mL anti-CD47 antibody Hu5F9-G4 (Fab)2 (treatment group) (excising Fc by pepsin, kit: Thermo Fisher, 44988) were added and incubated at 4° C. for 1 hour. After rinsing with PBS+2%

Figure 7:
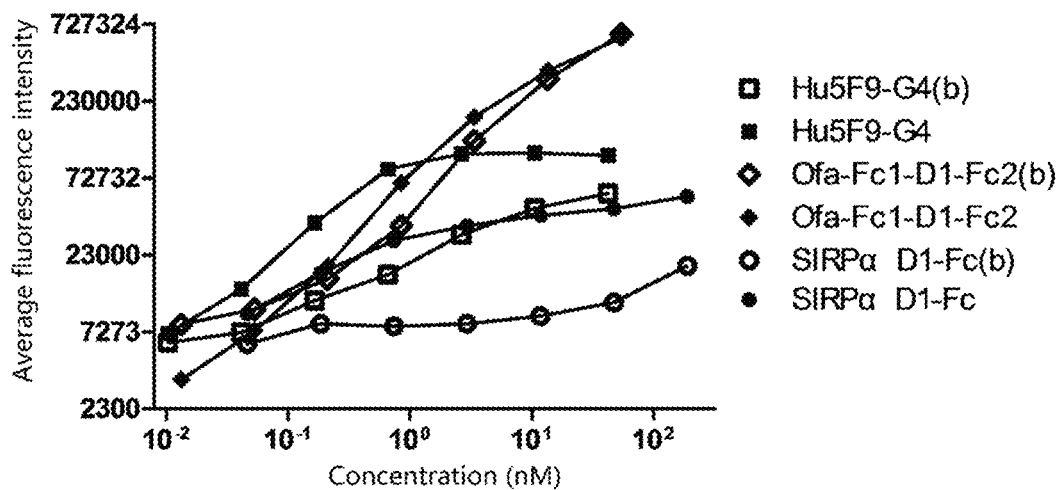
FIG. 7 shows the flow cytometry results of the binding affinity of the recombinant proteins of the present disclosure to the target corresponding to the left arm. Hu5F9-G4, Ofa-Fc1-D1-Fc2 and SIRPα D1-Fc refer to the average fluorescence intensity after the binding of the samples Hu5F9-G4, Ofa-Fc1-D1-Fc2 and SIRPα D1-Fc to the Raji cells which are not blocked by anti-CD47 antibody Hu5F9-G4(Fab)2. Hu5F9-G4 (b), Ofa-Fc1-D1-Fc2(b) and SIRPα D1-Fc(b) refer to the average fluorescence intensity after the binding of Hu5F9-G4, Ofa-Fc1-D1-Fc2 and SIRPα D1-Fc to Raji cells which are blocked with anti-CD47 antibody Hu5F9-G4(Fab)2.

FBS, 7 serial dilutions of Ofa-Fc1-D1-Fc2, Hu5F9-G4 or SIRPα D1-Fc (4-fold serial dilutions starting from 6250 ng/mL with a total of 7 dilutions, and the molar concentration after conversion is shown in FIG. 7) were added respectively and then incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

The test results showed that the anti-CD47 antibody Hu5F9-G4(Fab)2 effectively blocked the binding of the anti-CD47 antibody Hu5F9-G4 and/or SIRPα D1-Fc to CD47 on Raji cells. However, the blocking effect of Hu5F9-G4(Fab)2 on CD47 antigen did not significantly inhibit the binding of Ofa-Fc1-D1-Fc2, Ofa-Fc1-D1-D2-Fc2, Ofa-Fc1-D1-D2-D3-Fc2, Obi-Fc1-D1-Fc2, Obi Fc1-D1-D2-Fc2 and Obi-Fc1-D1-D2-D3-Fc2 to Raji cells.

The above test results demonstrate that, in the case where the CD47 antigen on the surface of tumor cells is shielded and the binding to SIRPα-CD47 is blocked, the recombinant proteins of the present disclosure are still capable of specifically binding to the corresponding antigen on tumor cells by the left arm, and the affinity of the left arm is not significantly affected by blocking the binding of the right arm.

For example, as shown in FIG. 7, the anti-CD47 antibody Hu5F9-G4(Fab)2 effectively blocks the binding of the anti-CD47 antibody Hu5F9-G4 and/or SIRPα D1-Fc to CD47 on Raji cells. However, the blocking effect of Hu5F9-G4(Fab)2 on CD47 antigen does not significantly inhibit the binding of Ofa-Fc1-D1-Fc2 to Raji cells, indicating that Ofa-Fc1-D1-Fc2 is still capable of specifically binding to the CD20 antigen on Raji cells by its left arm (anti-CD20 half antibody) after the mutual combination of SIRPα-CD47 is blocked, and the affinity is not significantly affected by blocking the binding of the right arm.

Figure 8A:
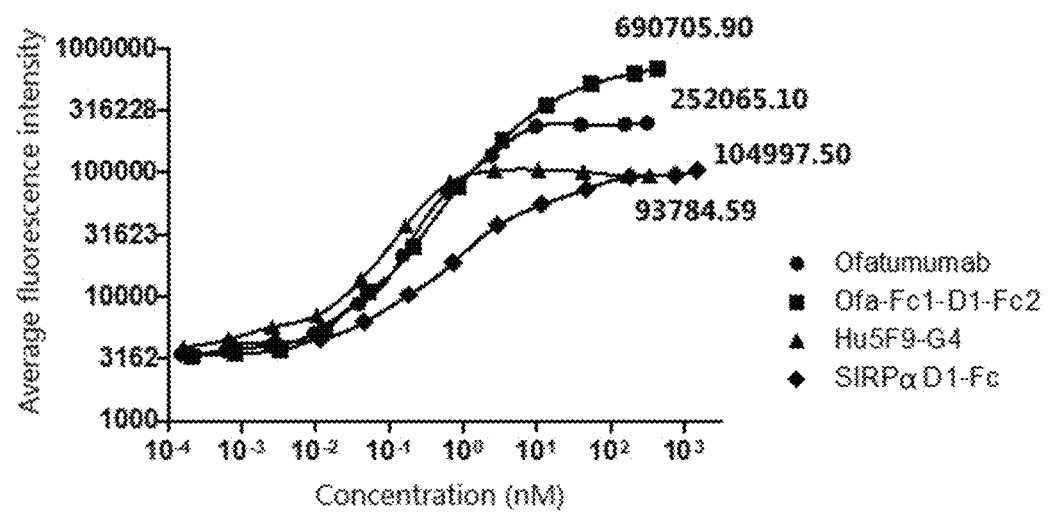
FIGS. 8A-8D show the flow cytometry results of the binding affinity of the recombinant proteins of the present disclosure to the cells expressing both the CD47 and the target corresponding to the left arm.

Determination of Bispecific Binding Activity to the Targets CD20 and CD47 by Flow Cytometry Well-grown Raji cells (human B-cell lymphoma, purchased from the Cell Bank of Chinese Academy of Sciences, Shanghai) were collected and counted, centrifuged and resuspended to a concentration of $3 \times 10^6$ cells/mL with PBS+2% FBS. 100 µL of the cell suspension was aliquoted to each well of a 96-well U-plate (Art No. 3799, Corning) and allowed to stand for at least 15 minutes. The supernatant was pipetted and discarded after centrifugation, then 12 serial dilutions of Ofa-Fc1-D1-Fc2, Ofatumumab, Hu5F9-G4 or SIRPα D1-Fc (50000 ng/mL, 25000 ng/mL, 6250 ng/mL and 4-fold serial dilutions starting from 6250 ng/mL with a total of 12 dilutions, and the molar concentration after conversion is shown in FIG. 8A) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since the surface of Raji cells simultaneously expresses CD20 and CD47 antigens, the anti-CD20 antibodies Ofatumumab, Obinutuzumab, anti-CD47 antibody Hu5F9-G4 and SIRPα D1-Fc are all capable of specifically binding to Raji cells, but their maximum average fluorescence intensities are not identical to each other.

The test results showed that Ofa-Fc1-D1-Fc2, Ofa-Fc1-D1‴-Fc2, Ofa-Fc1-D1-D2-Fc2, Ofa-Fc1-D1‴-D2-Fc2, Ofa-Fc1-D1-D2-D3-Fc2, Obi-Fc1-D1-Fc2, Obi-Fc1-D1‴-Fc2, Obi-Fc1-D1-D2-Fc2, Obi-Fc1-D1‴-D2-Fc2 and Obi-Fc1-D1-D2-D3-Fc2 were capable of binding to Raji cells, and achieved a higher maximum average fluorescence intensity.

The above test results demonstrate that the recombinant proteins of the present disclosure, compared with the anti-CD20 antibodies Ofatumumab, Obinutuzumab and/or the anti-CD47 antibody Hu5F9-G4 and/or SIRPα D1-Fc, are capable of specifically binding to tumor cells and exhibit a significant advantage in the number of molecules under the environment of a same supersaturated protein concentration. Preferably, the saturation binding abundance of the recombinant proteins of the present disclosure to tumor cells is greater than the sum of the saturation binding abundance of the anti-CD20 antibody and SIRPα D1-Fc to tumor cells under the environment of a same supersaturated protein concentration.

TABLE 4

Maximum average fluorescence intensity and $EC_{50}$ (nM) of the binding of antibodies/recombinant proteins to Raji cells

| | Sample | | | |
|---|---|---|---|---|
| | Ofatumumab | Ofa-Fc1-D1-Fc2 | Hu5F9-G4 | SIRPα D1-Fc |
| Maximum average fluorescence intensity | 252065.10 | 690705.90 | 93784.59 | 104997.50 |
| $EC_{50}$ (nM) | 1.586 | 14.06 | 0.258 | 12.53 |

For example, as shown in FIG. 8A and Table 4, the anti-CD20 antibody Ofatumumab, the anti-CD47 antibody Hu5F9-G4 and SIRPα D1-Fc are all capable of specifically binding to Raji cells, but their maximum average fluorescence intensities are various; meanwhile, Ofa-Fc1-D1-Fc2 is also capable of binding to Raji cells and has a higher maximum average fluorescence intensity, indicating that under the condition of a same supersaturated protein concentration, the number of Ofa-Fc1-D1-Fc2 molecules specifically binding to Raji cells is significantly greater than that of the anti-CD20 antibody Ofatumumab or the anti-CD47 antibody Hu5F9-G4 or SIRPα D1-Fc molecules, greater than the sum of the anti-CD20 antibody Ofatumab and the anti-CD47 antibody Hu5F9-G4 molecules, and greater than the sum of the antibody Ofatumumab and SIRPα D1-Fc molecules.

As known to those skilled in the art, the above test results indicate that the recombinant proteins of the present disclosure which are capable of simultaneously binding to both the tumor-targeting antigen and CD47 can bind more to tumor cells and thus provide a more significant anti-tumor effect, compared with the combination therapy of the anti-CD47 antibody or SIRPα D1-Fc with another tumor-targeting therapeutic antibody.

Determination of Bispecific Binding Activity to the Targets Her2 and CD47 by Flow Cytometry Well-grown SKBR-3 cells (human breast cancer cell, purchased from the Cell Bank of Chinese Academy of Sciences, Shanghai) were collected and counted, centrifuged and resuspended to a concentration of $2 \times 10^6$ cells/mL with PBS+2% FBS. 100 µL of the cell suspension was aliquoted to each well of a 96-well U-plate (Art No. 3799, Corning) and allowed to stand for at least 15 minutes. The supernatant was pipetted and discarded after centrifugation, then 10 dilutions of Anti-Her2(T)-Fc1-D1-Fc2, Trastuzumab or Hu5F9-G4 (4-fold serial dilutions starting from 433.2 nM, a total of 10 dilutions) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since the surface of SKBR-3 cells simultaneously expresses Her2 and CD47 antigens, the anti-Her2 antibodies Trastuzumab, Pertuzumab, the anti-CD47 antibody Hu5F9-G4 and SIRPα D1-Fc are all capable of specifically binding to SKBR-3 cells, but their maximum average fluorescence intensities are various.

The test results showed that Anti-Her2(P)-Fc1-D1-Fc2, Anti-Her2(P)-Fc1-D1'''-Fc2, Anti-Her2(P)-Fc1-D1-D2-Fc2, Anti-Her2(P)-Fc1-D1'''-D2-Fc2, Anti-Her2(P)-Fc1-D1-D2-D3-Fc2, Anti-Her2(P)-Fc1-D1-Fc2, Anti-Her2(P)-Fc1-D1'''-Fc2, Anti-Her2(P)-Fc1-D1-D2-Fc2, Anti-Her2(P)-Fc1-D1'''-D2-Fc2, Anti-Her2(P)-Fc1-D1-D2-D3-Fc2, Anti-Her2(T)-Fc1-D1-Fc2, Anti-Her2(T)-Fc1-D1'''-Fc2, Anti-Her2(T)-Fc1-D1-D2-Fc2, Anti-Her2(T)-Fc1-D1'''-D2-Fc2, Anti-Her2(T)-Fc1-D1-D2-D3-Fc2, Anti-Her2(T)-Fc1-D1-Fc2, Anti-Her2(T)-Fc1-D1'''-Fc2, Anti-Her2(T)-Fc1-D1-D2-Fc2, Anti-Her2(T)-Fc1-D1'''-D2-Fc2 and Anti-Her2(T)-Fc1-D1-D2-D3-Fc2 were capable of binding to SKBR-3 cells, and achieved a higher maximum average fluorescence intensity.

The above test results demonstrate that the recombinant proteins of the present disclosure, are capable of specifically binding to tumor cells and exhibit a significant advantage in the number of molecules under the condition of a same supersaturated protein concentration, compared with the anti-Her2 antibodies Trastuzumab, Pertuzumab and/or the anti-CD47 antibody Hu5F9-G4 and/or SIRPα D1-Fc. Preferably, the saturation binding abundance of the recombinant proteins of the present disclosure to tumor cells is greater than the sum of the saturation binding abundance of the anti-Her2 antibody and SIRPα D1-Fc to tumor cells under the environment of a same supersaturated protein concentration.

TABLE 5

Maximum average fluorescence intensity and $EC_{50}$ (nM) of the binding of antibodies/recombinant proteins to SKBR-3 cells

| Sampe | Anti-Her2(T)-Fc1-D1-Fc2 | Hu5F9-G4 | Trastuzumab |
|---|---|---|---|
| Maximum average fluorescence intensity | 3465348.00 | 213251.50 | 1841783.00 |
| EC50 (nM) | 10.03 | 0.4557 | 3.204 |

Figure 8B:
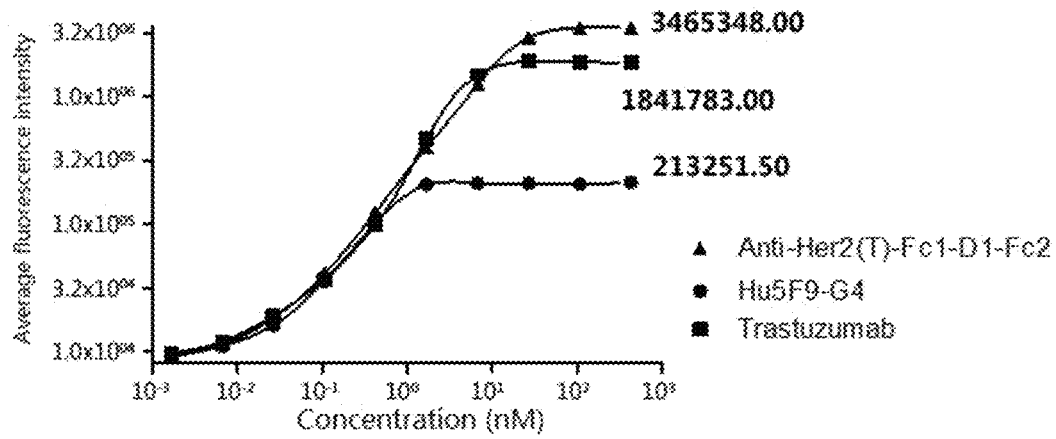

For example, as shown in FIG. 8B and Table 5, the anti-Her2 antibody Trastuzumab and the anti-CD47 antibody Hu5F9-G4 are both capable of specifically binding to SKBR-3 cells, but their maximum average fluorescence intensities are not identical to each other; meanwhile, Anti-Her2(T)-Fc1-D1-Fc2 is also capable of binding to SKBR-3 cells and has a higher maximum average fluorescence intensity, indicating that under the environment of a same supersaturated protein concentration, the number of Anti-Her2(T)-Fc1-D1-Fc2 molecules specifically binding to SKBR-3 cells is significantly greater than that of the anti-Her2 antibody Trastuzumab or the anti-CD47 antibody Hu5F9-G4 molecules, and greater than the sum of the anti-Her2 antibody Trastuzumab and the anti-CD47 antibody Hu5F9-G4 molecules.

As known to those skilled in the art, the above test results indicate that the recombinant proteins of the present disclosure, which are capable of simultaneously binding to both the tumor-targeting antigen and CD47, can bind more to tumor cells and thus provide a more significant anti-tumor effect, compared with the concomitant use of the anti-CD47 antibody or SIRPα D1-Fc with another tumor-targeting therapeutic antibody.

Determination of Bispecific Binding Activity to the Targets EGFR and CD47 by Flow Cytometry Well-grown A431 cells (human epidermal cancer cell, purchased from the Institute of Basic Medical Sciences, Chinese Academy of Medical Sciences) were collected and counted, centrifuged and resuspended to a concentration of $2\times10^6$ cells/mL with PBS+2% FBS. 100 μL of the cell suspension was aliquoted to each of a 96-well U-plate (Art No. 3799, Corning) and allowed to stand for at least 15 minutes. The supernatant was pipetted and discarded after centrifugation, then 11 serial dilutions of Anti-EGFR-Fc1-D1-Fc2, JMT101, SIRPα D1-Fc or Hu5F9-G4 (4-fold serial dilutions starting from 216.6 nM, a total of 11 dilutions) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since the surface of A431 cells simultaneously expresses EGFR and CD47 antigens, the anti-EGFR antibody JMT101, the anti-CD47 antibody Hu5F9-G4 and SIRPα D1-Fc are all capable of specifically binding to A431 cells, but their maximum average fluorescence intensities are various.

The test results showed that Anti-EGFR-Fc1-D1-Fc2, Anti-EGFR-Fc1-D1'''-Fc2, Anti-EGFR-Fc1-D1-D2-Fc2, Anti-EGFR-Fc1-D1'''-D2-Fc2 and Anti-EGFR-Fc1-D1-D2-D3-Fc2 were all capable of binding to A431 cells, and achieved a higher maximum average fluorescence intensity.

The above test results demonstrate that the recombinant proteins of the present disclosure are capable of specifically binding to tumor cells and exhibit a significant advantage in the number of molecules under the environment of a same supersaturated protein concentration, compared with the anti-EGFR antibody JMT101 and/or the anti-CD47 antibody Hu5F9-G4 and/or SIRPα D1-Fc. Preferably, the saturation binding abundance of the recombinant proteins of the present disclosure to tumor cells is greater than the sum of the saturation binding abundance of the corresponding anti-EGFR antibody and SIRPα D1-Fc to tumor cells under the environment of a same supersaturated protein concentration.

TABLE 6

Maximum average fluorescence intensity and $EC_{50}$ (nM) of the binding of antibodies/recombinant proteins to A431 cells

| | Sample | | | |
|---|---|---|---|---|
| | JMT101 | Anti-EGFR-Fc1-D1-Fc2 | Hu5F9-G4 | SIRPα D1-Fc |
| Maximum average fluorescence intensity | 901868 | 1511274 | 686658 | 429788 |
| $EC_{50}$ (nM) | 0.598 | 1.217 | 0.865 | 3.677 |

Figure 8C:
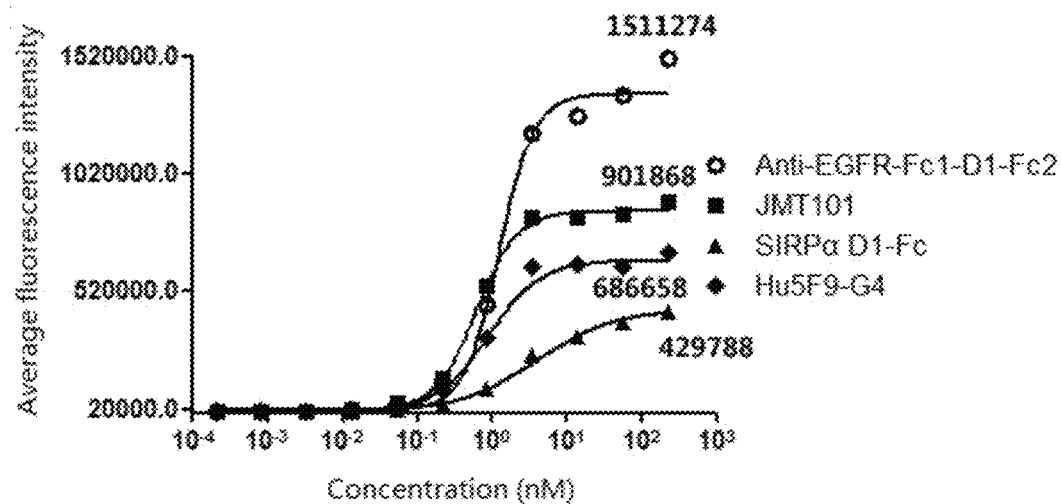

For example, as shown in FIG. 8C and Table 6, the anti-EGFR antibody JMT101, the anti-CD47 antibody Hu5F9-G4 and SIRPα D1-Fc are all capable of specifically binding to A431 cells, but their maximum average fluorescence intensities are not identical to each other; and the $EC_{50}$ (JMT101)=0.598 nM, $EC_{50}$(SIRPα D1-Fc)=3.677 nM, $EC_{50}$(Hu5F9-G4)=0.865 nM. It can be seen that the binding affinity of JMT101 to A431 cells is more than 6-fold of the binding affinity of SIRPα D1-Fc to A431 cells. Meanwhile, Anti-EGFR-Fc1-D1-Fc2 is also capable of binding to A431 cells and has a higher maximum average fluorescence intensity, indicating that under the condition of a same supersaturated protein concentration, the number of Anti-EGFR-Fc1-D1-Fc2 molecules specifically binding to A431 cells is significantly greater than that of the anti-EGFR antibody JMT101 or SIRPα D1-Fcor the anti-CD47 antibody Hu5F9-G4 molecules, and also greater than the sum of the anti-EGFR antibody JMT101 and SIRPα D1-Fc molecules.

As known to those skilled in the art, the above test results indicate that the recombinant proteins of the present disclosure, which are capable of simultaneously binding to both the tumor-targeting antigen and CD47, can bind more to tumor cells and thus provide a more significant anti-tumor effect, compared with the concomitant use of the anti-CD47 antibody or SIRPα D1-Fc with another tumor-targeting therapeutic antibody.

Determination of Bispecific Binding Activity to the Targets PD-L1 and CD47 by Flow Cytometry $2 \times 10^7$ NCI-H441 cells (human lung adenocarcinoma cell, purchased from BeinaChuanglian Biotechnology Research Institute Co., Ltd, Beijing) were stimulated with 10 ng/mL hIFN-γ (BD, Art No. 554616), then digested, collected, counted, centrifuged and resuspended to a concentration of $3 \times 10^6$ cells/mL with PBS+2% FBS. 100 µL of the cell suspension was aliquoted to each well of a 96-well U-plate (Art No. 3799, Corning) and allowed to stand for at least 15 minutes. The supernatant was pipetted and discarded after centrifugation, then 12 serial dilutions of Anti-PD-L1(Ate)-Fc1-D1-Fc2 or Atezolizumab (433.2 nM, 216.6 nM, 4-fold serial dilutions starting from 216.6 nM, a total of 12concentrations) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since the surface of NCI-H441 cells simultaneously expresses PD-L1 and CD47 antigens, the anti-PD-L1 antibodies Atezolizumab, 13G4, 12A4, the anti-CD47 antibody Hu5F9-G4, SIRPαD1-Fc are all capable of specifically binding to NCI-H441cells1.

The test results showed that Anti-PD-L1(Ate)-Fc1-D1-Fc2, Anti-PD-L1(Ate)-Fc1-D1′′′-Fc2, Anti-PD-L1(Ate)-Fc1-D1-D2-Fc2, Anti-PD-L1(Ate)-Fc1-D1′′′-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1′′′-Fc2, Anti-PD-L1(13G4)-Fc1-D1-D2-Fc2, Anti-PD-L1(13G4)-Fc1-D1′′′-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1′′′-Fc2, Anti-PD-L1(12A4)-Fc1-D1-D2-Fc2, Anti-PD-L1(12A4)-Fc1-D1′′′-D2-Fc2 and Anti-PD-L1(12A4)-Fc1-D1-D2-D3-Fc2 were all capable of binding to NCI-H441 cells, and achieved a higher maximum average fluorescence intensity.

The above test results demonstrate that the recombinant proteins of the present disclosure, compared with the anti-PD-L1 antibodies Atezolizumab, 13G4 and 12A4, are capable of specifically binding to tumor cells and exhibit a significant advantage in the number of molecules under the condition of a same supersaturated protein concentration. For example, under the environment of a same supersaturated protein concentration, the recombinant proteins of the present disclosure binds more to tumor cells and exhibits a significant advantage in the number of molecules than the anti-PD-L1 antibody Atezolizumab.

TABLE 7

Maximum average fluorescence intensity and $EC_{50}$ (nM) of the binding of antibodies/recombinant proteins to NCI-H441 cells

| | Sample | | | |
|---|---|---|---|---|
| | Anti-PD-L1(Ate)-Fc1-D1-Fc2 | Atezolizumab | Hu5F9-G4 | SIRPα D1-Fc |
| Maximum average fluorescence intensity | 156541 | 64038 | 100973 | 83200 |
| EC50 (nM) | 1.565 | 0.2006 | 0.3865 | 1.643 |

Figure 8D:
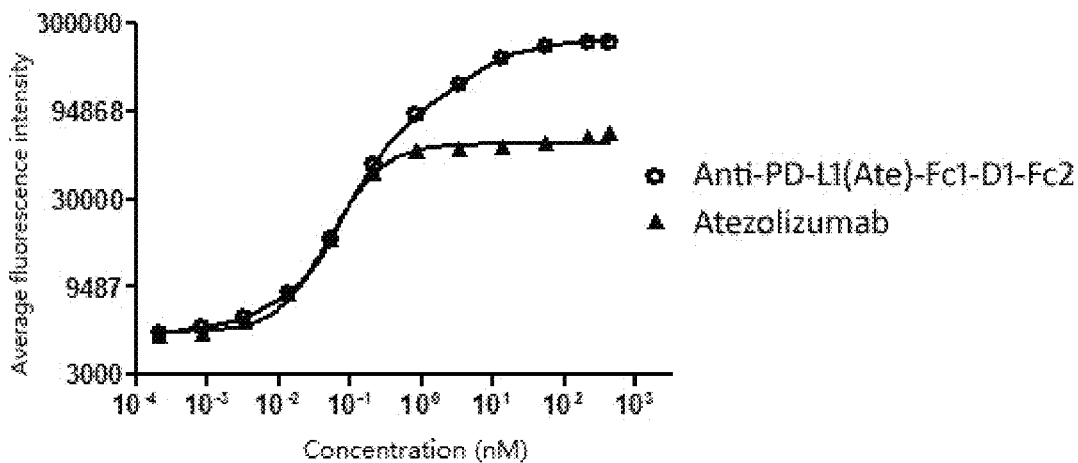

For example, as shown in FIG. 8D and Table 7, the anti-PD-L1 antibody Atezolizumab is capable of specifically binding to NCI-H441 cells; meanwhile, Anti-PD-L1(Ate)-Fc1-D1-Fc2 is also capable of binding to NCI-H441 cells and has a higher maximum average fluorescence intensity, indicating that under the environment of a same supersaturated protein concentration, the number of Anti-PD-L1(Ate)-Fc1-D1-Fc2 molecules specifically binding to NCI-H441 cells is significantly greater than that of the anti-PD-L1 antibody Atezolizumab molecules. $EC_{50}$ (Atezolizumab) =0.2006 nM, $EC_{50}$ (SIRPα D1-Fc)=1.643 nM, $EC_{50}$ (Hu5F9-G4)=0.3865 nM. It can be seen that the binding affinity of Atezolizumab to NCI-H441 cells is more than 6-fold of the binding affinity of SIRPα D1-Fc to NCI-H441 cells.

As known to those skilled in the art, the above test results indicate that the recombinant proteins of the present disclosure, which are capable of simultaneously binding to both the tumor-targeting antigen and CD47, can bind more to tumor cells and thus provide a more significant anti-tumor effect, compared with the concomitant use of the anti-CD47 antibody or SIRPα D1-Fc with another tumor-targeting therapeutic antibody.

2. Determination of Competitive Binding Activity to the Target

The following method takes Ofa-Fc1-D1-Fc2 or Anti-EGFR-Fc1-D1-Fc2 as an example, using ELISA to determine the competitive binding activity to the targets CD47 and SIRPα.

Determination of Competitive Binding Activity of Ofa-Fc1-D1-Fc2 and Anti-EGFR-Fc1-D1-Fc2 by ELISA An ELISA plate (9018, Corning) was coated with 100 µL of 1 µg/mL CD47-His (12283-H08H-200, Sino Biological) and placed at 4° C. overnight. The plate was washed with PBST, and then blocked with PBS+1% BSA for 2 hours at room temperature. After rinsing, 100 µL of a mixture of diluted Ofa-Fc1-D1-Fc2 or Anti-EGFR-Fc1-D1-Fc2 (3-fold serial dilutions starting from 1000 ng/mL, a total of 11 dilutions) and biotin-labeled SIRPα D1-Fc (Biotin Labeling Kit, 21925, Thermo, the concentration for adding was 100 ng/mL) was aliquoted to each well of the coated plate, then incubated for 1 hour at 25° C. After discarding the sample and rinsing the plate three times with PBST solution, 100 µL of diluted streptavidin-HRP (1:10000) (ML-0437P-HRP, ZI501-1, Yanyu Chemical Reagent Co., Ltd) was added, then incubated at 25° C. for 1 hour. After discarding the solution and rinsing the plate three times with PBST solution, TMB (P0209, beyotime) was added, and the plate was developed for about 20 minutes and placed away from light. The reaction was stopped with $H_2SO_4$, and the OD value at 450-650 nm was read on a microplate reader.

The test results showed that the anti-CD47 antibodies Hu5F9-G4, SIRPα D1-Fc, Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 were all capable of competing with the biotin-labeled SIRPα D1-Fc to bind to the CD47 antigen at different degrees, exerting competitive binding activity.

Figure 9:
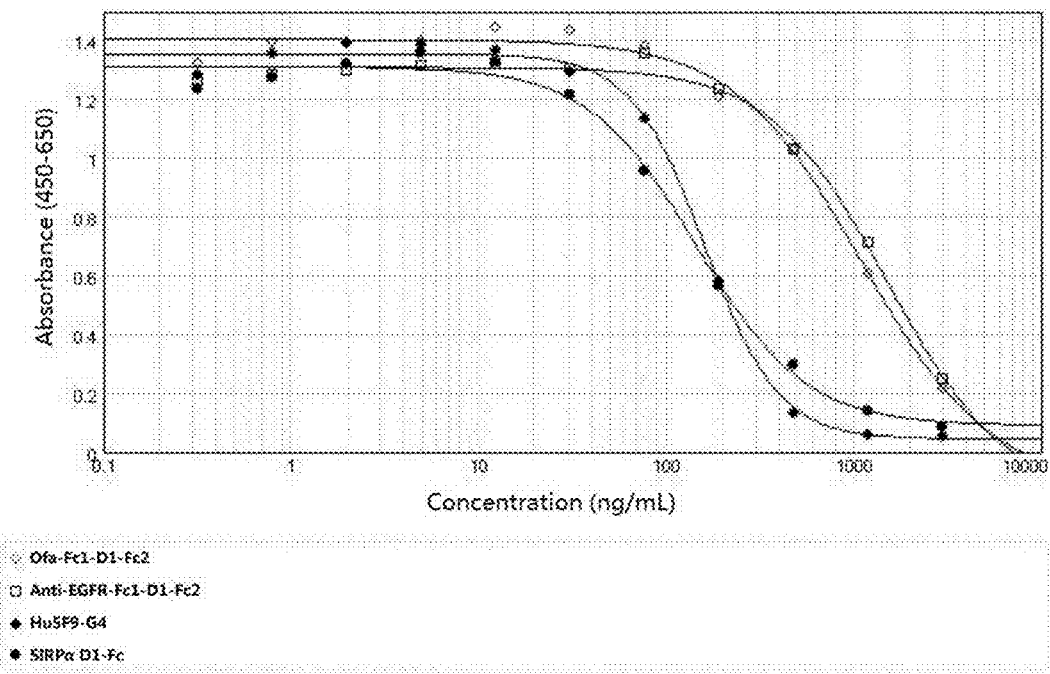
FIG. 9 shows the ELISA results of the competitive binding of the recombinant proteins of the present disclosure to SICRα D1-Fc and anti-CD47 antibodies against CD47.

For example, as shown in FIG. 9, the anti-CD47 antibodies Hu5F9-G4, SIRPα D1-Fc, OFa-Fc1-D1-Fc2, and Anti-EGFR-Fc1-D1-Fc2 are all capable of competing with the biotin-labeled SIRPα D1-Fc to bind to the CD47 antigen, exerting competitive binding activity; the competitive binding ability of Ofa-Fc1-D1-Fc2 or Anti-EGFR-Fc1-D1-Fc2 to CD47 is weaker than that of the anti-CD47 antibody Hu5F9-G4 or SIRPα D1-Fc, respectively, which is consistent with the results of the affinity studies described in the above examples.

EXAMPLE 4

Early Immunological Safety Evaluation of Recombinant Proteins In Vitro

Early immunological safety study of the recombinant proteins Ofa-Fc1-D1′′′-Fc2, Ofa-Fc1-D1′′′-D2-Fc2, Anti-EGFR-Fc1-D1′′′-Fc2, Anti-EGFR-Fc1-D1′′′-D2-Fc2, Anti-Her2(T)-Fc1-D1′′′-Fc2, Anti-Her2(T)-Fc1-D1′′′-D2-F$_c$2, Anti-Her2(P)-Fc1-D1′′′-Fc2, Anti-Her2(P)-Fc1-D1′′′-D2-Fc2, Anti-PD-L1(Ate)-Fc1-D1′′′-Fc2, Anti-PD-L1(Ate)-Fc1-D1′′′-D2-Fc2, Anti-PD-L1(13G4)-Fc1-D1′′′-Fc2, Anti-PD-L1(13G4)-Fc1-D1′′′-D2-Fc2, Anti-PD-L1(12A4)-Fc1-D1′′′-Fc2 and Anti-PD-L1(12A4)-Fc1-D1′′′-D2-F$_c$2 were conducted respectively in vitro. Taking Ofa-Fc1-D1′′′-Fc2 as an example, the following method is suitable for the recombinant proteins comprising a high affinity mutant of the extracellular truncated variant of SIRPαin the right arm.

Early immunological safety study of the recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 were conducted respectively in vitro. Taking Ofa-Fc1-D1-Fc2 as an example, the following method is suitable for the recombinant proteins comprising an extracellular truncated variant of SIRPα in the right arm.

Determination of Specific Binding of Bispecific Antibodies to the Target CD47 Before and After Mutation in the Right Arm by Flow Cytometry NCI-H441 cells (human lung adenocarcinoma cell, purchased from BeinaChuanglian Biotechnology Research Institute Co., Ltd, Beijing) were digested, collected, counted, centrifuged and then resuspended to a concentration of $3 \times 10^6$ cells/mL with PBS+2% FBS. 100 μL of the cell suspension was aliquoted to each well of a 96-well U-plate (Art No. 3799, Corning) and allowed to stand for at least 15 minutes. The supernatant was pipetted and discarded after centrifugation, then 12serial dilutions of Ofa-Fc1-D1-Fc2, Ofa-Fc1-D1′′′-Fc2, Hu5F9-G4 or Ofatumumab (433.2 nM, 216.6 nM, 4-fold serial dilutions starting from 216.6 nM, with a total of 12 concentrations) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

TABLE 8

Specific binding of bispecific antibodies to the target CD47 before and after mutation in the right arm by flow cytometry

| | Sample | | | |
|---|---|---|---|---|
| | Ofa-Fc1-D1-Fc2 | Ofa-Fc1-D1m-Fc2 | Hu5F9-G4 | Ofatumumab |
| Maximum average fluorescence intensity | 172944.90 | 272734.80 | 120133.40 | 3497.17 |
| $EC_{50}$ (nM) | 8.680 | 0.5292 | 0.2861 | NA |

Figure 10:
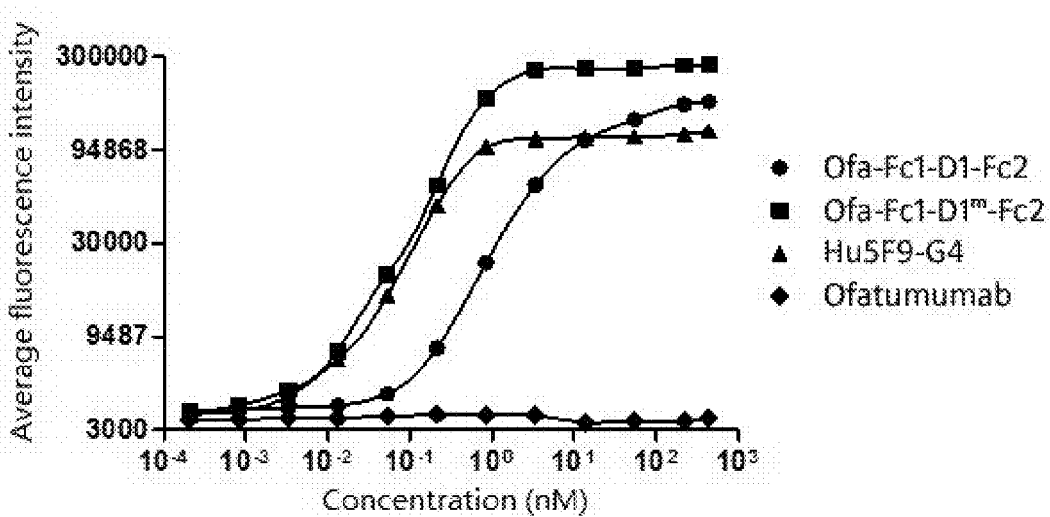
FIG. 10 shows the flow cytometry results of the binding affinity of the recombinant proteins of the present disclosure and its high affinity variants to CD47, anti-CD47 antibodies and anti-CD20 antibodies to human CD47.

For example, as shown in FIG. 10 and Table 8, except that the anti-CD20 antibody Ofatumumab is not capable of binding to CD47, the anti-CD47 antibodies Hu5F9-G4, Ofa-Fc1-D1-Fc2 and Ofa-Fc1-D1′′′-Fc2 are all capable of binding to CD47, and the binding affinity of Ofa-Fc1-D1′′′-Fc2 ($EC_{50}$=0.529 nM) to NCI-H441 cells is higher than that of Ofa-Fc1-D1-Fc2 ($EC_{50}$=8.68 nM), wherein D1′′′ is a high affinity mutant in the D1 region of SIRPα(i.e., Seq ID No: 10 in CN106519036A).

Early in Vitro Immunological Safety Evaluation Assay Of Recombinant Proteins (1) Preparation of Human Effector Cell Suspension:

Well-grown human NK92MI-CD16a effector cells with a stable and high expression of CD16a (purchased from Huabo Biotech Co., Ltd) were centrifuged (201 g, 5 min) to discard the supernatant, and resuspended in 5 mL MEM (free of phenol red) basal medium (purchased from Gibco, 51200-038). After counting, the cell suspension was adjusted to a cell density of $2.4 \times 10^6$ cells/mL with MEM (free of phenol red) basal medium, which was used as a human effector cell suspension.

(2) Incubation of Effector Cells and Antibodies:

50 μL MEM (free of phenol red) basal medium was aliquoted into each well of a 96-well clear bottom black plate, then 25 μL of every dilution of Ofa-Fc1-D1-Fc2 or Ofa-Fc1-D1′′′-Fc2 bispecific antibody was aliquoted into each well of the plate respectively in duplicate. 25 µL of the human effector cell suspension prepared in step (1) was added (60000 cells/well). After mixing thoroughly, the Ofa-Fc1-D1-Fc2 or Ofa-Fc1-D1'''-Fc2 bispecific antibody had final serial concentration (4-fold serial dilutions starting from 433.2 nM, a total of 10 dilutions). The mixture was allowed to react at 37° C. for 5.5 hours, then lysis buffer (derived from Promega kit, G7891) was added to the control group and incubated for 0.5 hour.

(3) Detection of ADCC Activity:

After incubation, the uncovered plate was placed in a safety cabinet and naturally cooled to room temperature for approximately 15 minutes. 100 µL of LDH substrate reaction solution (derived from Promega kit, G7891) equilibrated at room temperature for 30 minutes was aliquoted to each well of the plate, mixed gently and then incubated for 15 minutes at room temperature. 50 µL of stop solution (derived from Promega kit, G7891) was immediately added to each well and mixed thoroughly, then the fluorescence value was determined on a microplate reader.

The test results showed that the ADCC positive recombinant proteins and/or antibodies targeting CD47 resulted in mutual killing of NK cells due to the expression of CD47 antigen on NK cells. Therefore, compared to Ofa-Fc1-D1'''-Fc2 or Ofa-Fc1-D1'''-D2-Fc2 or Anti-EGFR-Fc1-D1'''-$F_c2$ or Anti-EGFR-Fc1-D1'''-D2-$F_c2$ or Anti-Her2(T)-Fc1-D1'''-Fc2 or Anti-Her2(T)-Fc1-D1'''-D2-Fc2 or Anti-Her2(P)-Fc1-D1'''-Fc2 or Anti-Her2(P)-Fc1-D1'''-D2-$F_c2$ or Anti-PD-L1(Ate)-Fc1-D1'''-Fc2 or Anti-PD-L1(Ate)-Fc1-D1'''-D2-Fc2 or Anti-PD-L1(13G4)-Fc1-D1'''-Fc2 or Anti-PD-L1(13G4)-Fc1-D1'''-D2-$F_c2$ or Anti-PD-L1(12A4)-Fc1-D1'''-Fc2 or Anti-PD-L1(12A4)-Fc1-D1'''-D2-Fc2, each of which comprised a high affinity mutant of the extracellular truncated variant of SIRPα, the recombinant protein Ofa-Fc1-D1-Fc2 or Ofa-Fc1-D1-D2-Fc2 or Ofa-Fc1-D1-D2-D3-Fc2 or Obi-Fc1-D1-Fc2 or Obi-Fc1-D1-D2-Fc2 or Obi-Fc1-D1-D2-D3-Fc2 or Anti-EGFR-Fc1-D1-Fc2 or Anti-EGFR-Fc1-D1-D2-Fc2 or Anti-EGFR-Fc1-D1-D2-D3-Fc2 or Anti-Her2(P)-Fc1-D1-Fc2 or Anti-Her2(P)-Fc1-D1-D2-Fc2 or Anti-Her2(P)-Fc1-D1-D2-D3-Fc2 or Anti-Her2(T)-Fc1-D1-Fc2 or Anti-Her2(T)-Fc1-D1-D2-Fc2 or Anti-Her2(T)-Fc1-D1-D2-D3-Fc2 or Anti-EGFR-Fc1-D1-Fc2 or Anti-EGFR-Fc1-D1-D2-Fc2 or Anti-EGFR-Fc1-D1-D2-D3-Fc2 or Anti-PD-L1(Ate)-Fc1-D1-Fc2 or Anti-PD-L1(Ate)-Fc1-D1-D2-Fc2 or Anti-PD-L1(Ate)-Fc1-D1-D2-D3-Fc2 or Anti-PD-L1(13G4)-Fc1-D1-Fc2 or Anti-PD-L1(13G4)-Fc1-D1-D2-Fc2 or Anti-PD-L1(13G4)-Fc1-D1-D2-D3-Fc2 or Anti-PD-L1(12A4)-Fc1-D1-Fc2 or Anti-PD-L1(12A4)-Fc1-D1-D2-Fc2 or Anti-PD-L1(12A4)-Fc1-D1-D2-D3-Fc2significantly reduced the toxic side effects caused by NK cells for at least 1000-fold, due to its weak affinity to the CD47.

Figure 11:
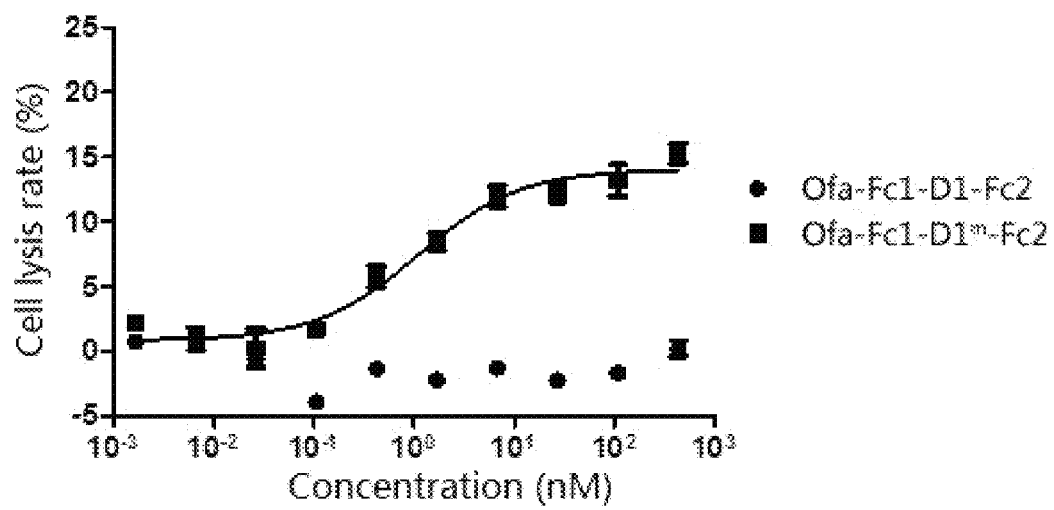
FIG. 11 shows the results of the immunological safety evaluation assay of the recombinant proteins of the present disclosure in vitro.

For example, as shown in FIG. 11, when the concentration of the antibody/recombinant protein reached $10^{-1}$ nM, cell lysis begins to occur and when the concentration of the antibody/recombinant protein reached $10^3$ nM, the rate of cell lysis reaches 15.25% in the Ofa-Fc1-D1m-Fc2 treatment group, while no cell lysis is observed in the Oba-Fc1-D1-Fc2 treatment group at a concentration of $10^3$ nM.

As known to those skilled in the art, the above test results indicate that the recombinant proteins of the present disclosure having ADCC activity and low affinity to the CD47 antigen have higher immunological safety.

As known to those skilled in the art, the above test results indicate that the optimized method for detecting ADCC activity (i.e., early immunological safety evaluation assay in vitro) described in the present disclosure can be used to evaluate the early immunological safety of recombinant proteins (including monovalent or multivalent) or antibodies (including monovalent or multivalent) targeting CD47 and having ADCC activity. The method is simple, fast and not limited by blood resources.

EXAMPLE 5

Inhibition of Tumor Cell Growth by Recombinant Protein In Vivo

Inhibition of tumor cell growth by recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2, Anti-PD-L1(12A4)-Fc1-D1-D2-D3-Fc2 were conducted respectively in vivo. Taking Ofa-Fc1-D1-Fc2 as an example, the following method is applicable for the detection of recombinant proteins comprising an extracellular truncated variant of SIRPα in the right arm.

Male NSG mice (purchased from Beijing Idmo Co., Ltd) were subcutaneously inoculated with human B-cell lymphoma Raji cells. After the tumor volume reached 80 $mm^3$ to 150 $mm^3$, the mice were divided into the following 2 groups (6 mice per group, the mice were intraperitoneally injected with the given agents for each group):1) vehicle control group (Tris-citrate, pH 6.5); 2) Ofa-Fc1-D1-Fc2 group (150 µg/mouse); twice a week for 2 weeks. Tumor growth was observed and the tumor volume was measured before administration (0 day), and on the $3^{rd}$ day, $5^{th}$ day, $7^{th}$ day, $10^{th}$ day, $12^{th}$ day, and $14^{th}$ day after administration, to evaluate the anti-tumor effect of Ofa-Fc1-D1-Fc2.

The test results showed that in the NSG mouse model subcutaneously transplanted with Raji lymphoma, the recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 blocked the CD47-SIRPα signaling pathway and thus activated targeted phagocytosis of macrophages and/or Antibody dependent cellular phagocytosis (ADCP) mediated by macrophages, thus exhibiting a significant tumor suppressive effect.

Figure 12:
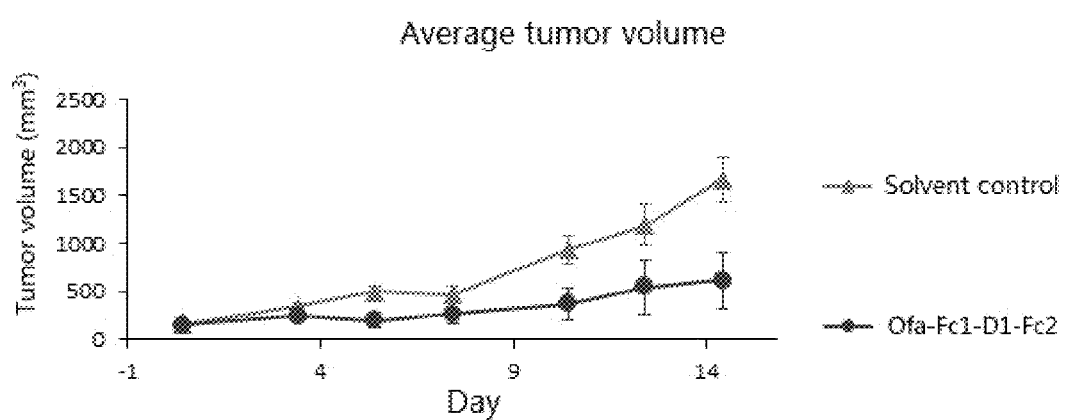
FIG. 12 shows the results of the pharmacodynamic assay of the recombinant proteins of the present disclosure on a NSG mouse model of subcutaneously transplanted Raji lymphoma.

For example, as shown in FIG. 12, the abscissa represents the time (days) from the NSG mice subcutaneously transplanted with Raji lymphoma receive drug treatment, and the ordinate represents the tumor volume ($mm^3$). FIG. 12 shows that after a period of treatment with the drug Ofa-Fc1-D1-Fc2, the Ofa-Fc1-D1-Fc2 group shows a significant tumor suppressive trend compared to the vehicle control group, and the tumor inhibition rate of the Ofa-Fc1-D1-Fc2 group on the 14$^{th}$day reaches 63.14%.

As known to those skilled in the art, the above test results indicate that the recombinant proteins of the present disclosure which are capable of simultaneously binding to both the target antigen and the CD47 antigen on the tumor cells can achieve a significant tumor suppressing effect in the NSG mice subcutaneously transplanted with tumor cells.

EXAMPLE 6

Early Immunological Safety Evaluation Assay of Recombinant Proteins In Vitro

Early immunological safety evaluation of recombinant proteins Ofa-Fc1-D1$'''$-Fc2, Ofa-Fc1-D1$'''$-D2-Fc2, Anti-EGFR-Fc1-D1$'''$-F$_c$2, Anti-EGFR-Fc1-D1$'''$-D2-F$_c$2, Anti-Her2(T)-Fc1-D1$'''$-Fc2, Anti-Her2(T)-Fc1-D1$'''$-D2-Fc2, Anti-Her2(P)-Fc1-D1$'''$-Fc2, Anti-Her2(P)-Fc1-D1$'''$-D2-F$_c$2, Anti-PD-L1(Ate)-Fc1-D1$'''$-Fc2, Anti-PD-L1(Ate)-Fc1-D1$'''$-D2-Fc2, Anti-PD-L1(13G4)-Fc1-D1$'''$-Fc2, Anti-PD-L1(13G4)-Fc1-D1$'''$-D2-Fc2, Anti-PD-L1(12A4)-Fc1-D1$'''$-Fc2 and Anti-PD-L1(12A4)-Fc1-D1$'''$-D2-Fc2were conducted respectively in vitro. Taking Ofa-Fc1-D1$'''$-Fc2 as an example, the following method is applicable for the detection of recombinant proteins comprising a high affinity mutant of the extracellular truncated variant of SIRPα in the right arm.

Early immunological safety evaluation of recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 were conducted respectively in vitro. Taking Ofa-Fc1-D1-Fc2 as an example, the following method is applicable for detection of recombinant proteins comprising an extracellular truncated variant of SIRPα in the right arm.

Since B cells highly express the CD20 antigen, this experiment evaluates the killing of tumor cells by determining the B cell content. In early immunological safety evaluation assay of recombinant proteins targeting another tumor antigen and the CD47 antigen in vitro, the experimental mice in this example should be subcutaneously transplanted with corresponding tumor cells.

Specific Tumor-Targeting Effect:

NSG (Hu-NSG) female mice (purchased from Beijing Idmo Co., Ltd) transplanted with human CD34$^+$ HSC were selected and divided into the following 3 groups (3 mice for each group, the mice were intravenously injected with the given agents for each group): 1) 0.9% saline control group; 2) Hu5F9-G4 group (6.7 µg/mouse); 3) Ofa-Fc1-D1-Fc2 group (5 µg/mouse). The mice were administered once. At 96 hours after administration, 80 µL of blood was collected from the tail vein of the mice and added to an anticoagulant tube containing heparin sodium. The RBCs were lysed by a freshly prepared mixture of lysis buffer (BD Pharm Lyse™, Art No. 555899) and double distilled water in a volume ratio of 1:1, and the remaining cells were rinsed and resuspended with PBS+2% FBS, and then incubated with the fluorescent antibody (PE anti-human CD45 (Art No. 304039), FITC anti-human CD19 (Art No. 302206), APC anti-human CD3 (Art No. 300312), all purchased from BioLegend) for 30 minutes. After rinsing and resuspension with PBS+2% FBS, the sample was detected by a flow cytometer (Accuri™ C6, BD).

The test results showed that, when Hu-NSG mice were administrated with a same dose of Ofa-Fc1-D1-Fc2 or the anti-CD47 antibody Hu5F9-G4, at 96 hours after administration, Ofa-Fc1-D1-Fc2 preferentially cleared B cells expressing CD20 antigen (i.e., target cells), while the anti-CD47 antibody Hu5F9-G4 preferentially cleared non-target cells with high abundance of CD47 expression (such as T cells), due to its high affinity to the CD47 antigen.

Figure 13A:
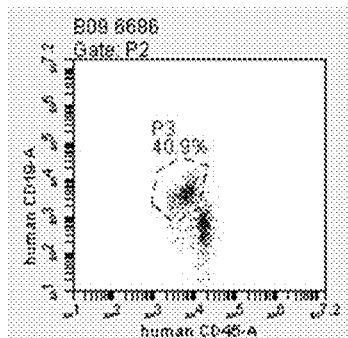
FIGS. 13A-13C show the detection results of B cell content at 96 hours after treating the Hu-NSG mice with different samples at a same dose. Wherein, FIG. 13A corresponds to 0.9% physiological saline.
Figure 13B:
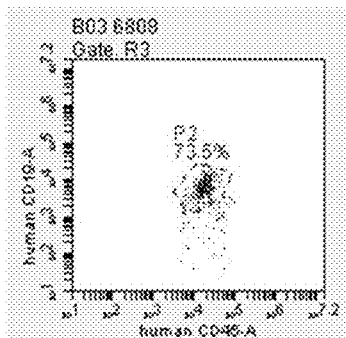
Figure 13C:
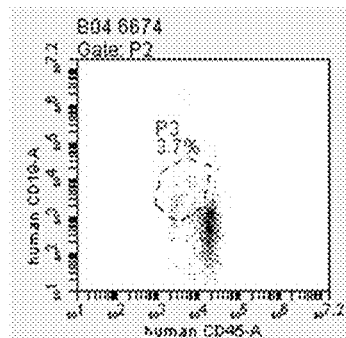

For example, as shown in FIG. 13, the anti-CD47 antibody Hu5F9-G4 group (FIG. 13B) shows a significant clearance of non-target cells with high abundance of CD47 expression (such as T cells) compared to 0.9% normal saline group (FIG. 13A) (the proportion of B cells (i.e., the target cells with CD20 antigen) in all detected cells increases from 40.9% to 73.5% at 96 hours after administration); whereas the recombinant protein Ofa-Fc1-D1-Fc2 group (FIG. 13C) shows a significant clearance of B cells (i.e., the target cells with the CD20 antigen) compared with 0.9% normal saline (FIG. 13A), i.e., Ofa-Fc1-D1-Fc2 preferentially clears B cells at 96 hours after administration (the proportion of B cells in all detected cells decreases from 40.9% to 3.7% at 96 hours after administration).

As known to those skilled in the art, the above test results indicate that the recombinant proteins of the present disclosure which are capable of simultaneously binding to both the tumor-targeting antigen and the CD47 antigen preferentially clear the cells and/or tumor cells with the tumor-targeting antigen under the condition of a same dose.

Immunological Safety at a Low Dose:

NSG (Hu-NSG) female mice (purchased from Beijing Idmo Co., Ltd) transplanted with human CD34$^+$ HSC were selected and divided into the following 2 groups (3 mice for each group, the mice were intravenously injected with the given agents for each group): 1) Ofa-Fc1-D1-Fc2 group (1 µg/mouse); 3) Ofa-Fc1-D1$'''$-Fc2 group (1 µg/mouse). The mice were administered once. At 72 hours after administration, 80 µL of blood was collected from the tail vein of the mice and added to an anticoagulant tube containing heparin sodium. The RBCs were lysed by a freshly prepared mixture of lysis buffer (BD Pharm Lyse™, Art No. 555899) and double distilled water at a volume ratio of 1:1, and the remaining cells were rinsed and resuspended with PBS+2% FBS, and then incubated with the fluorescent antibody (PE anti-human CD45 (Art No. 304039), FITC anti-human CD19 (Art No. 302206), APC anti-human CD3 (Art No. 300312), all purchased from BioLegend) for 30 minutes. After rinsing and resuspension with PBS+2% FBS, the sample of the Ofa-Fc1-D1-Fc2 group (1 µg/mouse) was detected by a flow cytometer (Accuri™ C6, BD), and the sample of the Ofa-Fc1-D1$'''$-Fc2 group (1 µg/mouse) was detected by a flow cytometer (NovoCyte™ 3130, ACEA).

The test results showed that, in the case where the Hu-NSG mice were administrated with recombinant proteins at a low dose, at 72 hours after Ofa-Fc1-D1-Fc2, Ofa-Fc1-D1-D2-Fc2, Ofa-Fc1-D1-D2-D3-Fc2, Obi-Fc1-

D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 or Anti-PD-L1(12A4)-Fc1-D1-D2-D3-Fc2 was administrated once, the target cells which expressed the antigen targeted by the left arm(such as tumor cells) had been significantly eliminated, whereas the cells which do not express the antigen targeted by the left arm (such as T cells, other immune cells) had not been significantly affected; however, at 72 hours after the recombinant protein comprising a high affinity mutant of the extracellular truncated variant of SIRPα, Ofa-Fc1-D1'''-D2-Fc2 or Anti-EGFR-Fc1-D1'''-Fc2 or Anti-EGFR-Fc1-D1'''-D2-Fc2 or Anti-Her2(T)-Fc1-D1'''-Fc2 or Anti-Her2(T)-Fc1-D1'''-D2-Fc2 or Anti-Her2(P)-Fc1-D1'''-Fc2 or Anti-Her2(P)-Fc1-D1'''-D2-Fc2 or Anti-PD-L1(Ate)-Fc1-D1'''-Fc2 or Anti-PD-L1(Ate)-Fc1-D1'''-D2-Fc2 or Anti-PD-L1(13G4)-Fc1-D1'''-Fc2 or Anti-PD-L1(13G4)-Fc1-D1'''-D2-F,2 or Anti-PD-L1(12A4)-Fc1-D1'''-Fc2 or Anti-PD-L1(12A4)-Fc1-D1'''-D2-Fc2 was administrated once, although the target cells which expressed the antigen targeted by the left arm (such as tumor cells) had been significantly eliminated, the cells which do not express the antigen targeted by the left arm (such as T cells and other immune cells) also had been eliminated to a significant extent.

Figure 14A:
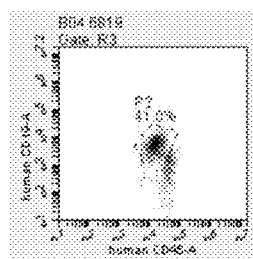
FIGS. 14A-14H show the results of the early immunological safety evaluation assay of Ofa-Fc1-D1-Fc2 and Ofa-Fc1-D1‴-Fc2 in Hu-NSG mice (FACS analysis of immune cell types) in vivo.
Figure 14B:
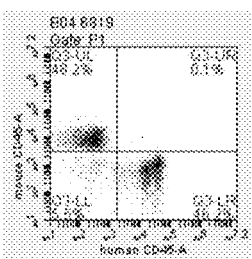
Figure 14C:
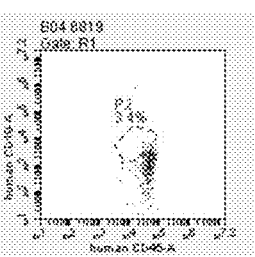
Figure 14D:
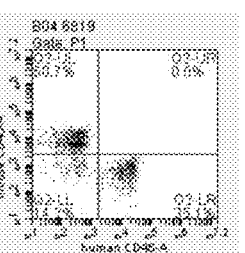
Figure 14E:
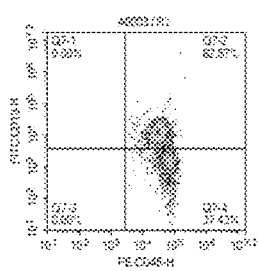
Figure 14F:
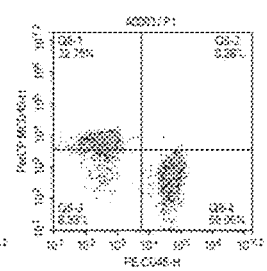
Figure 14G:
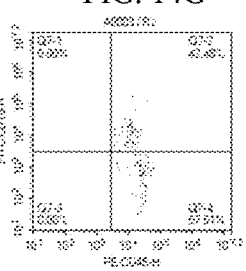
Figure 14H:
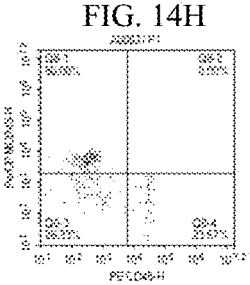

For example, as shown in FIG. 14, at 72 hours after the single administration of Ofa-Fc1-D1-Fc2B (FIG. 14C, FIG. 14D), the B cells (the target cell with the CD20 antigen) have been significantly eliminated (almost completely eliminated), while the cells that do not express the CD20 antigen (such as T cells, other immune cells) have not been significantly affected, compared to the state before administration (FIG. 14A, FIG. 14B). At 72 hours after the single administration of Ofa-Fc1-D1'''-Fc2 (FIG. 14G, FIG. 14H), compared to the state before administration (FIG. 14E, FIG. 14F), although the B cells (the target cell with the CD20 antigen) have been significantly eliminated, the cells that do not express the CD20 antigen (such as T cells and other immune cells) also have been eliminated to a significant extent.

As known to those skilled in the art, the above results indicate that the recombinant proteins comprising an extracellular truncated variant of SIRPα in the right arm have a higher specific tumor-targeting effect and exhibit a greater immunological safety than the recombinant proteins comprising a high affinity mutant of the extracellular truncated variant of SIRPα in the right arm at a same dose.

Immune Recovery at a High Dose:

NSG (Hu-NSG) female mice (purchased from Beijing Idmo Co., Ltd) transplanted with human CD34+ HSC were selected and divided into the following 2 groups (3 mice for each group, the mice were intravenously injected with the given agents for each group): 1) Hu5F9-G4 group (200 μg/mouse); 3) Ofa-Fc1-D1-Fc2 group (150 μg/mouse). The mice were administered once. At 4 days and 14 days after administration, 80 μL of blood was collected from the tail vein of the mice and added to an anticoagulant tube containing heparin sodium. The RBCs were lysed by a freshly prepared mixture of lysis buffer (BD Pharm Lyse™, Art No. 555899) and double distilled water in a volume ratio of 1:1, and the remaining cells were washed and resuspended with PBS+2% FBS, and then incubated with the fluorescent antibody (PE anti-human CD45 (Art No. 304039), FITC anti-human CD19 (Art No. 302206), APC anti-human CD3 (Art No. 300312), all purchased from BioLegend) for 30 minutes. After rinsing and resuspension with PBS+2% FBS, the sample was detected by a flow cytometer (Accuri™ C6, BD).

The test results showed that, in the case where the Hu-NSG mice were administrated with recombinant proteins at a high dose, at 96 hours after Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2, Anti-PD-L1(12A4)-Fc1-D1-D2-D3-Fc2 or anti-CD47 antibody Hu5F9-G4 was administrated once, the B cells (the target cell with the CD20 antigen) and the non-target cells (such as T cells, other immune cells) had been eliminated to a significant extent in each group. At 14 days after administration, in the Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 or Anti-PD-L1(12A4)-Fc1-D1-D2-D3-Fc2 group, the B cells (the target cell with the CD20 antigen) were still in a state of being eliminated, while other non-target cells expressing the CD47 (such as T cells) had been significantly recovered; however in the anti-CD47 antibody Hu5F9-G4 group, neither the B cells (the target cell with the CD20 antigen) nor the non-target cells expressing the CD47 had been recovered.

For example, as shown in FIG. 15, at 96 hours after administration of a high dose of the anti-CD47 antibody Hu5F9-G4 (FIG. 15A) or Ofa-Fc1-D1-Fc2 (FIG. 15B), both the B cells (the target cell with the CD20 antigen) and the non-target cells expressing the CD47 (such as T cells) have been largely eliminated; but at 14 days after administration, the B cells (the target cell with the CD20 antigen) are still in a state of being eliminated, while the non-target cells expressing the CD47 (such as T cells) except of the B cells (the target cell with the CD20 antigen) have been significantly recovered in the Ofa-Fc1-D1-Fc2 group (FIG. 15D); however, neither the B cells (the target cell with the CD20 antigen) nor the non-target cells expressing the CD47 (such as T cells) do show a sign of recovery in the anti-CD47 antibody Hu5F9-G4 group (FIG. 15C).

As known to those skilled in the art, the above test results indicate that the recombinant proteins of the present disclosure which are capable of simultaneously binding to both the tumor-targeting antigen and the CD47 antigen have a higher immunological safety, since the non-target cells expressing CD47 (such as immune cells such as T cells) can be recovered under the treatment with a high dose of these recombinant proteins.

As known to those skilled in the art, the above test results indicate that the early immunological safety evaluation method in vitro described in the present disclosure can be used to evaluate the early immunological safety of recombinant proteins (including monovalent or multivalent) or antibodies (including monovalent or multivalent).

EXAMPLE 7

Influence of Different Truncations on the Binding Affinity to the Target

Among the recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2, Anti-Her2(T)-Fc1-D1-Fc2, Anti-Her2(T)-Fc1-D1-D2-Fc2, Anti-Her2(P)-Fc1-D1-Fc2 and Anti-Her2(P)-Fc1-D1-D2-Fc2 were taken as examples, and the following method is applicable for the recombinant proteins having a same left arm and a different length of extracellular truncated variants of SIRPα.

Determination of Bispecific Binding Activity to the Targets Her2 and CD47 by Flow Cytometry Well-grown SKBR-3 cells (human breast cancer cell, purchased from the Cell Bank of Chinese Academy of Sciences, Shanghai) were collected, counted, centrifuged and resuspended to a concentration of 2×10$^6$ cells/mL with PBS+2% FBS. 100 μL of the cell suspension was aliquoted to each well of a 96-well U-plate (Art No. 3799, Corning) and allowed to stand for at least 15 minutes. The supernatant was pipetted and discarded after centrifugation, then 11 serial dilutions of Anti-Her2(T)-Fc1-D1-Fc2, Anti-Her2(T)-Fc1-D1-D2-Fc2, Anti-Her2(P)-Fc1-D1-Fc2 or Anti-Her2(P)-Fc1-D1-D2-Fc2 (4-fold serial dilutions starting from 433.2 nM, a total of 11 dilutions) were added respectively and incubated at 4° C. for 1 hour. After rinsing with PBS+2% FBS, goat anti-human IgG Fc-FITC (F9512-2ML, Sigma) was added and incubated for 1 hour at 4° C. After rinsing and resuspension with PBS+2% FBS, the fluorescence value was determined by a flow cytometer (Accuri C6, BD).

Since Trastuzumab and Pertuzumab act on different epitopes of the Her2 antigen and there is a large difference in the distances from the two epitopes to the cell membrane, therefore, the recombinant proteins Anti-Her2(T)-Fc1-D1-Fc2, Anti-Her2(T)-Fc1-D1-D2-Fc2, Anti-Her2(P)-Fc1-D1-Fc2 and Anti-Her2(P)-Fc1-D1-D2-Fc2are all capable of specifically binding to SKBR-3 cells, but their binding affinities and their maximum average fluorescence intensities are various.

The test results showed that, since Trastuzumab and Her2 epitopes (Pedersen M W, et al. Targeting Three Distinct HER2 Domains with a Recombinant Antibody Mixture Overcomes Trastuzumab Resistance. *Molecular Cancer Therapeutics*, 2015, 14(3): 669-680) are relatively closer to the cell membrane surface, Anti-Her2(T)-Fc1-D1-Fc2 had better affinity to the SKBR-3 cells than Anti-Her2(T)-Fc1-D1-D2-Fc2. Since Pertuzumab and Her2 epitopes (extracellular domain II of Her2) are relatively farther to the cell membrane surface, therefore Anti-Her2(P)-Fc1-D1-Fc2 had an equivalent affinity to the SKBR-3 cells compared to Anti-Her2(P)-Fc1-D1-D2-Fc2 SKBR-3.

The above test results demonstrate that the right arm with different lengths of truncation will affect the affinity of the recombinant proteins to the target cells. For the left arm which binds to the membrane-proximal epitope, the right arm with a shorter truncation of SIRPα can largely enhance the binding of the recombinant proteins to the two targets. However, for the left arm which binds to the membrane-distal epitope, the right arm with a shorter truncation of SIRPα would lose its advantage. The farther the antigen targeted by the left arm is distant from the cell membrane, the longer the truncated variant of SIRPα in the right arm should be in order to achieve optimal matching.

For example, as shown in FIG. 16, the binding capability of Anti-Her2(T)-Fc1-D1-Fc2 ($EC_{50}$=2.04 nM) to SKBR-3 cells is significantly better than that of Anti-Her2(T)-Fc1-D1-D2-Fc2 ($EC_{50}$=25.95 nM) (FIG. 16A). The binding capability of Anti-Her2(P)-Fc1-D1-Fc2 to SKBR-3 cells ($EC_{50}$=15.22 nM) is equivalent to that of Anti-Her2(P)-Fc1-D1-D2-Fc2 ($EC_{50}$=11.03 nM) (FIG. 16B).

As known to those skilled in the art, the above test results indicate that based on the distance between the epitope of the target antigen and the membrane surface of the target cell, an extracellular truncated variant of human SIRPα with a suitable length for the right arm can effectively enhance the binding capability of the recombinant proteins to the target cell.

EXAMPLE 8

Acute Cytotoxicity Test of the Recombinant Proteins

This embodiment provides an acute cytotoxicity test of the recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2. The following method takes Ofa-Fc1-D1-Fc2 as an example, which is also applicable for the recombinant proteins with an extracellular truncated variant of SIRPα in the right arm.

A proper amount of Ofa-Fc1-D1-Fc2solution (4.02 mg/mL) was diluted to 0.25 mg/mL and 2.5 mg/mL with a buffer (Tris-citrate, pH 6.5) for injection, and used for administrating to the group 1 and group 2 experimental animals, respectively.

Four healthy female cynomolgus monkeys, aged 4, were purchased from Guangxi Guidong Primates Development and Experiment Co., Ltd. The production of the experimental animals is approved by the Department of Science and Technology of the Guangxi Zhuang Autonomous Region, and the license number is SCXK Gui2016-0001. The experimental animals were clinically observed in detail and weighed before administration, and no abnormalities were found. The body weight was 2.47-2.85 kg on the day of initial administration.

TABLE 9

Experimental design

| Group | Treatment | Dose* (mg/kg) | Dosing Concentration (mg/mL) | Dosing volume (mg/kg) | Animal No. Male | Animal No. Female |
|---|---|---|---|---|---|---|
| 1 | Ofa-Fc1-D1-Fc2 | 0.5 | 0.25 | 2 | 0 | 2 |
| 2 | Ofa-Fc1-D1-Fc2 | 5 | 2.5 | 2 | 0 | 2 |

Note:
*intravenous injection.

Four female cynomolgus monkeys were divided into two groups with two monkeys in each group. The animals were intravenously administered at a dose of 0.5 mg/kg and 5 mg/kg respectively, and the dosing volume was 2 mL/kg. The experimental design was shown in Table 9. The animals were administrated once, and then continuously observed for 28 days after the administration. The cynomolgus monkeys were housed in stainless steel movable cages with one animal in each cage. The light was approximately 12 hours on and 12 hours off daily. The feed for the animals were purchased from Beijing KeaoXieli Feed Co., Ltd., and the animals had free access to the feed during the experiment, except for specific fasting period. The batch of the feed was detected by Shanghai Pony Testing Technology Co., Ltd. (PONY) for specific microorganisms, heavy metals and pesticide residues. During the experiment, all animals had free access to drink water via water bottles. The drinking water was purified water filtered and sterilized by reverse osmosis system. The pH, hardness, heavy metals and microorganisms of the drinking water were detected by a gauger.

All animals were observed twice a day (once in the morning and once in the afternoon)near the cage during the experiment, and observations included but were not limited to morbidity, damage, death and the supply of feed and water. All animals were clinically observed in detail once before the experiment. All animals were clinically observed in detail at least once a day after administration during the experiment. Clinical observations included but were not limited to, morbidity, mortality, damage and the supply of feed and water, skin, hair, eyes, ears, nose, mouth, chest, abdomen, external genitalia, limbs, respiratory and circulatory systems, autonomic effects (such as salivation), nervous system (such as fremitus, convulsion, stress reaction, and abnormal behavior). The body weight of the animals was measured on D-1 (before administration), D1, D4, D8, D11, D15, D18, D22, D25 and before dissection. The food consumption of the animals within 24 h (24 h±1 h) was measured on D2, D4, D8, D11, D15, D18, D22, D25, respectively. Electrocardiogram was monitored on D-1, D2, D14, and D28 using a standard II lead (8 leads) at a recording speed of 50 mm/second.

Clinicopathological samples were collected and hematology, blood coagulation, blood biochemistry index and lymphocyte typing were detected before administration (D-1) and on D2, D7, D14 and D28 after administration. Urine samples were collected and analyzed before administration and on day 28 after administration.

Before collecting the sample, all animals were fasted except for free access to water overnight (at least 10 hours). Blood samples (4.5-6 mL) were collected from the femoral vein, wherein approximately 1.8 mL of the whole blood was used for blood coagulation analysis in an anticoagulant tube containing sodium citrate; approximately 1 mL of the whole blood was used for hematology analysis in an anticoagulant tube containing K3-EDTA;approximately 2 mL of the whole blood was used for blood biochemistry analysis in a blood collection tube (free of anticoagulant) with separator gel, and the serum was isolated by centrifugation according to standard operating procedures. Meanwhile, the isolated serum samples on D-1 before administration and on D2 after administration were used for TB cell typing by flow cytometry.

Animals are euthanized on D29, heart, liver, spleen, lung and kidney tissues were collected and preserved, and liver, lung (including main bronchus), kidney, spleen, heart, adrenal gland, pituitary, thyroid and parathyroid gland, thymus, ovary, uterus (including the cervix), and brain were weighed.

The results showed that, after a single intravenous administration of Ofa-Fc1-D1-Fc2 at a dose of 0.5 mg/kg and 5 mg/kg respectively, the animals were continuously observed for 28 days after administration, no significant abnormalities related to the drug were observed in the animals, the food consumption and body weight were all fluctuated within the normal range; compared to the data before administration, the blood coagulation, urine and electrocardiogram data of the animals after administration had no significant changes; after the animals were dissected, all organs were observed to be within the normal range, and the weight of the organs, visceral coefficient, and the visceral-brain ratio were also within the normal range.

On D2 after administration, the lymphocyte count and the proportion of lymphocytes in the low and high dose groups showed a significant decrease, and returned to a normal level after D7. This change may be related to the effect of the drug.

The recombinant proteins Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 had a similar result to the above results of Ofa-Fc1-D1-Fc2 at the same dose.

TABLE 10

Effect of the recombinant protein on the number of RBCs ($10^{12}$ cells/L) of cynomolgus monkeys

| Group | Parallel experiment | Animal identifier | Before administration | D2 | D7 | D14 | D28 |
|---|---|---|---|---|---|---|---|
| 1 | 1 | 101 | 4.23 | 4.15 | 3.98 | 5.01 | 5.66 |
|   | 2 | 102 | 4.67 | 4.19 | 4.05 | 4.7 | 5.16 |
| 2 | 1 | 201 | 5.27 | 4.69 | 4.04 | 4.99 | 5.59 |
|   | 2 | 202 | 4.71 | 4.02 | 4.26 | 4.99 | 5.72 |

As shown in FIG. 18A and Table 10, Ofa-Fc1-D1-Fc2 does not affect the number of RBCs of cynomolgus monkeys at both dose of 0.5 mg/kg and 5 mg/kg; as shown in FIG. 18B and Table 10, Ofa-Fc1-D1-Fc2 does not affect the hemoglobin of cynomolgus monkeys at both dose of 0.5 mg/kg and 5 mg/kg.

TABLE 11

Effect of the recombinant protein on the hemoglobin (g/L) of cynomolgus monkeys

| Group | Parallel experiment | Animal identifier | Before administration | D2 | D7 | D14 | D28 |
|---|---|---|---|---|---|---|---|
| 1 | 1 | 101 | 97 | 97 | 89 | 115 | 129 |
|   | 2 | 102 | 109 | 98 | 93 | 108 | 118 |
| 2 | 1 | 201 | 126 | 110 | 96 | 115 | 129 |
|   | 2 | 202 | 107 | 90 | 95 | 112 | 128 |

The recombinant proteins Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D 1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 had a similar effect on the number of RBCs and the amount of hemoglobin of cynomolgus monkeys compared to the above results of Ofa-Fc1-D1-Fc2 at the same dose.

Figure 19:
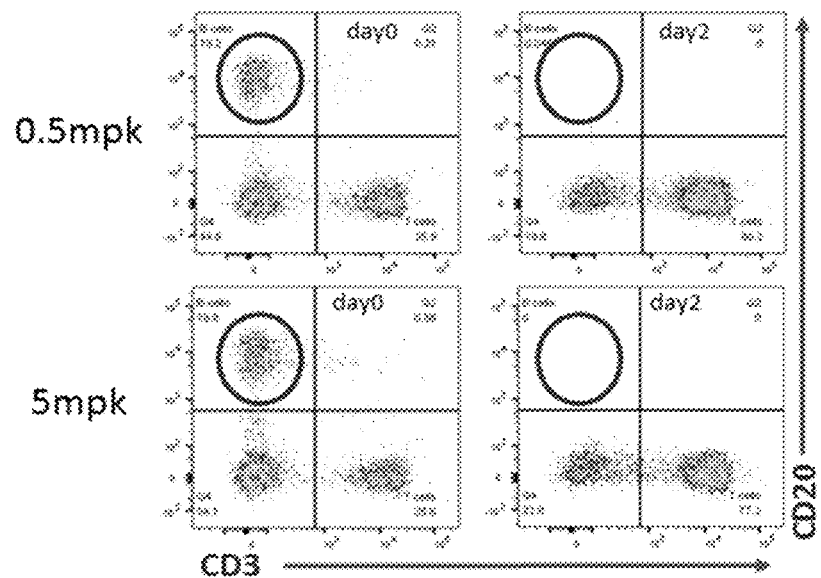
FIG. 19 shows the detection results of Ofa-Fc1-D1-Fc2 on B cell content of cynomolgus monkeys at two doses.

As shown in FIG. 19, based on the test results of the TB cell typing, Ofa-Fc1-D1-Fc2 can significantly eliminate B cells (the target cell with the CD20 antigen) of the animals at both dose of 0.5 mg/kg and 5 mg/kg.

As known to those skilled in the art, the above test results indicated that, after a single administration of the recombinant proteins of the present disclosure which are capable of simultaneously binding to the target antigen and the CD47 antigen, no significant abnormalities related to the drug were observed in the animals, the food consumption and body weight were all fluctuated within the normal range; compared to the data before administration, the blood coagulation, urine and electrocardiogram data of the animals after administration had no significant changes; after the animals were dissected, all organs were observed to be within the normal range, and the weight of the organs, visceral coefficient, and the visceral-brain ratio were also within the normal range.

As known to those skilled in the art, the above test results indicate that, after a single administration of the recombinant proteins of the present disclosure which are capable of simultaneously binding to the target antigen and the CD47 antigen, the number of RBCs and the amount of hemoglobin of the animal were not affected.

As known to those skilled in the art, the above test results indicate that the recombinant proteins of the present disclosure which are capable of simultaneously binding to the target antigen and the CD47 antigen preferentially clears the cells and/or tumor cells with the tumor-targeting antigen under the condition of a same dose.

EXAMPLE 9

Inhibition of Tumor Growth by the Recombinant Proteins In Vivo

Experiments of the recombinant proteins Ofa-Fc1-D1-Fc2, Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2, Anti-PD-L1(12A4)-Fc1-D1-D2-D3-Fc2 on inhibition of tumor growth were conducted respectively in vivo. Ofa-Fc1-D1-Fc2 was taken as an example, and the following method is applicable for the recombinant proteins comprising an extracellular truncated variant of SIRPα in the right arm.

Ofa-Fc1-D1-Fc2: a colorless clear liquid with a concentration of 1.14-4.02 mg/mL was aliquoted and stored at −80° C.; Rituxan® (rituximab injection): a colorless clear liquid, 100 mg/10 mL, Lot No. H0205, stored at 2-8° C. and protected from light. Preparation Buffer (Tris-citrate, pH 6.5): a colorless clear liquid, stored at 2-8° C. Formulation: Ofa-Fc1-D1-Fc2 and Rituxan® were diluted with the preparation buffer; the preparation buffer was directly administered as the solvent.

Cell: CD20-positive human B-cell lymphoma Daudi cells were purchased from the Cell Bank of Chinese Academy of Sciences and cultured with RPMI 1640 medium supplemented with 10% fetal bovine serum, penicillin and streptomycin in an incubator containing 5% $CO_2$ at 37° C. The cells were passaged twice a week, and the cells in the exponential growth phase were collected, counted and inoculated.

Experimental animals: Female NOD-SCID mice, 6-7 weeks, purchased from Shanghai Lingchang Biotech Co., Ltd.; license number: SOCK (Hu) 2013-0018. Animal certificate number: 2013001829463, 2013001827545. Feeding environment: SPF level. The use and welfare of the experimental animals shall comply with the provisions of Association for Assessment and Accreditation of Laboratory Animal Care (AAALAC). The health status and mortality of the animals were monitored daily. Routine monitoring included observing the effects of the test substances and drugs on the daily behavior of the animals such as behavioral activities, weight changes, and appearances.

Each mouse was subcutaneously inoculated with $1.5 \times 10^7$ Daudi cells, and when the average tumor volume reached 100-150 mm³ on the 18th day after the inoculation, the animals were divided into different groups and administered (D0). The mice were intravenously (IV) injected with the drugs; the mice in the control group were injected with a same volume of the solvent; the injection volume was 0.1 mL per 10 g body weight. The dose and dosage regimen refers to Table 12.

The diameter of the tumor was measured twice a week with a vernier caliper. The tumor volume (V) is calculated by the following formula:

The tumor volume (V) is calculated by the following formula:

$$V = \tfrac{1}{2} \times a \times b^2;$$

wherein a and b represent the length and width respectively.

$$T/C(\%) = (T-T0)/(C-C0) \times 100;$$

wherein T and C represent the tumor volume at the end of the experiment; T0 and C0 represent the tumor volume at the start of the experiment; T represents the treatment group, and C represents the control group.

Tumor inhibition rate: (TGI) (%)=100−T/C(%)

When the tumor regresses, the tumor inhibition rate (TGI) (%)=100−(T−T0)/T0×100.

If the tumor volume is smaller than the initial volume, i.e., T<T0 or C<C0, it is defined as tumor partial regression (PR); if the tumor completely disappears, it is defined as tumor complete regression (CR).

When the experiment is over, or when the tumor volume of the animal reached a euthanasia endpoint of 1500 mm³, the animals were euthanatized by carbon dioxide anesthesia, and then the tumor was taken by dissection and photographed.

The comparison of the tumor volume and weight between the two groups was conducted by two-tailed Student's t test, and P<0.05 was defined as a statistically significant difference.

Figure 20:
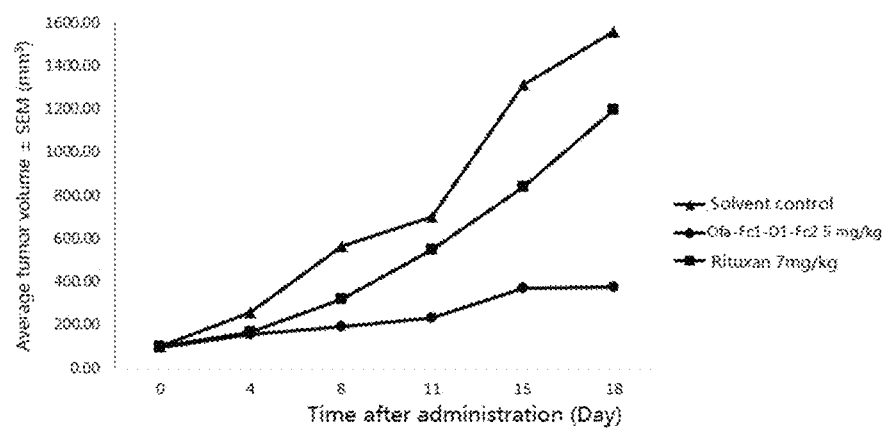
FIG. 20 shows the effect of Ofa-Fc1-D1-Fc2 and Rituxan® on the growth of human B-cell lymphoma Daudi subcutaneous xenografts.
Figure 21:
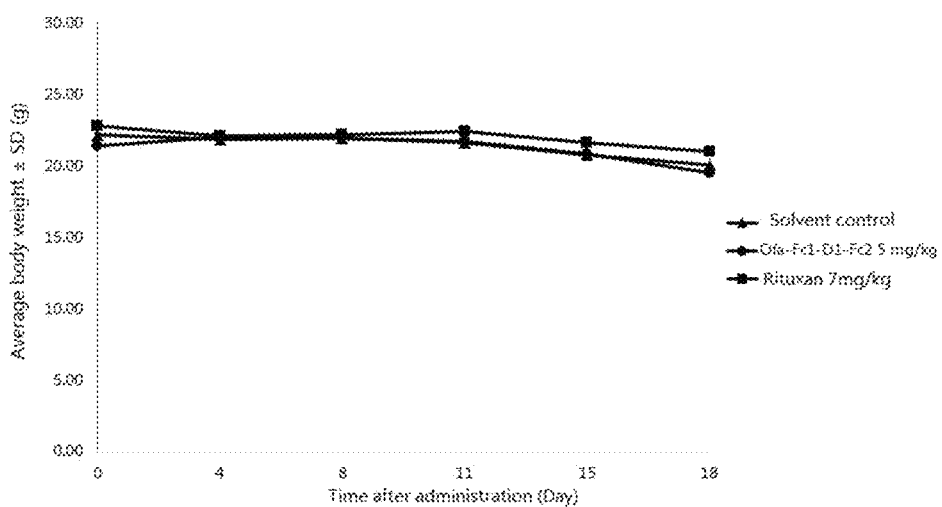
FIG. 21 shows the effect of Ofa-Fc1-D1-Fc2 and Rituxan® on the body weight of tumor-bearing mice.
Figure 22:
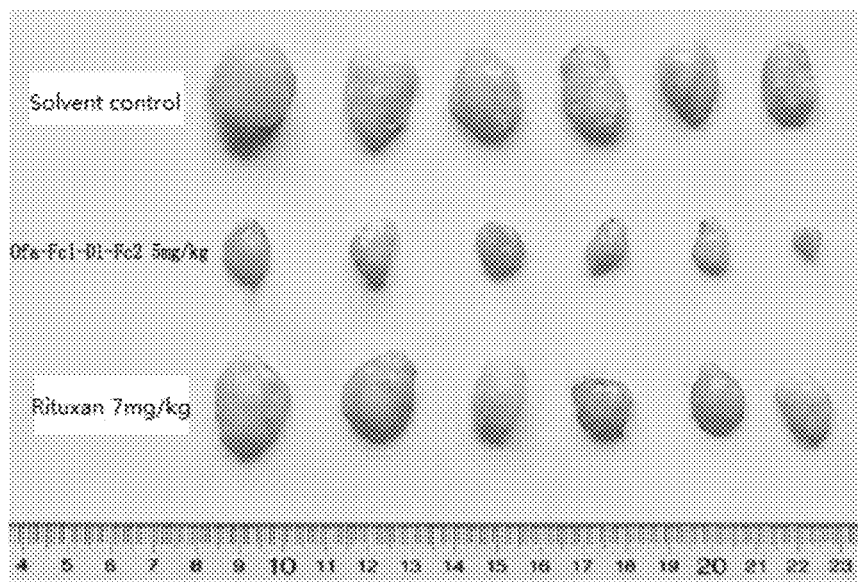
FIG. 22 shows the effect of Ofa-Fc1-D1-Fc2 and Rituxan® on human B-cell lymphoma Daudi subcutaneous xenografts.

Ofa-Fc1-D1-Fc2 (5 mg/kg, IV, twice a week for 5 times) significantly inhibited the growth of Daudi subcutaneously transplanted tumor, with an inhibition rate of 80.8% and tumor partial regression in ⅙ mice. Rituxan® (7 mg/kg, IV, twice a week for 5 times) had a tumor inhibition rate of 24.5% on the Daudi subcutaneously transplanted tumor. Tumor-bearing mice were generally well tolerated to the above drugs (Table 12, FIG. 20, 21, 22).

The anti-tumor effect of the recombinant proteins Ofa-Fc1-D1-D2-Fc2, Ofa-Fc1-D1-D2-D3-Fc2, Obi-Fc1-D1-Fc2, Obi-Fc1-D1-D2-Fc2, Obi-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-Her2(P)-Fc1-D1-Fc2, Anti-Her2(P)-Fc1-D1-D2-Fc2, Anti-Her2(P)-Fc1-D1-D2-D3-Fc2, Anti-Her2(T)-Fc1-D1-Fc2, Anti-Her2(T)-Fc1-D1-D2-Fc2, Anti-Her2(T)-Fc1-D1-D2-D3-Fc2, Anti-EGFR-Fc1-D1-Fc2, Anti-EGFR-Fc1-D1-D2-Fc2, Anti-EGFR-Fc1-D1-D2-D3-Fc2, Anti-PD-L1(Ate)-Fc1-D1-Fc2, Anti-PD-L1(Ate)-Fc1-D1-D2-Fc2, Anti-PD-L1(Ate)-Fc1-D1-D2-D3-Fc2, Anti-PD-L1(13G4)-Fc1-D1-Fc2, Anti-PD-L1(13G4)-Fc1-D1-D2-Fc2, Anti-PD-L1(13G4)-Fc1-D1-D2-D3-Fc2, Anti-PD-L1(12A4)-Fc1-D1-Fc2, Anti-PD-L1(12A4)-Fc1-D1-D2-Fc2 and Anti-PD-L1(12A4)-Fc1-D1-D2-D3-Fc2 on the transplanted tumor in NOD-SCID mice at the same dose and the tolerance of the mice to the recombinant proteins were similar to the above results of Ofa-Fc1-D1-Fc2.

As known to those skilled in the art, the above test results indicate that the recombinant proteins of the present disclosure which are capable of simultaneously binding to the tumor-targeting antigen and the CD47 antigen have an unexpectedly significant anti-tumor effect compared to the tumor-targeting antibody at the condition of a same dose.

The use and welfare of the experimental animals shall comply with the provisions of Association for Assessment and Accreditation of Laboratory Animal Care (AAALAC). The health status and mortality of the animals were monitored daily. Routine monitoring included observing the effects of the test substances and drugs on the daily behavior of the animals such as behavioral activities, weight changes, and appearances.

The use of any and all examples, or exemplary language (e.g., "such as") provided herein, is intended merely to better illuminate the present invention and does not pose a limitation on the scope of the present invention unless otherwise claimed. No language in the specification should be construed as indicating any non-claimed element as essential to the practice of the present invention.

All publications and patent applications mentioned in this specification are herein incorporated by reference in their entireties to the same extent as if each individual publication or patent application is specifically and individually indicated to be incorporated by reference. In addition, any theory, mechanism, proof, or finding stated herein is meant to further enhance understanding of the present invention

TABLE 12

Efficacy of Ofa-Fc1-D1-Fc2 and Rituxan ® on the human B cell lymphoma Daudi subcutaneously transplanted tumor

| Group | Administration | Route | Average tumor volume (mm³) D0 | SEM | Average tumor volume (mm³) D18 | SEM | % T/C | (TGI) (%) | P value | Partial regression | Complete regression | Animal number at the start | Animal number at the end |
|---|---|---|---|---|---|---|---|---|---|---|---|---|---|
| Solvent | D0, | IV | 103.3 | ±1.7 | 1558.7 | ±374.6 | — | — | — | 0 | 0 | 6 | 6 |
| Ofa-Fc1-D1-Fc2 | D3, D7, | | 99.4 | ±1.7 | 378.8 | ±97.5 | 19.2 | 80.8 | 0.0124 | 1 | 0 | 6 | 6 |
| Rituxan ® 7 mg/kg | D10, D14 | | 101.6 | ±1.0 | 1200.8 | ±175.7 | 75.5 | 24.5 | 0.4089 | 0 | 0 | 6 | 6 |

Note:
Randomly divided into groups, the first administration time is D 0; IV: intravenous injection.

It can be seen that both Ofa-Fc1-D1-Fc2 and Rituxan® inhibited the growth of CD20-positive human B cell lymphoma Daudi subcutaneous xenograft tumor to varying degrees, wherein Ofa-Fc1-D1-Fc2 is significantly superior to Rituxan®; Mice are generally well tolerated to the above drugs.

and is not intended to limit the inventions in any way to such theory, mechanism, proof, or finding. While the present invention has been illustrated and described in detail in the drawings and foregoing description, such illustration and description are to be considered illustrative and not restrictive.

What is claimed is:

1. A bispecific recombinant protein, wherein the bispecific recombinant protein comprises a high affinity tumor-targeting arm and a fusion protein with low affinity for blocking the interaction between CD47 and SIRPα;

wherein the bispecific recombinant protein has a configuration comprising a left arm and a right arm which are symmetrically arranged, wherein the high affinity tumor-targeting arm is arranged in the left arm, the fusion protein with low affinity for blocking the interaction between CD47 and SIRPα is arranged in the right arm;

wherein the high affinity tumor-targeting arm and the fusion protein with low affinity for blocking the interaction between CD47 and SIRPα are combined via an intermolecular force, interchain disulfide bond, and/or salt bond; and wherein the high affinity tumor-targeting arm targets CD20, EGFR, Her2 or PD-L1, and when targeting CD20, the high affinity tumor-targeting arm comprises (a) the amino acid sequence at positions 20 to 244 of SEQ ID NO: 16 and the amino acid sequence at positions 21 to 234 of SEQ ID NO: 17, or (b) the amino acid sequence at positions 20-241 of SEQ ID NO: 18 and the amino acids sequence at positions 21-239 of SEQ ID NO: 4;

when targeting EGFR, the high affinity tumor-targeting arm comprises the amino acid sequence at positions 20-241 of SEQ ID NO: 19 and the amino acids sequence at positions 18-231 of SEQ ID NO: 8;

when the target is HER2, the high affinity tumor-targeting arm comprises (a) the amino acid sequence at positions 20 to 242 of SEQ ID NO: 20 and the amino acids sequence at positions 21 to 234 of SEQ ID NO: 21, or (b) the amino acid sequence at positions 20 to 241 of SEQ ID NO: 22 and the amino acid sequence at positions 21 to 234 of SEQ ID NO: 23; and when the target is PD-L1, the high affinity tumor-targeting arm comprises the amino acid sequence at positions 20 to 240 of SEQ ID NO: 24 and the amino acid sequence at positions 20 to 233 of SEQ ID NO: 13, and the fusion protein with low affinity for blocking the interaction between CD47 and SIRPα comprises (a) the amino acid sequence of SEQ ID NO: 30 or the amino acid sequence of SEQ ID NO: 30 except with an A80N substitution, or (b) the amino acid sequence of SEQ ID No: 31 or the amino acid sequence of SEQ ID NO: 31 except with an A80N substitution;

wherein the bispecific recombinant protein further comprises an Fc region.

2. The bispecific recombinant protein of claim 1, wherein the high affinity tumor-targeting arm targets CD20 and comprises (a) the amino acid sequence at positions 20 to 244 of SEQ ID NO: 16 and the amino acid sequence at positions 21 to 234 of SEQ ID NO: 17, or (b) the amino acid sequence at positions 20-241 of SEQ ID NO: 18 and the amino acids sequence at positions 21-239 of SEQ ID NO: 4, and the fusion protein with low affinity for blocking the interaction between CD47 and SIRPα comprises the amino acid sequence of SEQ ID NO: 30 or the amino acid sequence of SEQ ID NO: 30 except with an A80N substitution.

3. The bispecific recombinant protein of claim 1, wherein the high affinity tumor-targeting arm targets EGFR and comprises the amino acid sequence at positions 20 to 241 of SEQ ID NO: 19 and the amino acid sequence at positions 18 to 231 of SEQ ID NO: 8, and the fusion protein with low affinity for blocking the interaction between CD47 and SIRPα comprises the amino acid sequence of SEQ ID NO: 30 or the amino acid sequence of SEQ ID NO: 30 except with an A80N substitution.

4. The bispecific recombinant protein of claim 1, wherein the high affinity tumor-targeting arm targets HER2 and comprises (a) the amino acid sequence at positions 20 to 242 of SEQ ID NO: 20 and the amino acids sequence at positions 21 to 234 of SEQ ID NO: 21, or (b) the amino acid sequence at positions 20 to 241 of SEQ ID NO: 22 and the amino acid sequence at positions 21 to 234 of SEQ ID NO: 23, and the fusion protein with low affinity for blocking the interaction between CD47 and SIRPα comprises (a) the amino acid sequence of SEQ ID NO: 30 or the amino acid sequence of SEQ ID NO: 30 except with an A80N substitution, or (b) the amino acid sequence of SEQ ID No: 31 or the amino acid sequence of SEQ ID NO: 31 except with an A80N substitution.

5. The bispecific recombinant protein of claim 1, wherein the high affinity tumor-targeting arm targets PD-L1 and comprises the amino acid sequence at positions 20 to 240 of SEQ ID NO: 24 and the amino acid sequence at positions 20 to 233 of SEQ ID NO: 13, and the fusion protein with low affinity for blocking the interaction between CD47 and SIRPα comprises the amino acid sequence of SEQ ID NO: 30 or the amino acid sequence of SEQ ID NO: 30 except with an A80N substitution.

6. The bispecific recombinant protein of claim 1, wherein the high affinity tumor-targeting arm and the fusion protein with low affinity for blocking the interaction between CD47 and SIRPα are heterodimerized by knobs-into-holes.

7. A nucleic acid molecule encoding the bispecific recombinant protein of claim 1, wherein the nucleic acid molecule encoding the high affinity tumor-targeting arm and the nucleic acid molecule encoding the fusion protein with low affinity for blocking the interaction between CD47 and SIRPα are presented together in the same DNA strand, or the nucleic acid molecule encoding the high affinity tumor-targeting arm and the nucleic acid molecule encoding the fusion protein with low affinity for blocking the interaction between CD47 and SIRPα are presented in separate DNA strands.

8. An expression vector comprising the nucleic acid molecule of claim 7.

9. A host cell comprising the expression vector of claim 8.

10. A method for preparing a bispecific recombinant protein, comprising culturing the host cell of claim 9 to express the bispecific recombinant protein.

11. A method for treating a tumor comprising administering to a patient or subject a therapeutically effective amount of the bispecific recombinant protein of claim 1 or a pharmaceutical composition comprising the bispecific recombinant protein of claim 1.

12. The method of claim 11, wherein the tumor is a hematological tumor or a solid tumor, selected from the group consisting of breast cancer, colorectal cancer, lung cancer, epidermal cancer, pancreatic cancer, esophageal cancer, endometrial cancer, ovarian cancer, gastric cancer, prostate cancer, kidney cancer, cervical cancer, myeloma, lymphoma, leukemia, thyroid cancer, uterine cancer, bladder cancer, neuroendocrine cancer, head and neck cancer, liver cancer, nasopharyngeal carcinoma, testicular cancer, small cell lung cancer, non-small cell lung cancer, melanoma, basal cell skin cancer, squamous cell skin cancer, dermatofibrosarcoma protuberan, merkel cell carcinoma, glioblastoma, glioma, sarcoma, mesothelioma, myelodysplastic syndrome.

13. The method of claim 11, wherein the high affinity tumor-targeting arm and the fusion protein with low affinity for blocking the interaction between CD47 and SIRPα are heterodimerized by knobs-into-holes.

14. The method of claim 11, wherein
the high affinity tumor-targeting arm targets CD20 and comprises (a) the amino acid sequence at positions 20 to 244 of SEQ ID NO: 16 and the amino acid sequence at positions 21 to 234 of SEQ ID NO: 17, or (b) the amino acid sequence at positions 20-241 of SEQ ID NO: 18 and the amino acids sequence at positions 21-239 of SEQ ID NO: 4, and the fusion protein with low affinity for blocking the interaction between CD47 and SIRPα comprises the amino acid sequence of SEQ ID NO: 30 or the amino acid sequence of SEQ ID NO: 30 except with an A80N substitution.

15. The method of claim 14, wherein the tumor is lymphoma.

16. The method of claim 11, wherein
the high affinity tumor-targeting arm targets EGFR and comprises the amino acid sequence at positions 20 to 241 of SEQ ID NO: 19 and the amino acid sequence at positions 18 to 231 of SEQ ID NO: 8, and
the fusion protein with low affinity for blocking the interaction between CD47 and SIRPα comprises the amino acid sequence of SEQ ID NO: 30 or the amino acid sequence of SEQ ID NO: 30 except with an A80N substitution.

17. The method of claim 16, wherein the tumor is colorectal cancer, lymphoma, lung cancer, or epidermal cancer.

18. The method of claim 11, wherein
the high affinity tumor-targeting arm targets HER2 and comprises (a) the amino acid sequence at positions 20 to 242 of SEQ ID NO: 20 and the amino acids sequence at positions 21 to 234 of SEQ ID NO: 21, or (b) the amino acid sequence at positions 20 to 241 of SEQ ID NO: 22 and the amino acid sequence at positions 21 to 234 of SEQ ID NO: 23, and
the fusion protein with low affinity for blocking the interaction between CD47 and SIRPα comprises (a) the amino acid sequence of SEQ ID NO: 30 or the amino acid sequence of SEQ ID NO: 30 except with an A80N substitution, or (b) the amino acid sequence of SEQ ID No: 31 or the amino acid sequence of SEQ ID NO: 31 except with an A80N substitution.

19. The method of claim 18, wherein the tumor is breast cancer, gastric cancer, bladder cancer, ovarian cancer, or lymphoma.

20. The method of claim 11, wherein
the high affinity tumor-targeting arm targets PD-L1 and comprises the amino acid sequence at positions 20 to 240 of SEQ ID NO: 24 and the amino acid sequence at positions 20 to 233 of SEQ ID NO: 13, and
the fusion protein with low affinity for blocking the interaction between CD47 and SIRPα comprises the amino acid sequence of SEQ ID NO: 30 or the amino acid sequence of SEQ ID NO: 30 except with an A80N substitution.

21. The method of claim 20, wherein the tumor is lung cancer or lymphoma.

\* \* \* \* \*